US012758917B2

(12) United States Patent
Dehlsen et al.

(10) Patent No.: US 12,758,917 B2
(45) Date of Patent: Oct. 13, 2026

(54) EMITTER ASSEMBLIES, EMITTER SYSTEMS INCLUDING THE SAME, AND ASSOCIATED METHODS

(71) Applicant: Dehlsen Associates of the Pacific Limited, Matakana (NZ)

(72) Inventors: James George Purnell Dehlsen, Matakana (NZ); Ira Leifer, Solvang, CA (US); Grant B. Deane, Poway, CA (US); Peter Stricker, Santa Barbara, CA (US)

(73) Assignee: Dehlsen Associates of the Pacific Limited, Matakana (NZ)

( * ) Notice: Subject to any disclaimer, the term of this patent is extended or adjusted under 35 U.S.C. 154(b) by 0 days.

(21) Appl. No.: 19/177,312

(22) Filed: Apr. 11, 2025

(65) Prior Publication Data

US 2026/0175160 A1 Jun. 25, 2026

Related U.S. Application Data

(60) Provisional application No. 63/738,481, filed on Dec. 23, 2024.

(51) Int. Cl.

*B01D 53/14* (2006.01)
*B01D 53/18* (2006.01)
*B01D 53/30* (2006.01)

(52) U.S. Cl.

CPC ..... *B01D 53/1475* (2013.01); *B01D 53/1412* (2013.01); *B01D 53/18* (2013.01); *B01D 53/30* (2013.01); *B01D 2221/16* (2013.01); *B01D 2257/504* (2013.01); *B01D 2259/122* (2013.01)

(58) Field of Classification Search

CPC ............ B01D 53/1475; B01D 53/1412; B01D 53/18; B01D 53/30; B01D 2221/16; B01D 2257/504; B01D 2259/122

USPC .......................................................... 423/220

See application file for complete search history.

(56) References Cited

U.S. PATENT DOCUMENTS

| | | | |
|---|---|---|---|
| 11,701,616 | B2 | 7/2023 | Dehlsen |
| 2021/0362094 | A1 | 11/2021 | Dehlsen |

OTHER PUBLICATIONS

Sunda et al., "Iron uptake and growth limitation in oceanic and coastal phytoplankton," *Marine Chemistry*, vol. 50, pp. 189-206 (1995).

*Primary Examiner* — Anita Nassiri-Motlagh
(74) *Attorney, Agent, or Firm* — Klarquist Sparkman, LLP

(57) ABSTRACT

A method of operating an emitter system includes receiving measured data inputs and operating an emitter assembly based, at least in part, on the control signals to enhance a rate of carbon dioxide removal. An emitter assembly includes a plurality of distributor elements with nozzles for emitting a reactant. The emitter assembly is configured to release one or more emitted materials into an incident airflow. A method of operating an emitter assembly includes conveying a reactant to a plurality of nozzles and emitting the reactant from the plurality of nozzles along nozzle dispersal directions that are elevated relative to an emitter rotational axis. An emitter system includes a wind turbine generator and an emitter assembly positioned and configured to emit a reactant into a rotor wake of the emitter system to react the reactant with carbon dioxide in the rotor wake.

20 Claims, 28 Drawing Sheets

EMITTER ASSEMBLIES, EMITTER SYSTEMS INCLUDING THE SAME, AND ASSOCIATED METHODS

CROSS REFERENCE TO RELATED APPLICATION

This application claims the benefit of U.S. Provisional Application No. 63/738,481, filed Dec. 23, 2024, which is incorporated by reference herein in its entirety.

FIELD

The present disclosure relates to emitter assemblies, and more specifically to systems for dispersing one or more emitted materials for atmospheric carbon dioxide removal (CDR).

BACKGROUND

Deep reductions in carbon dioxide ($CO_2$) emissions are required to reduce atmospheric $CO_2$ concentration, mitigating global heating. $CO_2$ is a greenhouse gas that traps heat from the sun. $CO_2$ concentrations are rising primarily because, as fossil fuels are burned for power production, the $CO_2$ build up in the atmosphere is trapping additional heat and raising Earth's average temperature. The scale needed to transform the world's primary energy sources from carbon-emitting fossil fuels to renewable energy is vast. It requires a challenging transition rate, indicating that atmospheric CDR and sequestration are imperative to achieving the level of future $CO_2$ reduction needed to mitigate global warming and climate change.

Current techniques are primarily for carbon capture from the emissions of sources such as power plants. Typically, $CO_2$ is separated from flue gas, compressed, and transported to be sequestered underground. Direct air capture (DAC) of $CO_2$ occurs when ambient air passes across an alkaline solution, such as sodium hydroxide. However, various DAC methods have proved costly due to the energy needed to process enough air to capture dilute (~422 ppm) atmospheric $CO_2$, the cost and delivery of the alkaline feedstock, the recovery of the feedstock, the transfer and containment of the $CO_2$ to be sequestered, and the large land area and structures needed for the air processing system. Water loss may be substantial in a DAC system and freshwater availability can be a significant problem in many parts of the world. As rising atmospheric temperatures drive changes in the hydrological cycle, water availability for DAC is often limited. In a typical DAC system, water loss is about 20 moles for every mole of $CO_2$ absorbed (at 15 degrees C. and 65% relative humidity).

CDR refers to reducing the high level of $CO_2$ already in the atmosphere by means that causes removal from the open atmosphere with enduring sequestration. The natural ocean processes that have accounted for over a quarter of the natural carbon sinks of atmospheric $CO_2$ have been impaired by anthropogenic loading of $CO_2$ in the atmosphere, causing the ocean to acidify. CDR in an ocean environment offers wind, waves, and currents for energy; wind for the inflow of $CO_2$; seawater for the alkaline feedstock for mineralization of airborne $CO_2$; and winds to spread the alkaline precipitate on the sea surface.

On the sea surface, the alkaline precipitate causes Ocean Alkalinity Enhancement (OAE) where carbon uptake by marine biota mimics the natural carbon cycle, and some of the carbon ends sequestered in the deep sea. Increasing ocean alkalinity reduces the stress on marine organisms from ocean acidification, potentially increasing capacity for greater marine carbon dioxide removal (mCDR). Furthermore, complementing OAE with measured dispersal of essential nutrients can provide an increase in biota-driven marine $CO_2$ drawdown capacity. Micronutrient dosing to certain areas of the ocean, like the iron-limited Southern Ocean, will stimulate primary productivity by allowing other nutrients to be more completely consumed, enhancing the amount of carbon dioxide that phytoplankton absorb at the surface, and when passing through the food web some of the carbon sinks to the deep sea.

There is urgent need for an mCDR platform that draws real-time data of the local atmosphere, the seawater, and marine organisms in the photic zone of the sea to command control functions of an emitter system that can adjust, as needed for optimum mCDR, 1) $CO_2$ mineralization and precipitation from the atmosphere, 2) increasing mCDR through ocean alkalization via bicarbonate precipitate, and 3) phytoplankton growth through iron fertilization for increased $CO_2$ uptake from the ocean. The system controller, using field sensor inputs for machine learning AI, aims to increase $CO_2$ drawdown under varying conditions and improve ocean health.

SUMMARY

Emitter assemblies, emitter systems including the same, and associated methods are disclosed herein.

In a representative example, a method of operating an emitter system includes receiving one or more measured data inputs, generating one or more control signals, and operating an emitter assembly of the emitter system based, at least in part, on the one or more control signals. The receiving the one or more measured data inputs and the generating the one or more control signals are performed by a control system of the emitter system. The one or more measured data inputs include one or more of atmospheric and/or meteorological data measured upwind of the emitter assembly; ocean data measured upwind of the emitter assembly; atmospheric and/or meteorological data measured downwind of the emitter assembly; ocean data measured downwind of the emitter assembly; meteorological data measured downwind of the emitter assembly; or marine biota data measured downwind of the emitter assembly. The emitter assembly is configured to emit each of a first emitted material and a second emitted material into an incident airflow. The operating the emitter assembly comprises regulating emission of one or both of the first emitted material and the second emitted material to enhance a rate of CDR produced by one or both of the first emitted material and the second emitted material. In another representative example, an emitter assembly includes a plurality of distributor elements and a support structure. Each distributor element includes one or more nozzles configured to emit a reactant along a respective nozzle dispersal direction. The support structure supports the plurality of distributor elements relative to an emitter rotational axis of the emitter assembly such that the nozzle dispersal direction of each nozzle of at least a subset of the one or more nozzles is elevated relative to the emitter rotational axis. The reactant includes a carbon dioxide reactant, and the emitter assembly is configured to release the reactant into an incident airflow to react the reactant with carbon dioxide in the incident airflow.

In another representative example, a method of operating an emitter assembly positioned in an incident airflow to emit a reactant into the incident airflow includes conveying the reactant to a plurality of nozzles of the emitter assembly. The method additionally includes emitting the reactant from the plurality of nozzles such that each nozzle of at least a subset of the plurality of nozzles emits the reactant along a corresponding nozzle dispersal direction that is elevated relative to an emitter rotational axis of the emitter assembly.

In another representative example, an emitter system includes a wind turbine generator and an emitter assembly. The wind turbine generator includes a plurality of turbine rotor blades, and the emitter assembly is positioned and configured to emit a reactant into a rotor wake of the turbine rotor blades. The emitter assembly includes a plurality of distributor elements, each distributor element including one or more nozzles configured to emit the reactant along a respective nozzle dispersal direction. The emitter assembly additionally includes a support structure that supports the plurality of distributor elements relative to an emitter rotational axis of the emitter assembly such that, for at least a subset of the plurality of distributor elements, each nozzle dispersal direction includes a component that is angled relative to the emitter rotational axis by a nonzero azimuthal angle. The reactant includes a carbon dioxide reactant, and the emitter assembly is configured to release the reactant into the rotor wake to react the reactant with carbon dioxide in the rotor wake.

The various innovations of this disclosure can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the disclosure will become more apparent from the following detailed description, claims, and accompanying figures.

BRIEF DESCRIPTION OF THE DRAWINGS

FIG. 2C' is an illustration of a turbine rotor wake structure associated with a wind turbine-based emitter system including an emitter assembly according to another example.

FIG. 3A' is a front view of an emitter assembly according to another example.

FIG. 8' depicts an emitter assembly installed on a ship according to an example.

DETAILED DESCRIPTION

General Considerations

Figure 1:
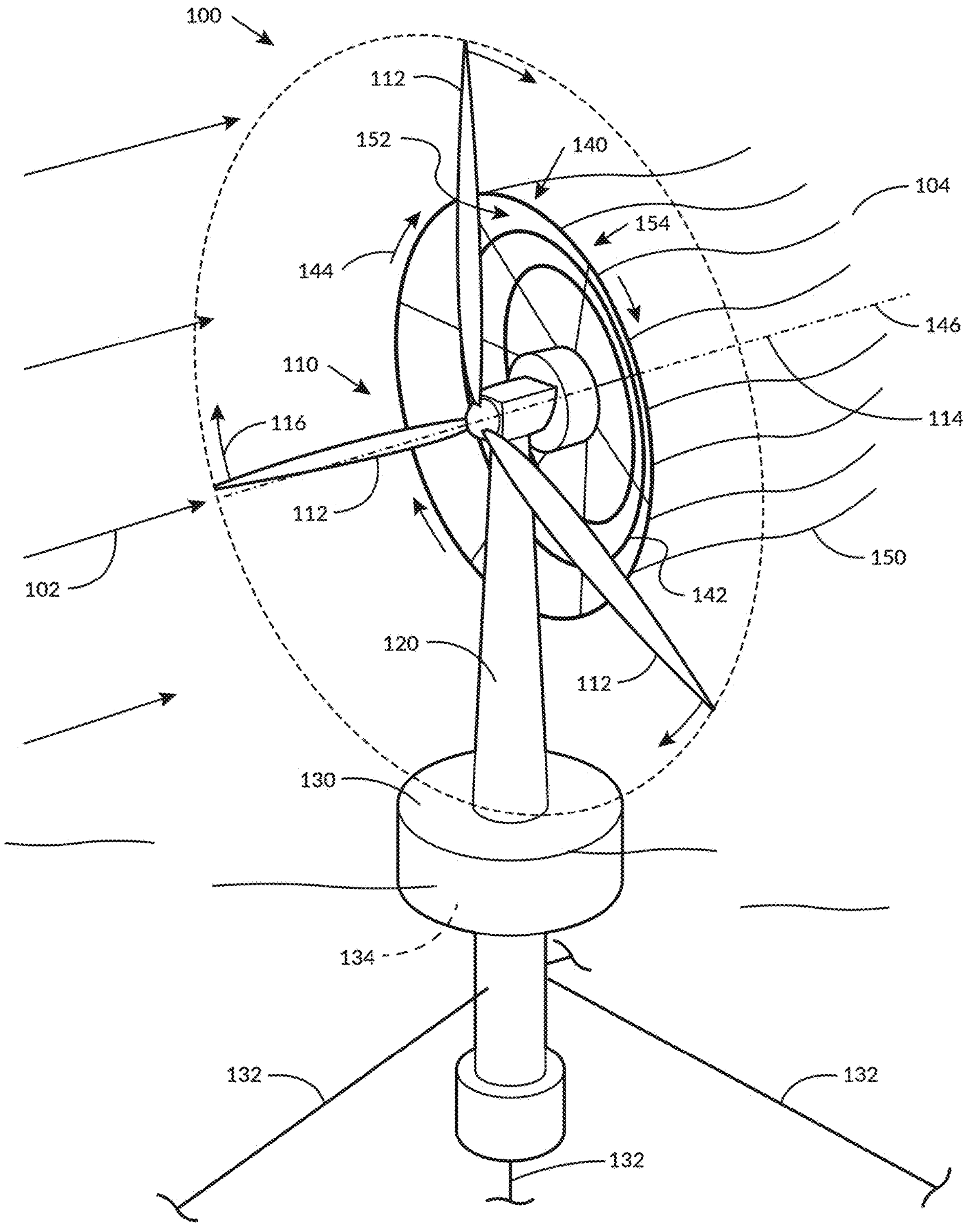
FIG. 1 is a perspective view of an offshore wind turbine-based emitter system including an emitter assembly according to an example.

For purposes of this description, certain aspects, advantages, and novel features of examples of this disclosure are described herein. The disclosed methods, apparatus, and systems should not be construed as being limiting in any way. Instead, the present disclosure is directed toward all novel and nonobvious features and aspects of the various disclosed examples, alone and in various combinations and sub-combinations with one another. The methods, apparatus, and systems are not limited to any specific aspect or feature or combination thereof, nor do the disclosed examples require that any one or more specific advantages be present or problems be solved.

Although the operations of some of the disclosed examples are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises." Further, the term "coupled" generally means physically, mechanically, chemically, magnetically, and/or electrically coupled or linked and does not exclude the presence of intermediate elements between the coupled or associated items absent specific contrary language.

As used herein, the term "operatively coupled," as used to describe a configuration and/or relationship between two or more components, is intended to refer to a configuration and/or relationship in which the components are directly or indirectly coupled to one another in a manner consistent with the structures and/or functions disclosed herein. For example, a pair of components may be described as being operatively coupled to one another when such components are coupled to one another in a manner that is operative to produce the structural configurations and/or functional properties disclosed herein.

As used herein, "e.g." means "for example," and "i.e." means "that is."

Unless otherwise stated, as used herein, the term "substantially" means the listed value and/or property and any value and/or property that is at least 75% of the listed value and/or property. Equivalently, the term "substantially" means the listed value and/or property and any value and/or property that differs from the listed value and/or property by at most 25%. For example, "substantially equal" refers to quantities that are fully equal, as well as to quantities that differ from one another by up to 25%.

The systems, apparatus, and methods described herein should not be construed as limiting in any way. Instead, the present disclosure is directed toward all novel and non-obvious features and aspects of the various disclosed examples, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various examples. Computer-executable instructions for program modules may be executed within a local or distributed computing system. In general, a computing system or computing device can be local or distributed, and can include any combination of special-purpose hardware and/or general-purpose hardware with software implementing the functionality described herein, examples of which include personal computers, hand-held devices, tablets, multiprocessor systems, microprocessor-based or programmable consumer electronics, network PCs, minicomputers, mainframe computers, virtual machines, containerized applications, etc.

In various examples described herein, a module (e.g., component or engine) can be "programmed" and/or "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

Described algorithms may be, for example, embodied as software or firmware instructions carried out by a digital computer. For instance, any of the disclosed methods can be performed by one or more a computers or other computing hardware that is part of a system and/or device according to the present disclosure. The computers can be computer systems comprising one or more processors (processing devices) and tangible, non-transitory computer-readable media (e.g., one or more optical media discs, volatile memory devices (such as DRAM or SRAM), or nonvolatile memory or storage devices (such as hard drives, NVRAM, and solid-state drives (e.g., Flash drives)). The one or more processors can execute computer-executable instructions stored on one or more of the tangible, non-transitory computer-readable media, and thereby perform any of the disclosed techniques. For instance, software for performing any of the disclosed examples can be stored on the one or more volatile, non-transitory computer-readable media as computer-executable instructions, which when executed by the one or more processors, cause the one or more processors to perform any of the disclosed techniques or subsets of techniques.

Introduction to the Disclosed Technology

The present disclosure relates to examples of emitter assemblies for releasing one or more emitted materials into air in the vicinity of the emitter assembly. For example, the emitter assembly may include and/or be an adjustable multi-nozzle reactant emitter assembly that releases a $CO_2$ reactant solution as aerosol particles, to cause CDR from the air passing through the emitter. In particular, the reactant emitter system may be used in conjunction with a wind turbine generator, such as an offshore wind turbine generator, to release the reactant downwind of the rotor of a wind turbine generator.

The emitter assemblies can disperse one or more species of substances, such as reactants and/or fertilizer materials (e.g., biota nutrients). For example, the reactant may include and/or be an aerosolized dilute solution of sodium hydroxide with water. The aerosol reactant can mineralize atmospheric $CO_2$, forming sodium bicarbonate water droplets that precipitate to the ocean, buffering the over-acidified seawater and restoring ocean capacity to draw down more $CO_2$.

In the present disclosure, the substances emitted by the emitter assemblies generally may be referred to as "emitted materials." While several examples according to the present disclosure relate to examples in which each substance emitted by the emitter assembly includes and/or is a reactant, such as a $CO_2$ reactant, this is not required of all examples. As used herein, any description of a "reactant" and/or an "emitted material" that is provided to and/or released by an emitter assembly also may be understood as encompassing any other suitable substances. Additionally, the present disclosure describes examples in which a single emitted material (e.g., a reactant) is emitted by the emitter assemblies as well as examples in which the emitter assemblies emit each of a first emitted material (e.g., a reactant) and a second emitted material (e.g., a fertilizer material). Such examples are not limiting, and it also is within the scope of the present disclosure that the emitter assemblies described herein can be configured to emit three or more different emitted materials, and/or to emit emitted materials other than those specifically described herein.

In examples in which the emitter assemblies disperse a reactant for mineralizing atmospheric $CO_2$, the sodium bicarbonate water droplets entering the ocean can enhance the alkalinity of the ocean, thereby increasing seawater uptake of $CO_2$. The emitter assembly thus can provide two means of atmospheric carbon removal with a single measure of reactant by removing $CO_2$ from the atmosphere and by increased $CO_2$ absorption by the ocean surface layer. The removed carbon may be processed by marine biota and be permanently sequestered in the deep ocean.

In some examples, the emitter assemblies may be configured to release multiple different species of substances and/or reactants into the air. For example, and as discussed in more detail below, an emitter assembly may be configured to release a first emitted material in the form of a reactant, such as a $CO_2$ reactant solution, as well as a second emitted material in the form of a fertilizer material, such as an iron fertilizer to promote marine organism growth through ocean iron fertilization (OIF) for increased $CO_2$ uptake. Systems including such emitter assemblies thus may be configured to regulate the emission of the reactant solution and/or the fertilizer material to enhance CDR capacity based upon various measured conditions. For example, such systems can operate to release the reactant solution and the fertilizer at regulated times and/or proportions that are at least partially determined based on oceanic, atmospheric, and/or marine biota real-time data collection.

The present disclosure also relates to a structural means of scaling up a capacity for emitting one or more emitted materials (e.g., a $CO_2$ reactant aerosol) while maintaining nozzle density per unit of emitter disc area, and to increase emitter plume particle dispersal, beyond the wake of the emitter, into the wake of the wind turbine on which it is mounted.

The emitter assembly can be mounted on any of a variety of structures, such as marine structures that operate in winds over the open ocean, examples of which include ships, oil and gas (O&G) platforms, piers, and jetties. In such settings, winds can carry the bicarbonate droplets and/or fertilizer materials to fall across expansive ocean areas as the speed and direction of the wind changes.

As described in more detail below, emitter assemblies according to the present disclosure can be designed and/or configured to facilitate scaling such systems to suit a variety of use cases. In particular, marine based infrastructure such as offshore wind turbines have substantial capital cost relating to deployment, installation, anchoring, and the pipelines and power lines to shore. Accordingly, it may not be economically feasible to integrate an emitter assembly with such wind turbines if the CDR capacity of the emitter assembly is not calibrated to the air throughput of the wind turbine. Thus, configuring the emitter assembly to be readily scaled to applications of varying sizes and/or capacities can enhance the adoption of such technologies in combination with existing infrastructure. As described in more detail below, emitter assemblies according to the present disclosure can achieve such scaling by incorporating multiple concentric emitter bands of increasing diameter, with the emitter bands including correspondingly increasing numbers of reactant emitting nozzles. Such a configuration can allow for scaling up the emitter assembly diameter while maintaining a constant, substantially constant, or increasing number density of nozzles per unit of swept area.

As described in more detail below, emitter assemblies according to the present disclosure may be characterized by low mass, low wind loading, and variable rotational speed, and may include a branched reactant solution delivery to the nozzles. Such structures can include support for the concentric distributer bands within the concentric rims and can provide conduits for the reactant solution to reach the nozzles. In various examples, the concentric bands are fixed in position by a combination of solid spokes (masts) and cables or rod spokes that span between the hub, and the rims, or just between rims. The rims may be structurally integrated with the masts by spreaders on the masts with forestays and backstays from the hub to intermediate mast attachment points and/or the mast top, to withstand the force of high wind and turbulence. The hub axle, the masts and the rims may serve as conduits for conveyance of the reactant solution to the nozzles.

Additionally, and as described in more detail below, emitter assemblies of the present disclosure may include features and/or characteristics that facilitate efficient mixing of the reactant into the wake of a wind turbine generator. In particular, the emitter assemblies disclosed herein can be configured for enhanced expansion of a plume of the reactant from the emitter, such as by emitting the reactant along a direction that is directed radially away from a rotational axis of the emitter assembly and toward a region of turbulent mixing dynamics to promote mixing of the reactant with the incoming airflow.

Examples of the Disclosed Technology

FIG. 1 illustrates an example of an emitter system 100 including an emitter assembly 140 according to the present disclosure. As described herein, the emitter assembly 140 is configured to emit a reactant 150 for dispersal in an airflow. In the example of FIG. 1, the emitter system 100 is used in conjunction with an offshore wind turbine system, and thus also may be referred to herein as a wind turbine-based emitter system 100. This is not required, however, and it additionally is within the scope of the present disclosure that the emitter system 100 may be used in conjunction with other wind turbine systems and/or in any other suitable applications.

As shown in FIG. 1, the emitter system 100 includes a wind turbine generator 110 with a plurality of turbine rotor blades 112, a tower (or mast) 120, and a platform 130 supporting the tower 120. The platform 130 can be a fixed platform or may be a floating platform with anchoring 132 to a seafloor. For example, the platform 130 can include and/or be a spar buoy. In some examples, the emitter system 100 also can include a reactant production system 134 for producing a $CO_2$ reactant for dispersal by the emitter assembly 140. For example, the reactant production system 134 can include reverse osmosis components housed in the platform 130 to generate a sodium hydroxide solution as a byproduct of seawater desalination. Additional examples of components of the emitter system 100 are disclosed in U.S. patent application Ser. No. 17/391,884, the disclosure of which is incorporated by reference herein.

As shown in FIG. 1, the emitter system 100 may be positioned in the path of an incident airflow 102 (e.g., wind), which can cause the turbine rotor blades 112 of the wind turbine generator 110 to rotate in a first rotational direction 116 about a rotor blade axis 114. The rotation of the turbine rotor blades 112 can be used to generate electricity and/or to produce usable mechanical energy, such as to operate one or more other components of the emitter system 100, such as the reactant production system 134.

In the present disclosure, the terms "upwind" and "downwind" generally refer to directions and/or regions as determined with reference to the incident airflow 102 and/or the turbine rotor blades 112. For example, the incident airflow 102 directed toward the turbine rotor blades 112 also may be referred to as an upwind airflow 102, while the resulting airflow directed away from the turbine rotor blades 112 (e.g., the incident airflow 102 after passing through the area swept by the turbine rotor blades 112) may be referred to as a downwind airflow 104. The incident airflow 102 also may be referred to as an upwind airflow 102.

As shown in FIG. 1, the emitter assembly 140 is mounted downwind of the turbine rotor blades 112 of the wind turbine generator 110. The emitter assembly 140 is centered, or approximately centered, with a rotor wake of the turbine rotor blades 112. In particular, the emitter assembly 140 is located directly downwind of a core region of the rotor assembly of the wind turbine generator 110, which contributes only minimally to the total energy extracted from the wind flow by the turbine rotor blades 112.

The emitter assembly 140 is positioned and configured to emit the reactant 150 (e.g., a $CO_2$ reactant) downwind of the turbine rotor blades 112 to be mixed with the downwind airflow 104 as described in more detail below. The emitter assembly 140 may be configured to rotate in a second rotational direction 144 about an emitter rotational axis 146. As described in more detail below, the emitter assembly 140 includes a dish-shaped support structure 142 that supports various components for conveying and/or emitting the reactant 150.

The dispersed reactant 150 can include and/or be any of a variety of dispersible substances to be mixed with the downwind airflow 104. In particular, the present disclosure generally is directed to examples in which the reactant 150 includes and/or is a $CO_2$ reactant, such as a solution of sodium hydroxide and water. This is not required of all examples, however, and it additionally is within the scope of the present disclosure that the reactant 150 can include and/or be any other substance to be dispersed into an airflow.

As shown in FIG. 1, the emitter rotational axis 146 may be collinear with the rotor blade axis 114, but this is not required of all examples. In other examples, the emitter rotational axis 146 may parallel to the rotor blade axis 114 and spaced apart from the rotor blade axis 114.

In some examples, and as shown in FIG. 1, the first rotational direction 116 and the second rotational direction 144 may be the same direction (e.g., clockwise, as viewed toward the downwind direction). This is not required of all examples, however, and it additionally is within the scope of the present disclosure that the second rotational direction 144 may be opposite to the first rotational direction 116.

In some examples, the emitter assembly 140 may not be connected to a drivetrain of the wind turbine generator 110 such that the emitter assembly 140 rotates independent of the turbine rotor blades 112. In other examples, rotation of the turbine rotor blades 112 and of the emitter assembly 140 may be mechanically coupled, such as via a geared transmission system. Additionally, or alternatively, the rotation of the turbine rotor blades 112 by wind energy can yield mechanical and/or electrical power that is used to rotate the emitter assembly 140.

As shown in FIG. 1, the emitter assembly 140 is dish shaped. In particular, the emitter assembly 140 and/or the support structure 142 may be described as having a first side 152 that is generally concave and faces toward the upwind direction (e.g., toward and against the incident airflow 102) and a second side 154 that is generally convex and faces toward the downwind direction (e.g., toward and aligned with the downwind airflow 104). As described in more detail below, such a dish shaped configuration can enhance a bow-wave effect that forms on the perimeter of the emitter, increasing dispersal of the reactant 150 radially in the downwind airflow 104, and into the greater turbine rotor wake.

Figure 2A:
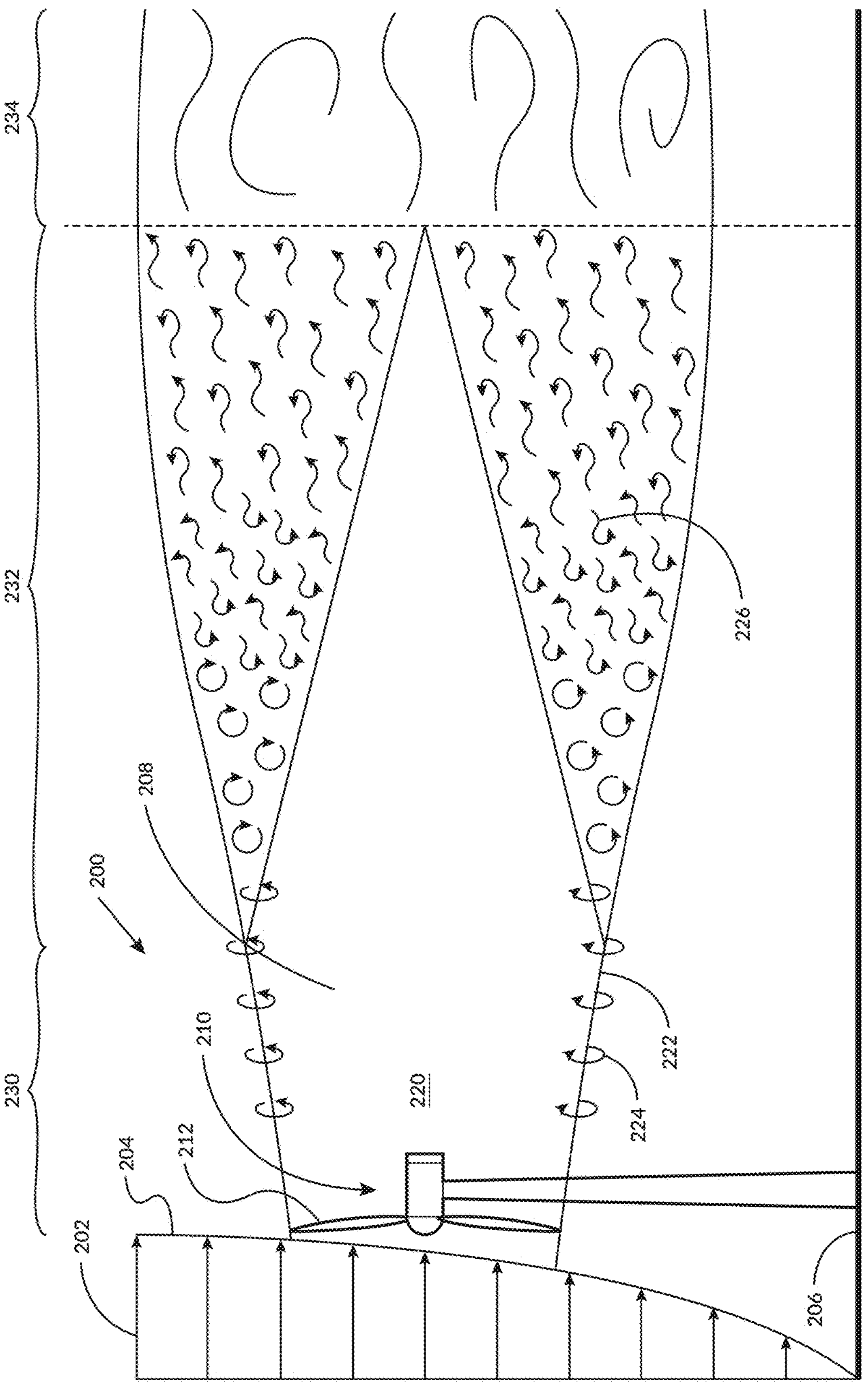
FIG. 2A is an illustration of aspects of a turbine rotor wake structure associated with a wind turbine generator according to an example.

FIG. 2A illustrates an example of a turbine rotor wake structure 200 associated with turbine rotor blades 212 of a wind turbine generator 210, which can represent an example of the wind turbine generator 110 of FIG. 1. As shown in FIG. 2A, a velocity profile 204 of an upwind airflow 202 upwind of the turbine rotor blades 212 exhibits greater airflow velocities with increased elevation above a ground level 206 (e.g., a sea level), thus motivating positioning the turbine rotor blades 212 at a high elevation to receive greater wind energies from the upwind airflow 202. As shown in FIG. 2A, any portion of the airflow upwind of the turbine rotor blades 212 may be described as the upwind airflow 202, while any portion of the airflow downwind of the turbine rotor blades 212 may be described as a downwind airflow 208.

Because the turbine rotor blades 212 operate to extract energy from the upwind airflow 202, a portion of the downwind airflow 208 immediately downwind of the turbine rotor blades 212 generally has a decreased velocity relative to the upwind airflow 202. This region of airflow thus may be described as a reduced velocity region 220, in which a velocity (e.g., a time-averaged velocity) of the downwind airflow 208 is smaller relative to a velocity of the downwind airflow 208 outside of the wake structure 200. The turbine rotor blades 212 generate blade tip vortices 224 at a rotor wake boundary 222 between the turbine rotor wake structure 200 and the surrounding downwind airflow 208.

As shown in FIG. 2A, the turbine rotor wake structure 200 may be described as exhibiting a near-wake region 230 immediately downwind of the turbine rotor blades 212, a transition region 232 downwind of the near-wake region 230, and a far-wake region 234 downwind of the transition region 232.

Figure 2B:
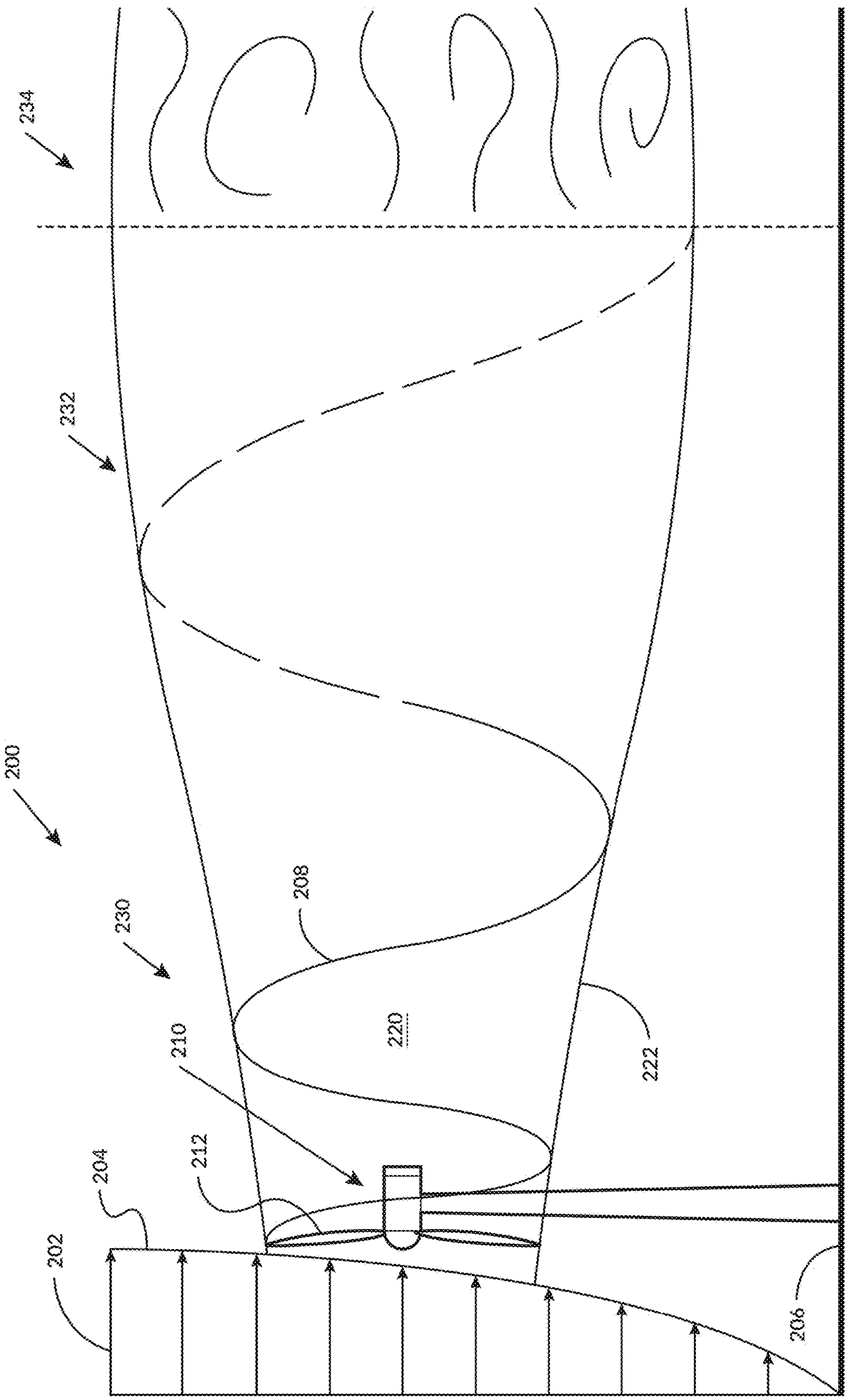
FIG. 2B is another illustration of aspects of the turbine wake structure of FIG. 2A.

Within the near-wake region 230, and as shown in FIG. 2B, the downwind airflow 208 within the reduced velocity region 220 may take the form of a stably whirling wake that rotates in an opposite direction as the turbine rotor blades 212. Due to the stability of the flow dynamics within the near-wake region 230, a substance introduced into the reduced velocity region 220 in the near-wake region may be entrained in the downwind airflow 208 without significant expansion and/or mixing.

In the transition region 232, the downwind airflow 208 additionally exhibits a turbine rotor wake turbulence region 226 in which the reduced velocity region 220 mixes with the downwind airflow 208 surrounding the turbine rotor wake structure 200, causing the reduced velocity region 220 to shrink radially in the downwind direction as the rotor wake turbulence region 226 fills towards the center. For example, the formation and/or expansion of the turbine rotor wake turbulence region 226 may result from vortex breakdown dynamics associated with the blade tip vortices 224 and the windspeed recovery in the turbine rotor wake turbulence region 226. The downwind airflow 208 thus may exhibit turbulent dynamics within the turbine rotor wake turbulence region 226. In the far-wake region 234, the turbine rotor wake structure 200 is effectively aligned with the surrounding downwind airflow 208.

FIG. 2B depicts the turbine rotor wake structure 200 exhibited in the downwind airflow 208 as it whirls downwind. As shown in FIG. 2B, the whirling of the turbine rotor wake structure 200 expands and dissipates through the near-wake region 230 and the transition region 232 as it reaches far-wake region 234.

Figure 2C:
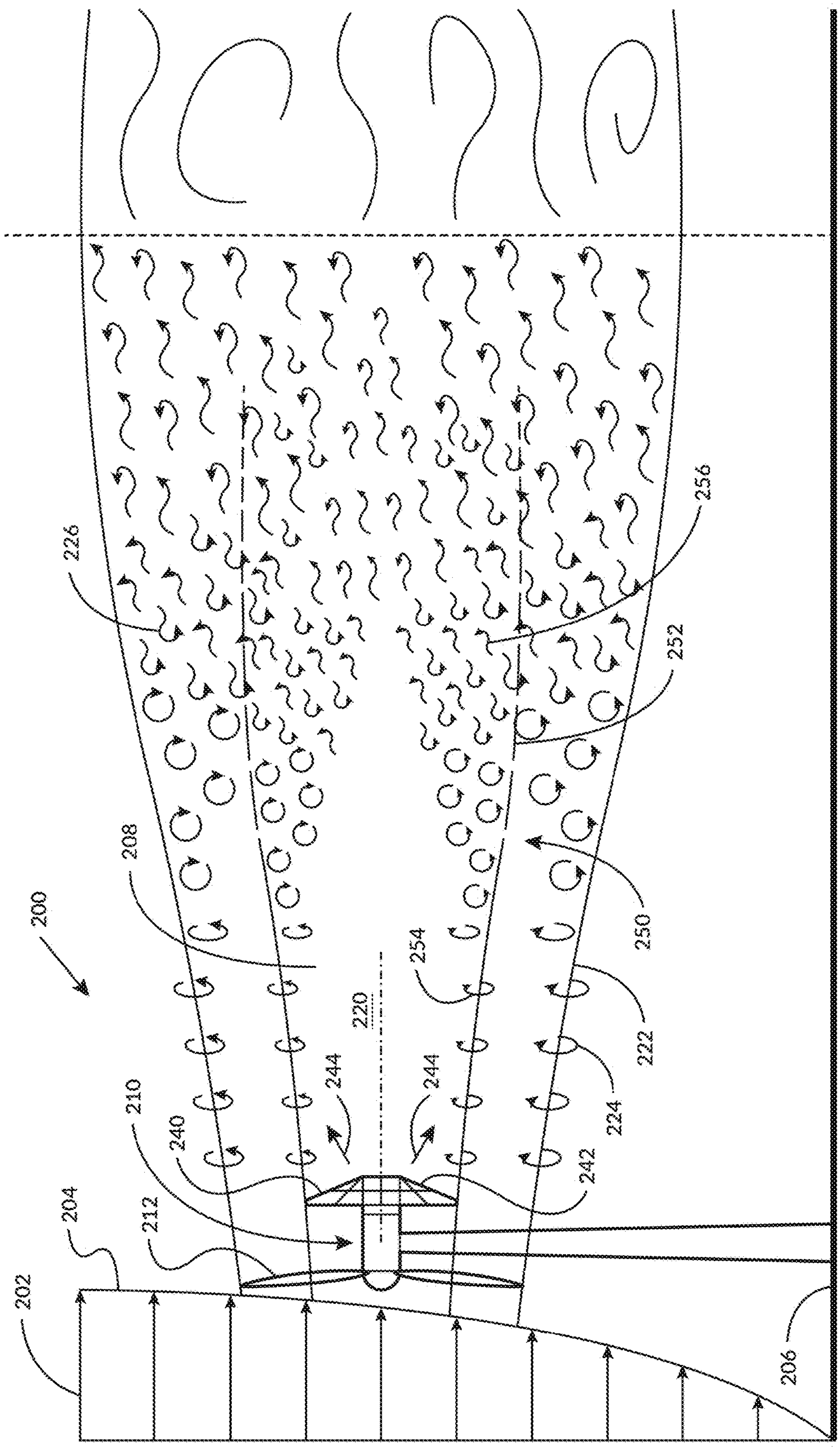
FIG. 2C is an illustration of a turbine rotor wake structure associated with a wind turbine-based emitter system including an emitter assembly according to an example.
Figure 2C:
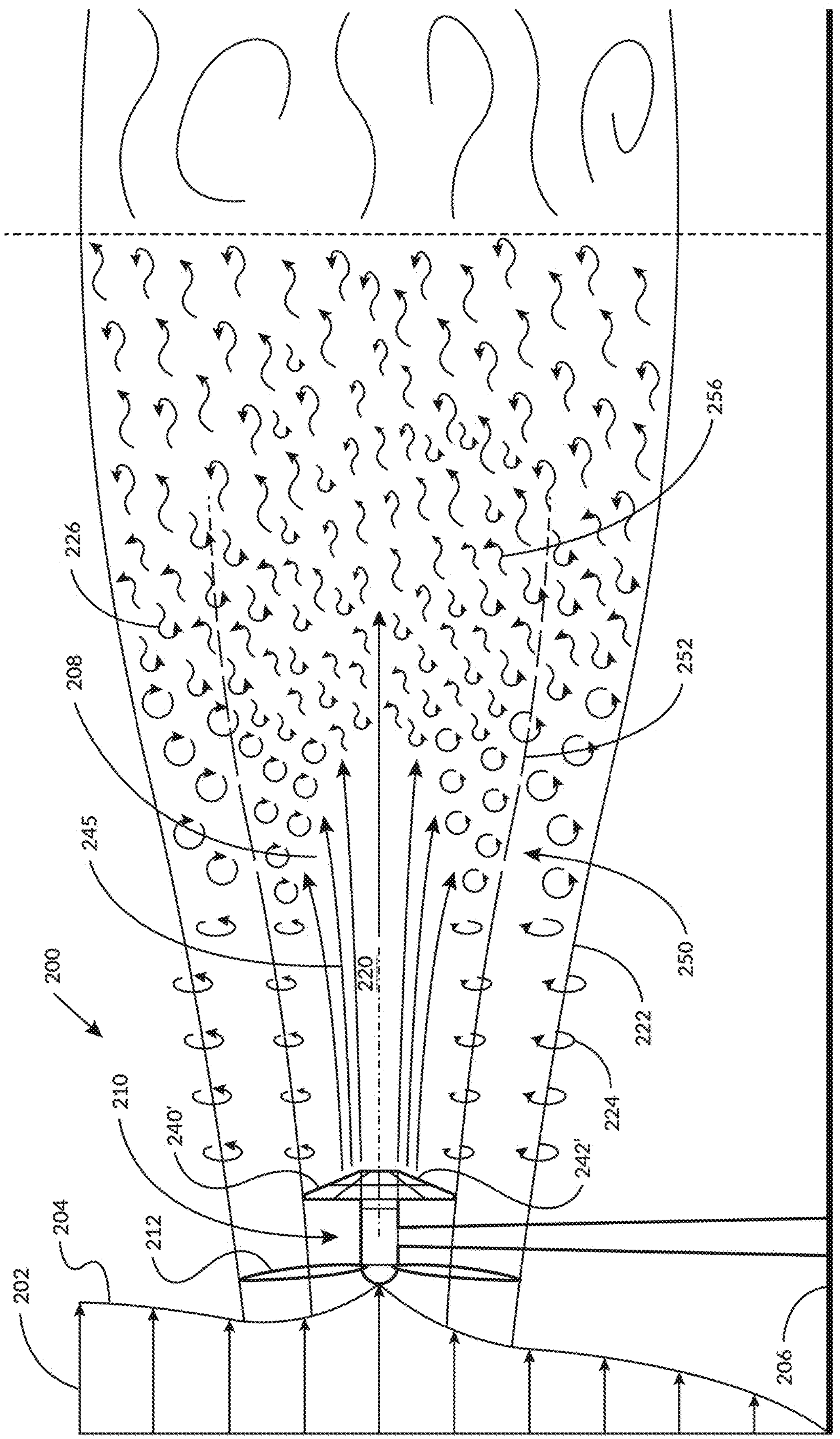

FIG. 2C illustrates an example in which an emitter assembly 240 is mounted to the wind turbine generator 210 in the manner discussed above with reference to FIG. 1. The emitter assembly 240 can represent an example of the emitter assembly 140 of FIG. 1 and is positioned and configured to emit a reactant 244 into the downwind airflow 208.

In addition to the turbine rotor wake structure 200 described above, the independent rotation of the emitter assembly 240 also exhibits an emitter wake structure 250. The emitter assembly 240 can generate emitter vortices 254 at an emitter wake boundary 252 of the emitter wake structure. Similar to the turbine rotor wake turbulence region 226, vortex breakdown of the emitter vortices 254 can yield an emitter wake turbulence region 256 in which the reduced velocity region 220 mixes with surrounding potions of the downwind airflow 208 with turbulent dynamics.

As shown in FIG. 2C, the emitter wake structure 250 described above can operate to radially shrink the reduced velocity region 220 supporting stable wake dynamics immediately downwind of the emitter assembly 240. Additionally, the emitter wake turbulence region 256 can form axially nearer to the emitter assembly 240 than does the turbine rotor wake turbulence region 226. As a result, the introduction of the emitter assembly 240 for dispersing the reactant 244 into the downwind airflow 208 also can operate to promote more efficient mixing of the reactant with the downwind airflow 208.

As shown in FIG. 2C, the dished shape of the emitter assembly 240 also can enhance spreading of the reactant 244 into the downwind airflow 208 and the turbine rotor wake turbulence region 226. In particular, the convex second side 242 of the emitter assembly 240 can be configured such that the reactant 244 exiting the emitter assembly 240 is emitted along a direction that is angled away from an emitter rotational axis 246 of the emitter assembly 240. As a result, the reactant 244 can have an initial velocity that is directed toward the emitter wake boundary 252, causing a plume of the reactant 244 to whirl and expand to promote spreading of the plume of the reactant 244 and merging of the reactant 244 with the turbulent air of the turbine rotor wake. The reactant 244 thus can merge across a large volume of the turbine rotor wake structure 200, thereby spreading a correspondingly large number of reactant particles to react with $CO_2$ molecules carried in the turbine rotor wake structure 200.

The enhanced exposure of reactant particles to inflowing $CO_2$ molecules of the turbine rotor wake resulting from the configuration of the emitter assembly 240 may be of particular importance in enabling reactant-use efficacy for carbon dioxide removal at scales sufficient to support industrial viability. For example, reactant plume expansion from an emitter assembly 240 with a diameter of 60 meters used in conjunction with a wind turbine generator 210 with a rotor diameter of 150 meters can increase the potential exposure for aerosol particle reaction with sparse airborne $CO_2$ particles (at a concentration of approximately 420 parts per million) by over 600% when compared to not operating downwind of the turbine rotor wake. When an offshore wind turbine with a 150-meter rotor diameter is positioned in an 8 m/s wind flow, 125 tons of $CO_2$ will pass through the turbine rotors in an hour. When an emitter assembly with a 60-meter diameter is positioned in an 8 m/s wind flow, 21 tons of $CO_2$ will pass through the turbine rotor in an hour.

FIG. 2C' illustrates an example in which an emitter assembly 240' is mounted to the wind turbine generator 210 in the manner discussed above with reference to FIG. 1. The emitter assembly 240' is substantially identical to the emitter assembly 240 of FIG. 2C with the exception that the emitter assembly 240' omits structures of the emitter assembly 240 in a central region of the emitter assembly 240'. In particular, the emitter assembly 240' may represent the emitter assembly 300' of FIGS. 3A' and 3B' as discussed below. As a result, and as shown in FIG. 2C', the emitter assembly 240' can pass a central wind flow 245 through a central region thereof with relatively higher velocity (e.g., relative to the configuration of FIG. 2C), which can promote the onset of spreading and mixing dynamics axially nearer to the emitter assembly 240' than in the configuration of FIG. 2C.

While the present disclosure generally relates to examples in which the disclosed emitter assemblies are used in conjunction with a wind turbine generator 210 as depicted in FIGS. 2C-2C', this is not required of all examples. For example, it also is within the scope of the present disclosure that the disclosed emitter assemblies may be operated to emit the reactant 244 into the open atmosphere, such as into a wind flow, without being associated with and/or supported by a wind turbine generator.

Figure 3A:
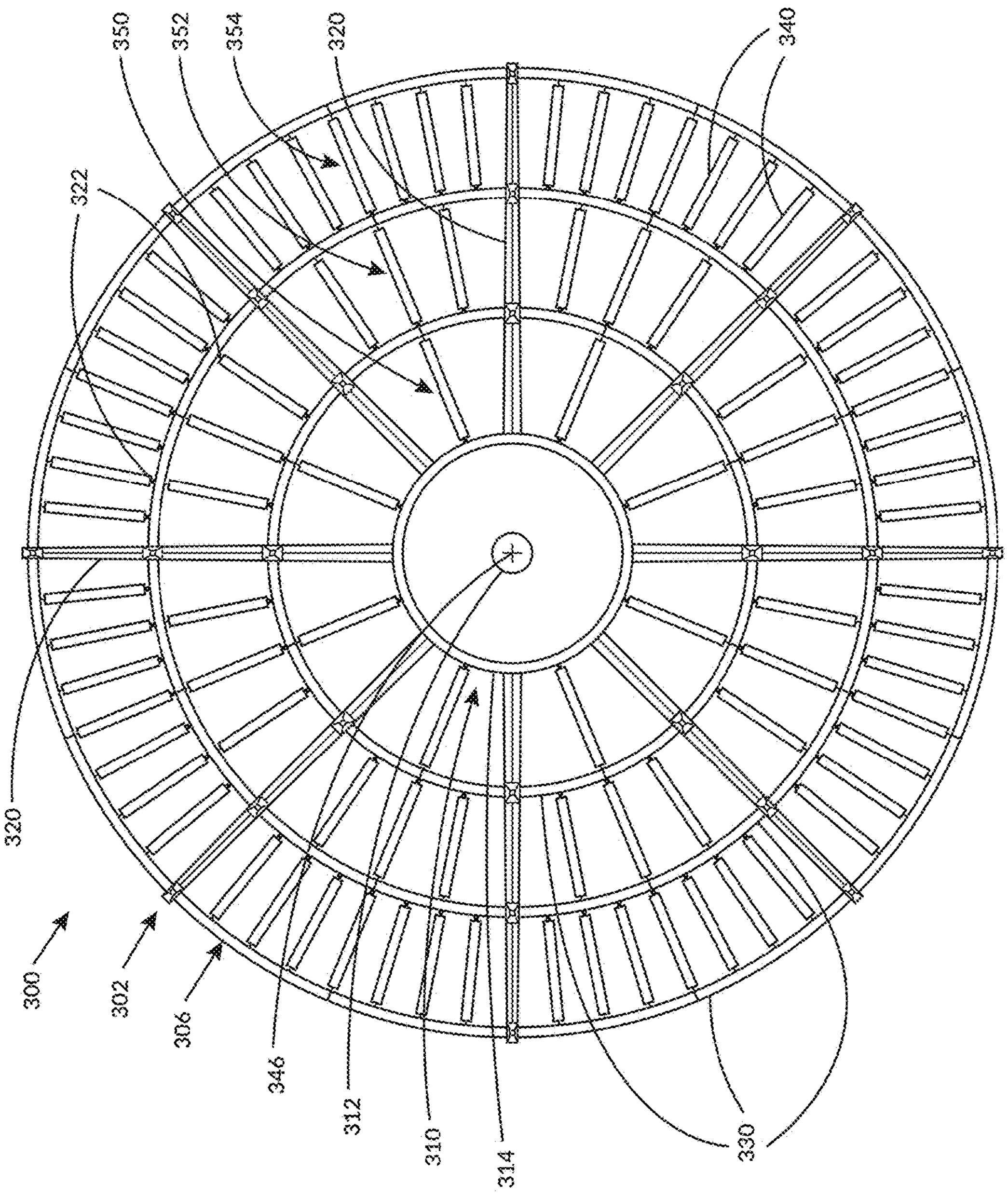
FIG. 3A is a front view of an emitter assembly according to an example.
Figure 3A:
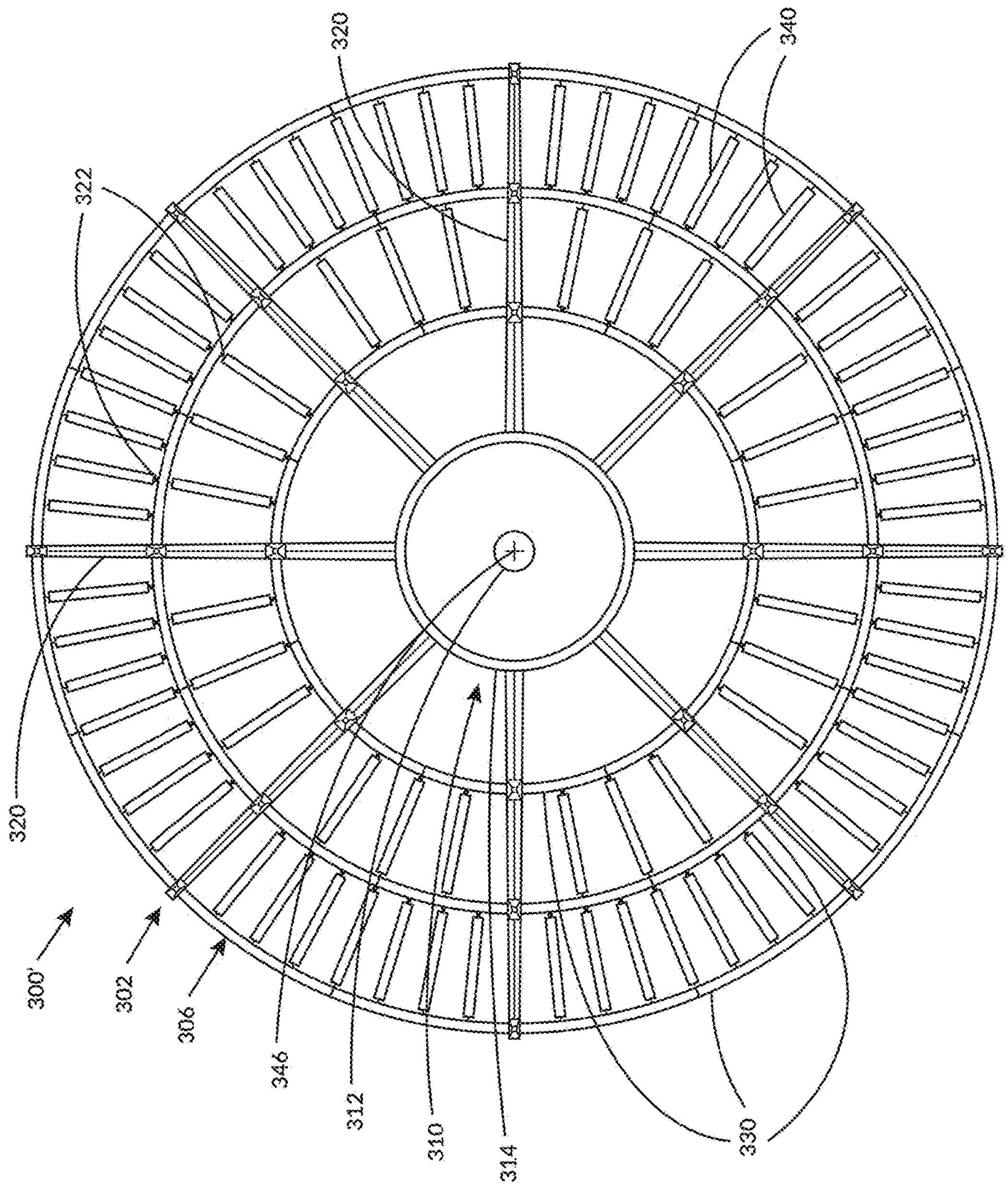
Figure 3B:
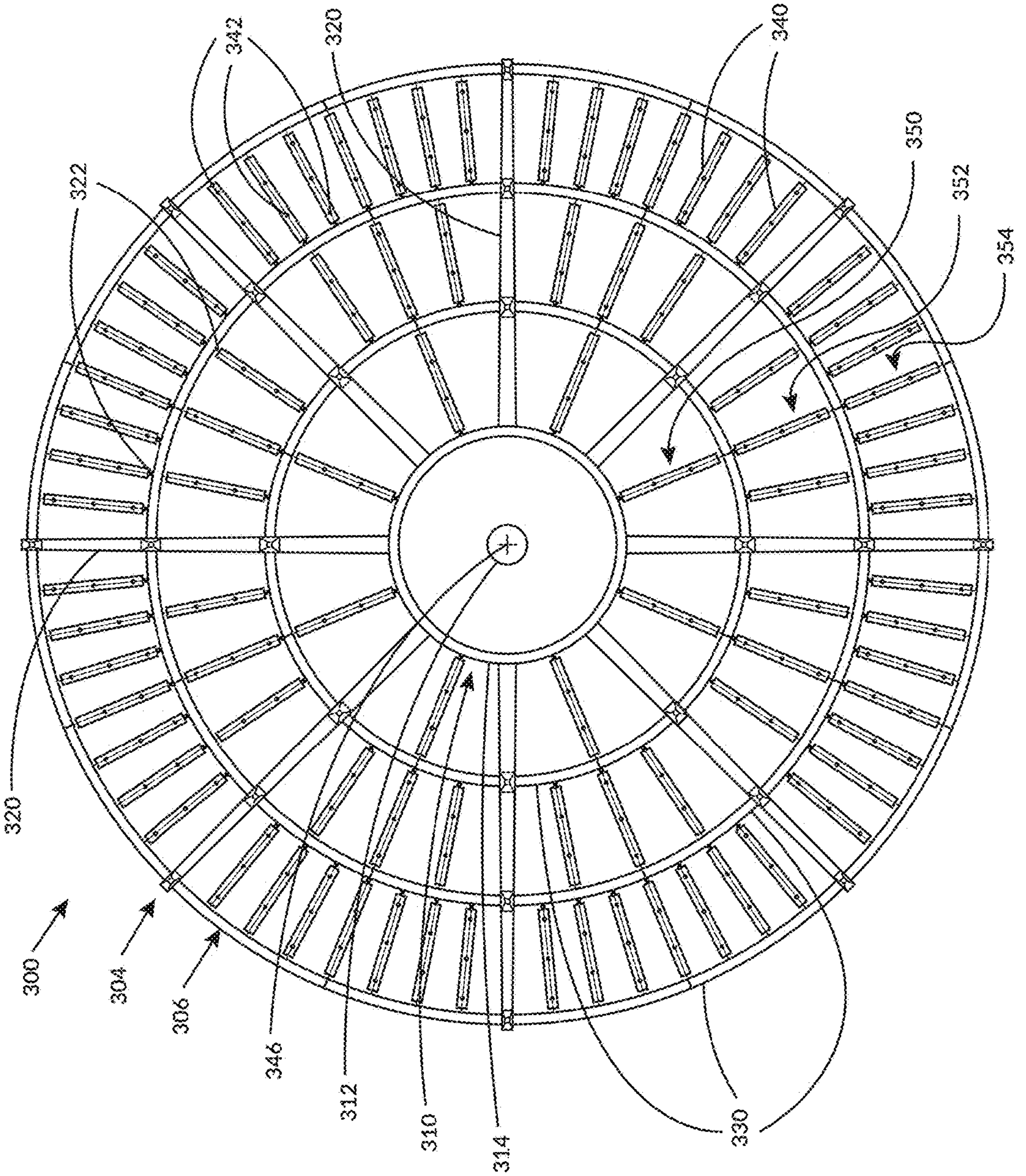
FIG. 3B is a rear view of the emitter assembly of FIG. 3A.
Figure 3B:
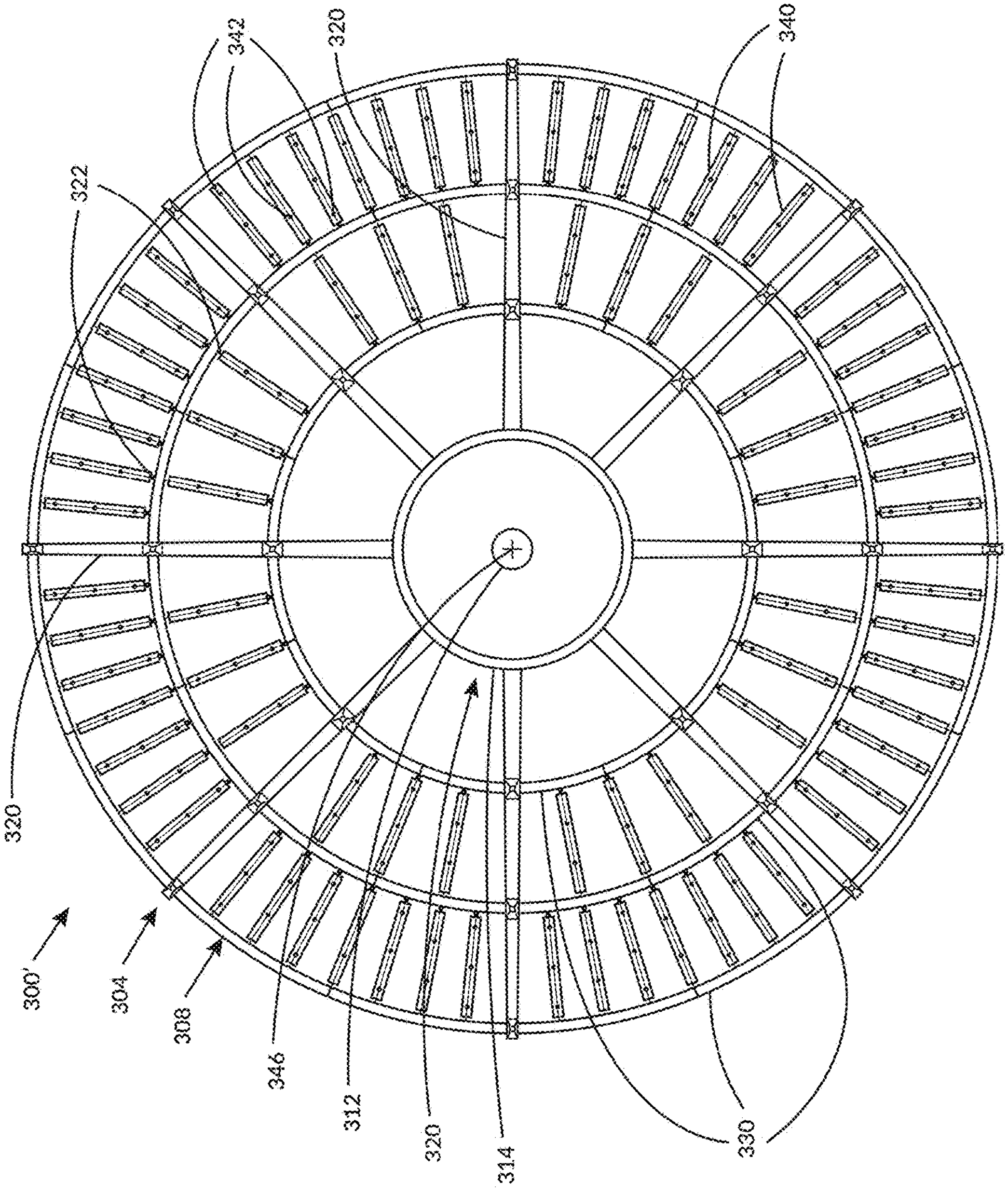

FIG. 3A is a front view of an emitter assembly 300, which may be described as an example of the emitter assembly 140 of FIG. 1, while FIG. 3B is a rear view of the emitter assembly 300. Specifically, FIG. 3A may be described as illustrating a concave first side 302 of the emitter assembly 300, while FIG. 3B may be described as illustrating a convex second side 304 of the emitter assembly 300. FIG. 3A also may be described as an upwind view of the emitter assembly 300 and FIG. 3B also may be described as a downwind view of the emitter assembly 300.

As shown in FIGS. 3A-3B, the emitter assembly 300 includes a support structure 306 with a central hub 310 and a plurality of support masts 320 extending radially away from the central hub 310. The support masts 320 support one or more rims 330 of the support structure 306 that are concentrically positioned with respect to the central hub 310. The rims 330 support a plurality of distributor elements 340, each of which includes one or more nozzles 342 (shown in FIG. 3B) for emitting a reactant. The emitter assembly 300 also may include a plurality of spokes 322 supporting the distributor elements 340 between corresponding pairs of rims 330 and/or between a rim 330 and the central hub 310. In some examples, and as shown in FIG. 3B, each support mast 320 also may include one or more nozzles 342.

As shown in FIGS. 3A-3B, the central hub 310 includes an axle 312 extending along an emitter rotational axis 346 of the emitter assembly 300 and a drum 314 connected to the support masts 320. In some examples, the axle 312 may be stationary, and the drum 314 may be configured to rotate relative to the axle 312 about the emitter rotational axis 346. In such examples, the drum 314 may be joined to the axle 312 via a bearing assembly. In other examples, the drum 314 may be fixedly coupled to the axle 312 such that the axle 312 and the drum 314 rotate together about the emitter rotational axis 346.

As described in more detail below, the central hub 310 can operate to convey the reactant to the nozzles 342, such as via a rotary coupling that fluidly couples a conduit through the axle 312 to conduits in the support masts 320.

In various examples, the spokes 322, the distributor elements 340, and/or the nozzles 342 may be described as being arranged in a series of concentric emitter bands. For example, the emitter assembly 300 may be described as including a first emitter band 350 nearest to the central hub 310, a second emitter band 352 radially exterior to the first emitter band 350, and a third emitter band 354 radially exterior to the second emitter band 352. Each pair of radially adjacent emitter bands may be separated by a corresponding rim 330. In this manner, the rims 330 may be described as at least partially defining the radial extent of the emitter bands. As described in more detail below, arranging the nozzles 342 in concentric emitter bands can allow for maintaining a number density of nozzles per unit of emitter swept area to be constant, substantially constant, or increased, as the diameter of the emitter assembly 300 is increased. Additionally, as the diameter of the emitter assembly 300 is increased, a tangential velocity of the radially outermost nozzles increases correspondingly during operative use of the emitter assembly 300, thereby promoting mixing of the reactant with the downwind airflow. Accordingly, configuring the emitter assembly 300 such that a number density of nozzles per unit of emitter swept area increases with increasing radial distance from the emitter rotational axis 346 can further enhance mixing of the reactant with the downwind airflow. By contrast, if the nozzles were instead arranged only on support masts 320 or spokes 322 that all extend fully to the central hub 310, the number density of nozzles per unit area would rapidly diminish toward the radially outermost portions of the emitter assembly 300.

FIG. 3A' is a front view of an emitter assembly 300', while 3B' is a rear view of the emitter assembly 300'. The emitter assembly 300' is identical to the emitter assembly 300 of FIGS. 3A-3B with the exception that the emitter assembly 300' does not include any distributor elements 340 positioned between the central hub 310 and the innermost rim 330. This central region of the emitter assembly 300' has a limited reactant dispersal capacity as a result of its relatively low tangential velocity and correspondingly low whirl of reactant emitted from such a region. Such a region thus supports limited interaction between the reactant and the incoming wind relative to the outer emitter bands. Accordingly, the first emitter band 350 of distributor elements 340 as shown in FIGS. 3A-3B may be omitted with a relatively small impact on the operational characteristics of the emitter assembly 300'. Additionally, or alternatively, and as described above in the context of FIG. 2B', such open configuration may promote a relatively high wind flow through the central region of the emitter assembly 300' to entrain reactant particles and radially expand the reactant plume of the outer bands, enhancing mixing dynamics for enhanced reaction in the downwind wake structure.

In general, the radially innermost band of distributor elements 340 of a given example of an emitter assembly 300 may be described as the first emitter band 350. Thus, for example, the first emitter band 350 of the emitter assembly 300 of FIGS. 3A-3B includes the distributor elements 340 positioned between the central hub 310 and the radially innermost rim 330, while the first emitter band 350 of the emitter assembly 300' of FIGS. 3A'-3B' includes the distributor elements 340 positioned between the two radially innermost rims 330.

Each nozzle 342 may be configured to emit the reactant with any suitable dispersal properties. For example, each nozzle 342 may be configured to emit the reactant in a spray-cone pattern. Each nozzle 342 also may be configured to aerosolize the reactant exiting the nozzle 342 and/or to emit the reactant with any of a variety of reactant particle sizes. Examples of particle sizes of the reactant emitted by each nozzle 342 include at least 1 micron (μm), at least 5 μm, at least 10 μm, at least 15 μm, at least 20 μm, at least 30 μm, at least 50 μm, at least 100 μm, at most 150 μm, at most 75 μm, at most 40 μm, at most 25 μm, at most 17 μm, at most 12 μm, at most 7 μm, and/or at most 2 μm. As a more specific example, the particle sizes of the reactant emitted by each nozzle 342 may be at least 10 μm and at most 150 μm. In particular, with low airspeed velocities of the incident airflow, relatively small reactant particle sizes (e.g., approximately 5 μm) can form a fine mist that will drift for larger distances than larger droplets but be subject to great evaporation in low humidity and higher temperature conditions. Alternatively, relatively large reactant particle sizes (e.g., 30-50 μm) can be emitted into higher temperature, lower humidity atmospheric conditions for effective $CO_2$ reaction before evaporation. Other factors that can influence particle size selection can include fluid viscosity, particle surface area advantage in reaction with $CO_2$, sink rate, and particle coalescence.

In some examples, the emitter assembly 300 may include nozzles 342 that are configured to emit the reactant in different manners from one another, such as with different reactant particle sizes. In particular, in some examples, each emitter band may be configured such that all nozzles 342 in a given emitter band emit the reactant with the same or similar reactant particle sizes (or particle size distributions) and such that nozzles 342 in different emitter bands are characterized by different reactant particle sizes (or particle size distributions).

In some such examples, the emitter assembly 300 may be configured such that the reactant is selectively delivered to the emitter bands with respective flow rates, and/or only delivered to selected emitter bands, such as to emit the reactant with particle sizes that are configured for the atmospheric conditions in which the emitter assembly 300 operates. For example, such atmospheric conditions can change diurnally, seasonally, etc. Also, as emitter band diameter increases, the air velocity across the nozzles increases, which can present a further factor to be reflected in the configuration of the emitter assembly 300. For example, the increased air velocity across the nozzles of the radially outermost emitter bands may allow for the reactant to be emitted from such nozzles with relatively higher flow rates compared to the radially innermost emitter bands.

Additionally, or alternatively, each emitter band may be configured such that all nozzles 342 in a given emitter band emit the reactant with the same or similar flow rate and such that nozzles 342 in different emitter bands emit the reactant with different flow rates. In some examples, the flow rate associated with a given nozzle 342 may be enhanced by suction generated by the passing airflow via the Bernoulli principle, which can reduce a necessary pumping energy to achieve a desired flow rate and enhance the aerosol particles to $CO_2$ molecule reaction in the airflow.

In some examples, each nozzle 342 may be configured to emit the reactant with a particle size, or particle size distribution, that is fixed. In other examples, each nozzle 342 may be configured to emit the reactant with a variable particle size or particle size distribution. In the present disclosure, the term "particle size distribution" may be understood as referring to a range of particle sizes produced by a nozzle 342. The particle size distribution may be characterized in any suitable manner, such as any suitable statistical metric characterizing the particle sizes in the distribution.

While FIGS. 3A-3B illustrate an example in which the emitter assembly 300 includes three emitter bands, this is not required of all examples. In other examples, the emitter assembly 300 can include more than three emitter bands or fewer than three emitter bands. In this manner, the size of the emitter assembly 300 may be scaled in size and/or capacity by varying the number of emitter bands.

Additionally, and as shown in FIG. 3B, the emitter assembly 300 may be configured such that a number density of distributor elements 340 and/or of nozzles 342 per unit of emitter swept area remains substantially constant, or approximately constant, as the size of the emitter assembly 300 is scaled. In particular, in this example, each successive emitter band includes a greater number of distributor elements 340 and nozzles 342 than the next smallest emitter band, which are distributed over the increased circumference of the larger emitter band. In the example of FIGS. 3A-3B, the first emitter band 350 includes eight distributor elements 340, while the second emitter band 352 includes twenty-four distributor elements 340 and the third emitter band 354 includes fifty-six distributor elements 340.

In various examples, as the number of emitter bands is increased beyond three, the ratio of the number of distributor elements 340 in any given emitter band to the number of distributor elements 340 in the next smallest emitter band may tend toward a common proportion (e.g., 2:1, 3:1, etc.). Such a linear (or approximately linear) increase in the number of distributor elements 340 and/or nozzles 342 per emitter band may be described as following the approximately linear increase in the area of annular regions of constant thickness as the overall radius of the annular regions are increased. As a result, such a configuration can allow for a generally constant number density of distributor elements 340 and/or of nozzles 342 per unit of emitter swept area as the overall diameter of the emitter assembly 300 is scaled up by the addition of emitter bands.

In this manner, the emitter assembly 300 may be described as being configured such that each emitter band includes a number of distributor elements 340 that is positively correlated to a radial distance separating the emitter band and the emitter rotational axis 346. Stated different, the emitter assembly 300 is configured such that each emitter band other than the radially innermost emitter band includes a greater number of distributor elements 340 than the next smallest emitter band. As described above, the ratio of the number of distributor elements 340 in any given emitter band to the number of distributor elements 340 in the next smallest emitter band may tend toward a common proportion that is greater than 1:1.

In other examples, the number density of distributor elements 340 and/or of nozzles 342 per unit of emitter swept area may increase with increasing radial distance from the emitter rotational axis 346. In such examples, the ratio of the number of distributor elements 340 in any given emitter band to the number of distributor elements 340 in the next smallest emitter band may increase with increasing emitter band diameter. As described above, such a configuration may further enhance mixing of the reactant with the downwind airflow as a result of the increased airflow over the outermost nozzles 342.

Figure 3D:
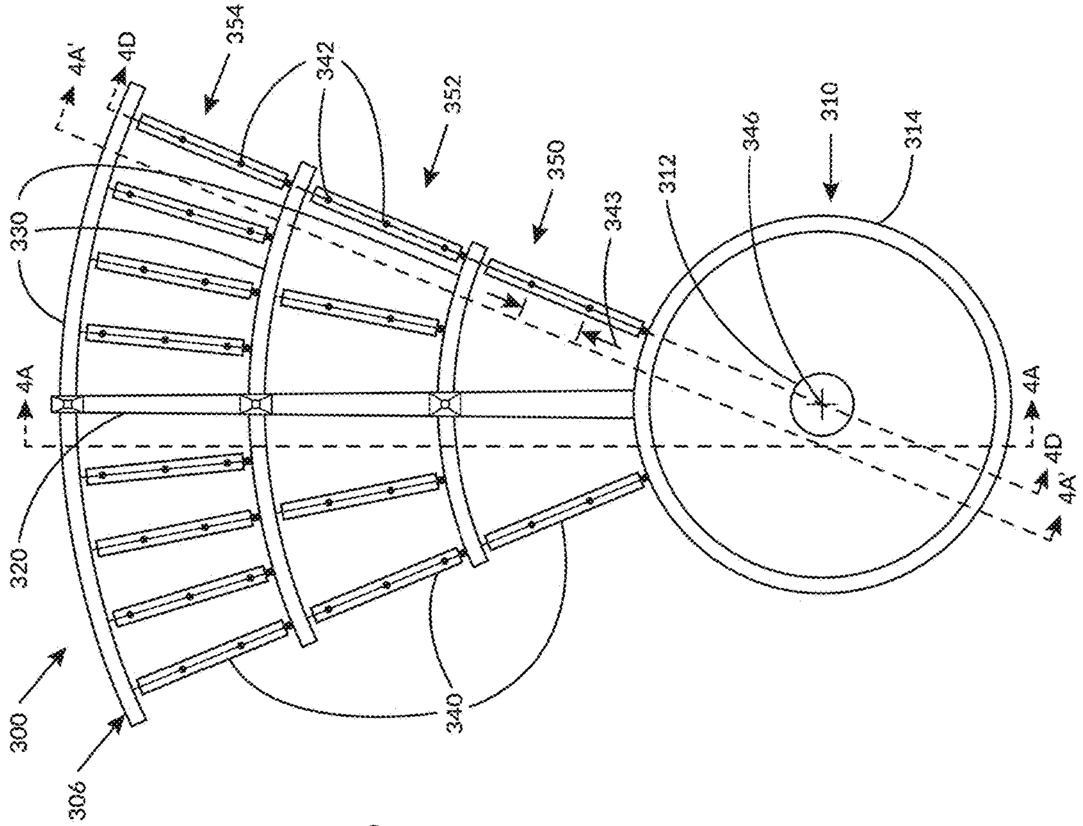
FIG. 3D is a rear view of the portion of the emitter assembly shown in FIG. 3C with distributor elements in a feathered configuration according to an example.
Figure 3C:
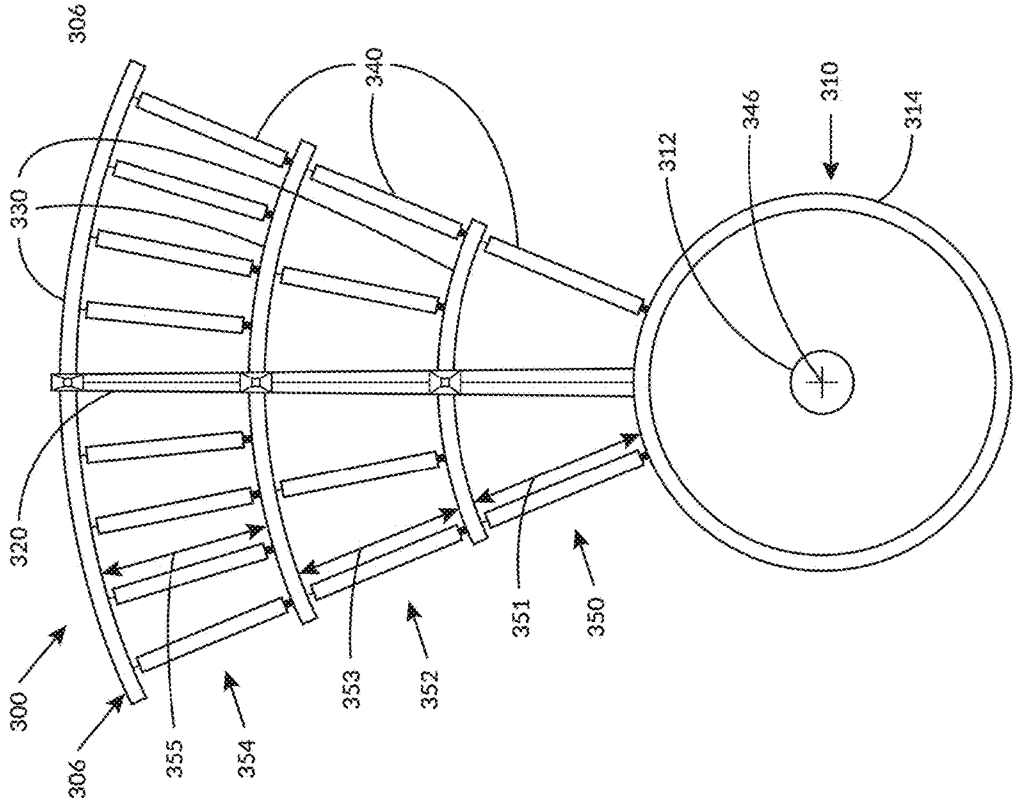
FIG. 3C is a front view of a portion of the emitter assembly of FIGS. 3A-3B.

FIGS. 3C-3D are more detailed views of a portion of the emitter assembly 300 as viewed toward the downwind direction (FIG. 3C) and toward the upwind direction (FIG. 3D). FIGS. 3C-3D illustrate the manner in which, for a given angular extent of the emitter assembly 300, the increased perimeter length of each rim 330 allows for a correspondingly larger number of distributor elements 340 to be positioned in each emitter band. Specifically, as shown the number of distributor elements 340 of each emitter band approximately doubles between each pair of radially adjacent emitter bands.

Additionally, and as shown in FIG. 3D, the distributor elements 340 may be configured such that the positions of the nozzles 342 vary between different distributor elements. In particular, in this example, the nozzles 342 of azimuthally adjacent distributor elements 340 are radially staggered relative to one another, with some distributor elements 340 including two nozzles 342 and other distributor elements 340 include three nozzles 342. Such a configuration may facilitate distributing the nozzles 342 with a roughly constant number density per unit of emitter swept area across a region of the emitter assembly 300 (e.g., within an emitter band and/or across different emitter bands), thus enhancing the uniformity of the plume of reactant emitted from the emitter assembly 300.

FIGS. 3C-3D additionally illustrate various dimensions of the modular emitter assembly 300 that may be configured as a structural unit with all necessary operating systems integrated including reactant conduits and electric/hydraulic power for pitching the distributor elements according to various applications and/or needs. These structural units assemble to make the complete emitter structure and operating systems. For example, each emitter band may be characterized by a radial distance separating the radially adjacent rims 330 defining the emitter band. More specifically, and as shown in FIG. 3C, the first emitter band 350 may have a first band gap distance 351, the second emitter band 352 may have a second band gap distance 353, and the third emitter band 354 may have a third band gap distance 355. Each of the first band gap distance 351, the second band gap distance 353, and the third band gap distance 355 may be measured along a direction that minimizes the measured distance between the rims 330. Thus, as a result of the dished shape of the emitter assembly 300, such band gap distances may be measured along directions that are not parallel to one another.

In some examples, the first band gap distance 351, the second band gap distance 353, and the third band gap distance 355 may be equal to one another. This is not required of all examples, however, and it additionally is within the scope of the present disclosure that the band gap distance can vary between emitter bands. For example, the band gap distances (and thus the lengths of the corresponding distributor elements 340) may vary between emitter bands to configure the number density of nozzles 342 per unit area in various regions of the emitter assembly 300.

Additionally, and as shown in FIG. 3D, the nozzles 342 of a distributor element 340 may be characterized by a nozzle separation distance 343, which similarly may be configured and/or varied to configure the number density of nozzles 342 per unit of emitter swept area in various regions of the emitter assembly 300. In this manner, the distribution and/or density of nozzles 342 may be configured through variation of the number of distributor elements 340 included in each emitter band, the band gap distance associated with each emitter band, and/or the nozzle separation distances 343. For example, the nozzle separation distance 343 may be configured to yield a high density of nozzles 342 across the emitter assembly 300 while avoiding nozzle spray-cone overlap. As discussed above, the nozzles 342 may emit a fixed particle size (or particle size distribution) or with a particle size (or particle size distribution) that may be selectively varied, such as via commands from a system controller.

Figure 3E:
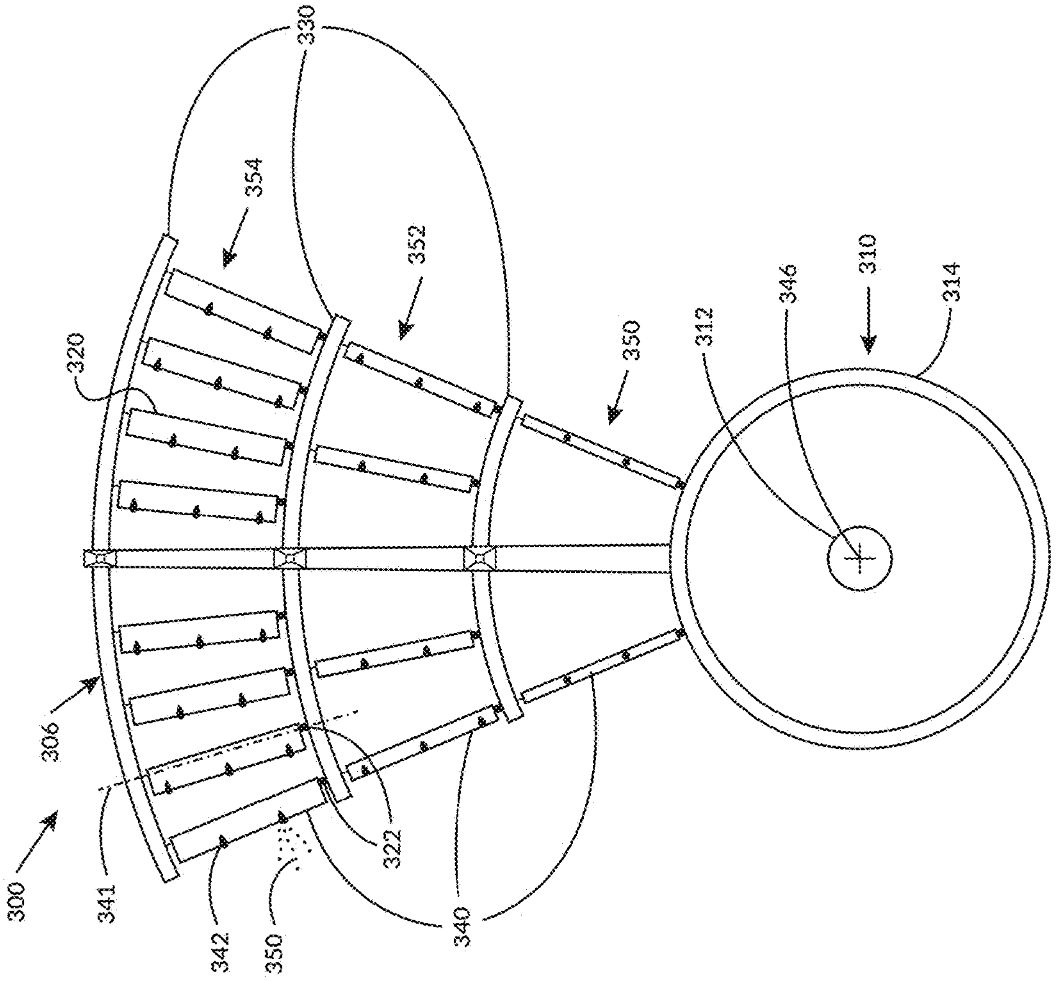
FIG. 3E is a rear view of the portion of the emitter assembly of FIG. 3D with selected distributor elements in a pitched configuration according to an example.

The distributor elements 340 may be configured to at least partially drive rotation of the emitter assembly 300 about an emitter rotational axis 346 when positioned in the path of an incident airflow. In particular, in various examples, and as illustrated in FIG. 3E, the distributor elements 340 may be configured to rotate about a radial axis to vary the orientation of the distributor elements 340 and/or of the nozzles 342 relative to the incident airflow. Specifically, as shown in FIG. 3E, each distributor element 340 may be configured to rotate (e.g., pitch) about a corresponding distributor element axis 341, which may be parallel to a longitudinal axis of the distributor element 340. Rotating the distributor elements 340 with respect to the direction of the incident airflow can cause the distributor elements 340 to collectively exert a torque on the emitter assembly 300 to aerodynamically drive rotation of the emitter assembly 300 about the emitter rotational axis 346.

The rotation of the emitter assembly 300 about the emitter rotational axis 346 can enhance the dispersal of the reactant from the emitter assembly 300 in a variety of manners. For example, and as discussed above in the context of FIG. 2C, the rotation of the emitter assembly 300 can introduce emitter wake vortices that operate to enhance mixing of the reactant with the surrounding airflow. Additionally, the rotation of the emitter assembly 300 can increase the air flow over the nozzles 342 for earlier reactant particle contact with a greater number of carbon dioxide molecules relative to a stationary emitter assembly.

As shown in FIG. 3E, the spoke 322 supporting each distributor element 340 may extend along the corresponding distributor element axis 341. In the present disclosure, a rotational orientation of each distributor element 340 also may be referred to as a pitch of the distributor element 340. Similarly, rotation of the distributor elements 340 may be referred to as pitching of the distributor elements 340. As described in more detail below, each distributor element 340 may be shaped as an airfoil and thus also may be referred to as a blade 340.

Figure 5A:
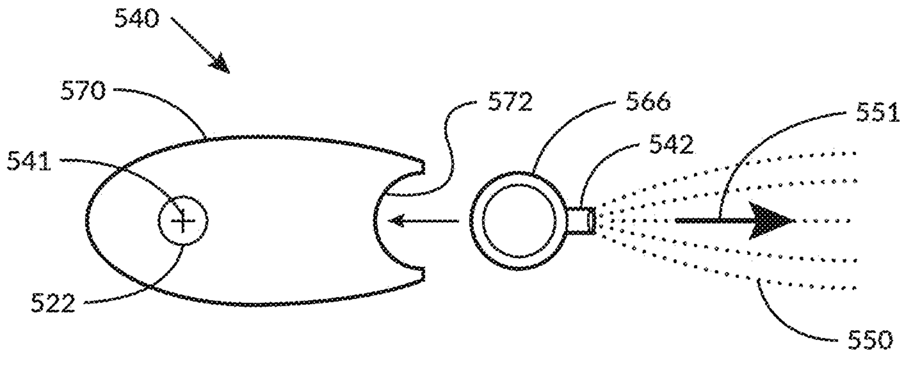
FIG. 5A is an end view of a distributor element including a removable nozzle manifold removed from a remainder of the distributor element according to an example.
Figure 5B:
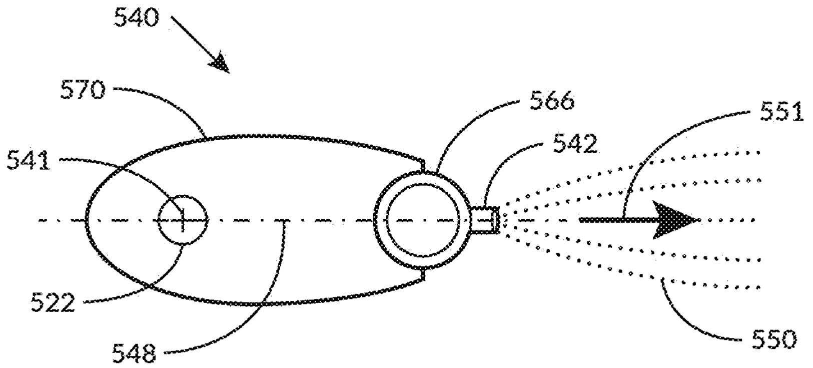
FIG. 5B is an end view of the distributor element of FIG. 5A with the nozzle manifold operatively installed in the remainder of the distributor element.

Additionally, alternatively, the rotational orientation of each distributor element 340 may be characterized by a pitch angle of the distributor element 340. Specifically, in the present disclosure, the pitch angle of a distributor element 340 corresponds to an angle formed between a chord line of the distributor element 340 (e.g., as shown in FIGS. 5A-5B below) and the emitter rotational axis 346 when the chord line is projected onto a plane containing the emitter rotational axis 346. In this manner, FIG. 3D may be described as an example in which each distributor element 340 has a pitch angle of zero.

In various examples, the distributor elements 340 of each emitter band may be configured to pitch in unison with one another. Stated differently, the emitter assembly 300 may be configured such that the distributor elements 340 of each emitter band are characterized by a common pitch angle. In this manner, each emitter band may be described as having collective pitch control of the distributor elements 340 in the emitter band.

In some such examples, and as shown in FIG. 3E, the emitter assembly 300 may be configured such that the distributor elements 340 different emitter bands may be pitched by different respective pitch angles. For example, and as shown in FIG. 3E, the distributor elements 340 of the innermost first emitter band 350 may be characterized by a lower pitch angle than the distributor elements 340 of the outermost third emitter band 354.

During operative use of the emitter assembly 300, the pitch angles of the distributor elements 340 may be configured and/or varied to enhance operation of the emitter assembly. For example, the pitch angles may be selected to increase and/or maximize a rotational torque of the emitter assembly 300 for a given wind speed of the incident airflow. Additionally, or alternatively, the collective pitch control of the emitter bands can be used to at least partially control a form of the reactant plume emitted by the emitter assembly 300. In practice, the pitch angles of the distributor elements 340 may be selected to balance the torque production of the emitter assembly 300 and the velocity of the air passing across the nozzles for CDR capacity.

The emitter assembly 300 may be configured to rotate the distributor elements 340 (and/or the emitter bands thereof) to selected pitch angles in any of a variety of manners. For example, the distributor elements 340 may be fixedly coupled to the corresponding spokes 322, and the emitter assembly 300 may operate to drive rotation of the spokes, such as with an emitter drivetrain motor. In other examples, the pitching rotation of the distributor elements 340 may be at least partially driven by wind forces and/or by nozzle jet reaction forces.

Figure 3F:
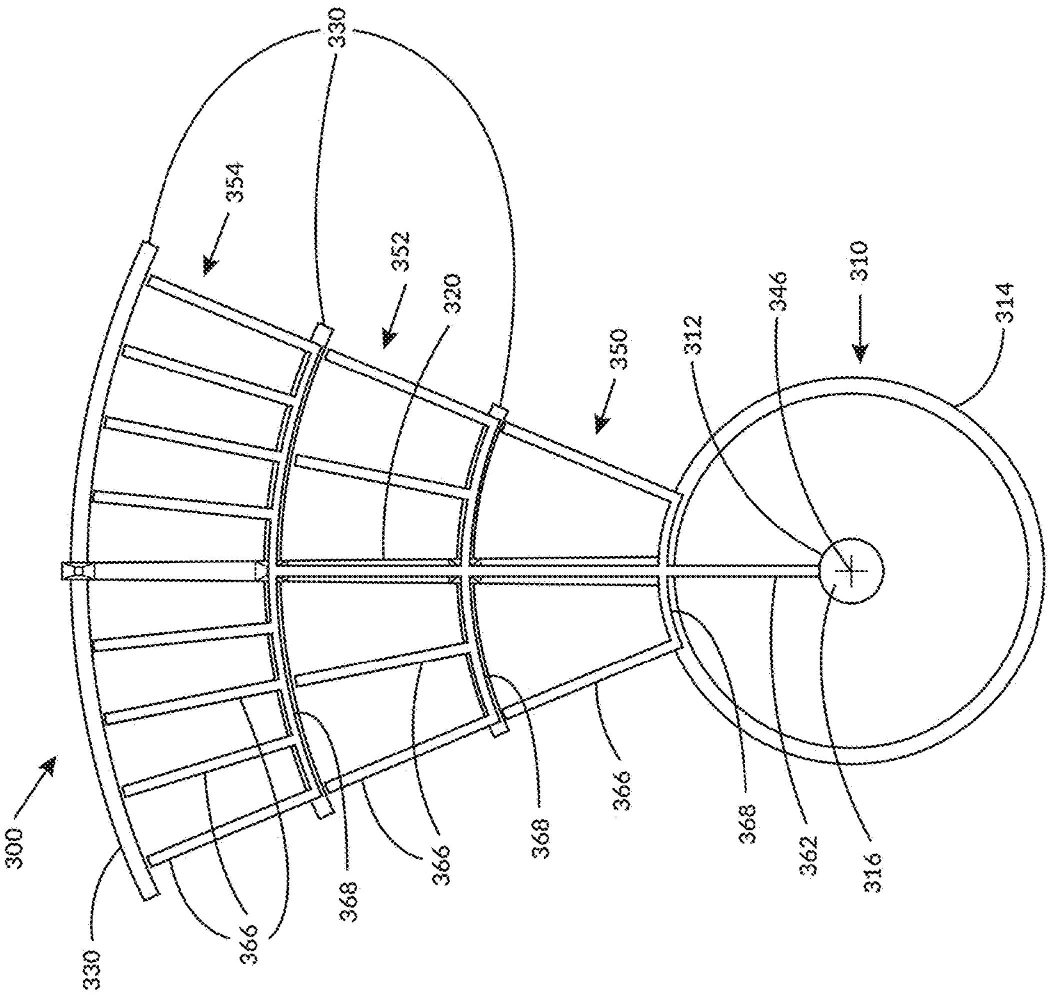
FIG. 3F is a schematic representation of a system of fluid conduits of a portion of an emitter assembly according to an example.

FIG. 3F illustrates a series of fluid conduits of the emitter assembly 300 for distribution of a reactant through the emitter assembly 300. As shown in FIG. 3F, the emitter assembly 300 includes a primary supply conduit 316 extending through the central hub 310 (e.g., through the axle 312), which feeds a mast supply conduit 362 extending through the support mast 320. The mast supply conduit 362 feeds a plurality of branch feeder conduits 368, each of which extends through and/or along a corresponding rim 330. Each branch feeder conduit 368 feeds a plurality of nozzle manifolds 366, each of which feeds one or more corresponding nozzles 342.

FIGS. 3C-3F also may be described as illustrating aspects of a modular configuration of the emitter assembly 300 and/or of the emitter assembly 300'. In particular, each of FIGS. 3C-3F may be described as illustrating a portion of the corresponding emitter assembly 300/300' that may be shipped as a pre-assembled modular unit for ease of shipping and field assembly. In some examples, and as shown in FIGS. 3C-3F, at least one such modular unit can include one or more components of the central hub 310 that are shared by other modular units that do not themselves include such components of the central hub 310.

Additionally, or alternatively, the emitter assembly 300 may be configured and/or assembled in a modular manner through the selective addition of radial extensions to increase the number of emitter bands of the emitter assembly 300. For example, through the addition of mast segments of the support masts 320 and additional rims 330, the support structure 306 can be expanded to support additional bands of distributor elements 340. As discussed herein, each successively added emitter band can add a number of distributor elements 340 and/or of nozzles 342 in proportion to the number of distributor elements 340 and/or of nozzles 342 of the next innermost emitter band (e.g., four times the number of the next innermost band). Such a configuration can allow for the emission capacity of the emitter assembly 300 to scale with the area of the emitter assembly 300 rather than with its diameter, allowing for operation in a wide variety of use cases via the modular configuration of the emitter bands.

FIGS. 4A-4D illustrate aspects of a support mast 420 of a support structure 406 of an emitter assembly 400 and associated structures. The emitter assembly 400 of FIGS. 4A-4D may share any applicable components, characteristics, features, attributes, etc. with the corresponding structures of FIGS. 3A-3F. The support mast 420 and other such components of FIGS. 4A-4D that share names with similar components of the emitter assembly 300 thus may be understood as corresponding to, and/or as representing examples of, the analogous components of the emitter assembly 300.

Figure 4A:
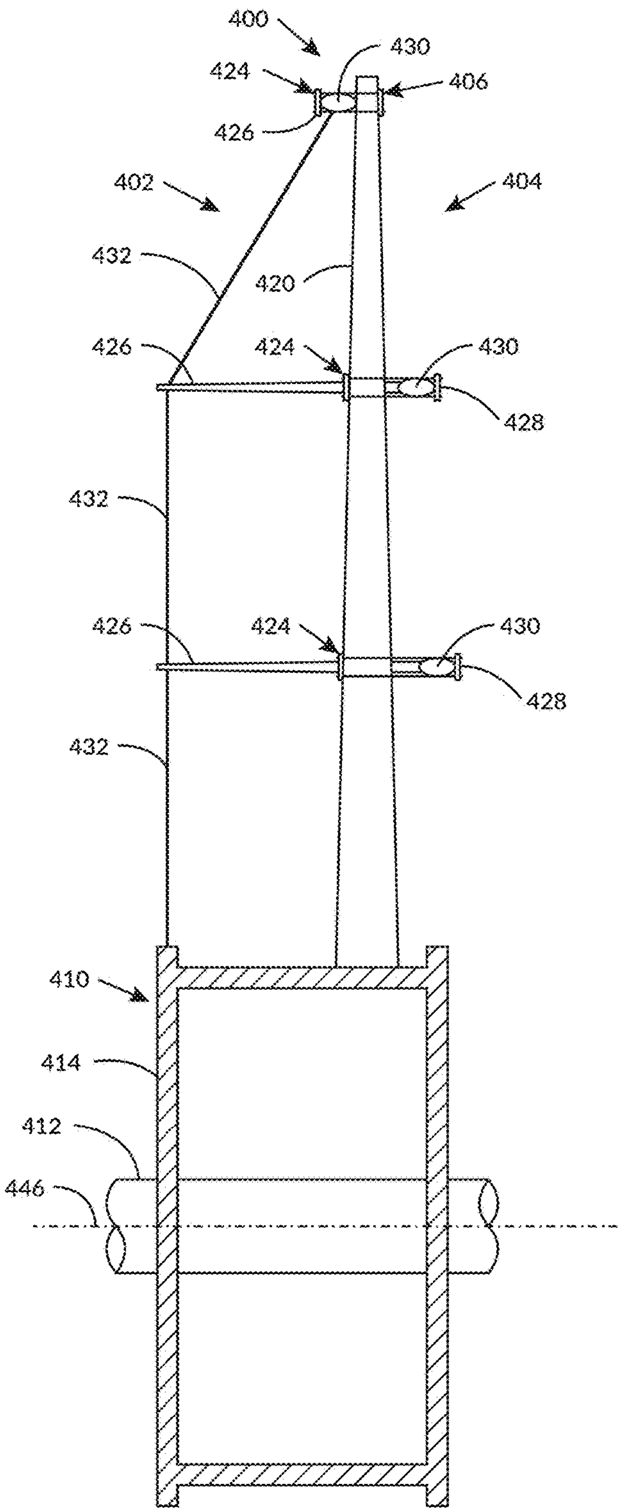
FIG. 4A is a side view of a portion of an emitter assembly of as viewed along the line 4A-4A in FIG. 3D according to an example.
Figure 4A:
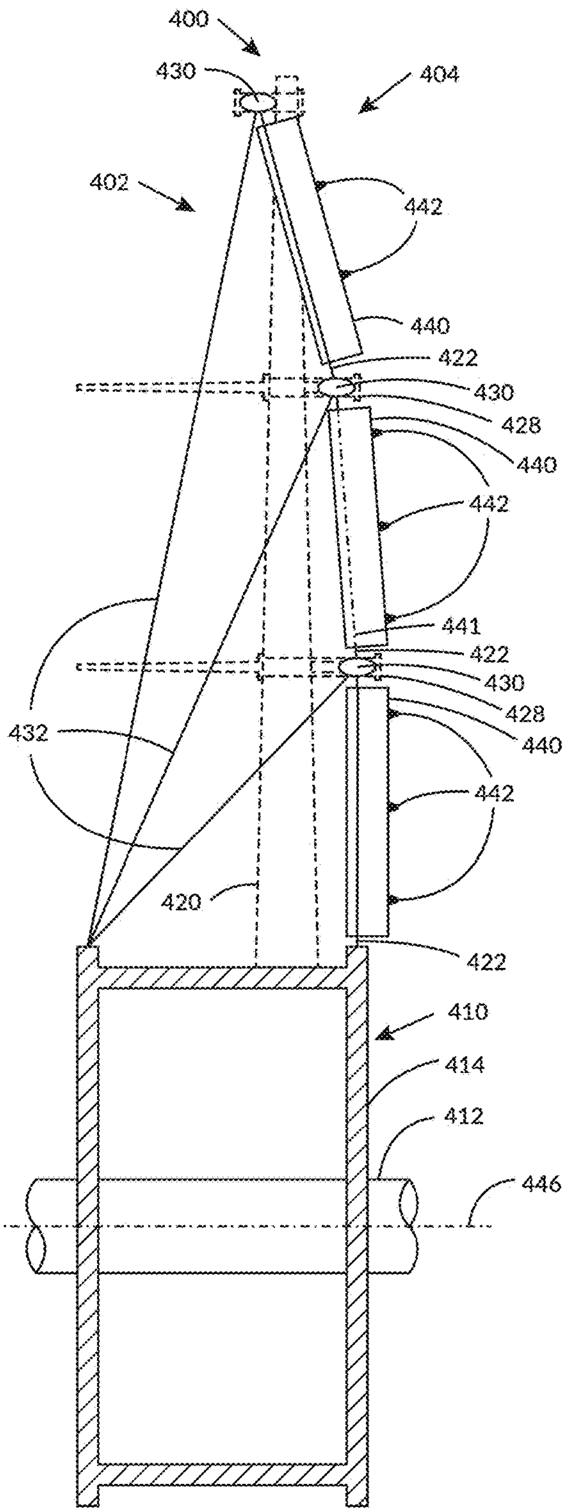

FIG. 4A illustrates a side view of a portion of the emitter assembly 400 corresponding to the line 4A-4A of FIG. 3D, while FIG. 4A' illustrates a side view of a portion of the emitter assembly 400 corresponding to the line 4A'-4A' of FIG. 3D. FIG. 4A' illustrates a plurality of distributor elements 440 supported by corresponding rims 430 of the support structure 406. The support mast 420 of FIG. 4A is represented in dashed lines in FIG. 4A'.

FIGS. 4A-4A' illustrate the support mast 420 extending radially away from a central hub 410. As shown in FIG. 4A, the emitter assembly 400 additionally includes a plurality of mast connectors 424 coupled to the support mast 420 and to rims 430 of the emitter assembly 400. In particular, the mast connectors 424 may operate to operatively couple the rims 430 to the support mast 420.

As shown in FIG. 4A, each mast connector 424 can include a fore spreader 426 extending away from the support mast 420 in an upwind direction and/or an aft spreader 428 extending away from the support mast 420 in a downwind direction. As shown in FIG. 4A', the central hub 410 and/or the rims 430 can support spokes 422 of the emitter assembly 400 that extend between adjacent rims 430 and/or between a rim 430 and the central hub 410 and that support distributor elements 440 thereon. As shown in FIG. 4A, one or more of the mast connectors 424 can operate to space the corresponding rims 430 apart from the support mast 420 on a first side 402 or on a second side 404 of the emitter assembly 400. Accordingly, the mast connectors 424 also can be described as effectively operating to space the distributor elements 440 apart from the support mast 420 on the first side 402 and/or on the second side 404 of the emitter assembly 400.

Each mast connector 424 can operate to define an axial position of the corresponding rim 430 relative to the support mast 420 at the radial position at which the mast connector 424 is coupled to the support mast 420. In this manner, the mast connectors 424 can operate to position the rims 430 in a configuration that yields a dished shape of the support structure 406. Specifically, in the example of FIG. 4A, mast connectors 424 positioned increasingly far from the central hub 410 support the corresponding rims 430 at positions that are increasingly axially displaced in the upwind direction (e.g., toward the first side 402 of the emitter assembly 400).

FIG. 4A' illustrates a side view of a portion of the emitter assembly 400 corresponding to the line 4A'-4A' of FIG. 3D. FIG. 4A' thus illustrates a plurality of distributor elements 440 supported by corresponding rims 430 of the support structure 406. The support mast 420 of FIG. 4A is represented in dashed lines in FIG. 4A'.

The spokes 422 can support the distributor elements 440 in any of a variety of manners. In some examples, each spoke 422 may extend through a full length of the corresponding distributor element 440 and/or may extend through multiple distributor elements 440 in different emitter bands. In particular, in the example of FIG. 4A', a single spoke 422 extends through each of the three distributor elements 440 that are supported by the illustrated rims 430. In other examples, separate spokes 422 may be coupled to the top and bottom of each distributor element 440. The spokes 422 can operate to support the rims 430 relative to one another to provide hoop strength to the dished structure of the emitter assembly 400. Each spoke 422 can include and/or be any of a variety of structures, such as a wire, a cable, a rod, etc.

In some examples, and as discussed above, the spokes 422 can be configured to allow the distributor elements 440 to rotate (e.g., pitch) relative to respective distributor element axes 441 along which the spokes 422 extend. For example, the distributor elements 440 may be configured to rotate with respect to the spokes 422, or the spokes 422 and the distributor elements 440 may be configured to rotate in unison.

Each spoke 422 may operate to exert a tension force between the aft spreaders 428 to which the spoke 422 is coupled, thus yielding a force to pull and/or bend the support mast 420 toward the second side 404. To counteract such a tension force, and as shown in FIGS. 4A-4A', the emitter assembly 400 may include one or more forestays 432 extending between the central hub 410, the fore spreaders 426, and/or the rims 430 to stabilize the support mast 420 and/or the rims 430. In some examples, one or more forestays 432 may be coupled to more than two fore spreaders 426. Additionally, or alternatively, one or more forestays 432 may be coupled to only two fore spreaders 426. As shown in FIGS. 4A-4A', one or more forestays may be connected to the central hub 410 and/or to a corresponding rim 430. Each forestay 432 can include and/or be any of a variety of structures, such as a wire, a cable, a rod, etc.

As shown in FIG. 4A, the fore spreader 426 and/or the aft spreader 428 of the mast connectors 424 can vary in length (e.g., in the fore-aft direction) along a radial extent of the support mast 420. For example, each radially outermost mast connector 424 may have a fore spreader 426 that is shorter than each other fore spreader 426 and/or an aft spreader 428 that is shorter than each other aft spreader 428 (or absent), such as to angle the corresponding forestays 432 and/or spokes 422 toward the radially outermost end of the support mast 420.

Figure 4C:
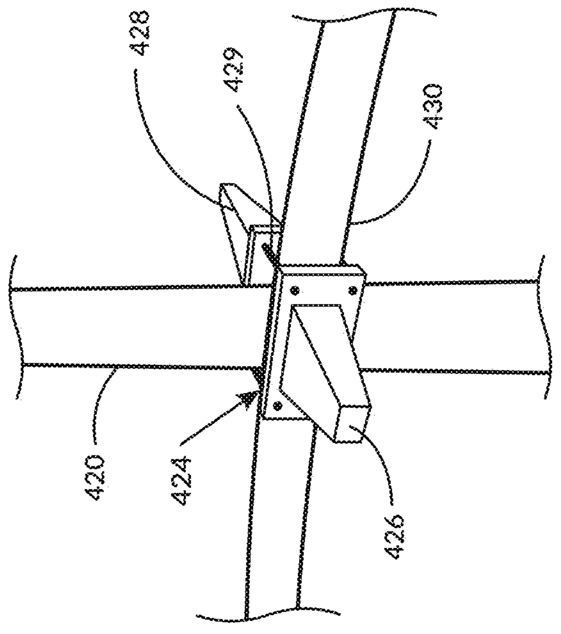
FIG. 4C is a perspective view of a mast connector of the emitter assembly of FIG. 4A operatively coupling a support mast and a rim according to an example.
Figure 4B:
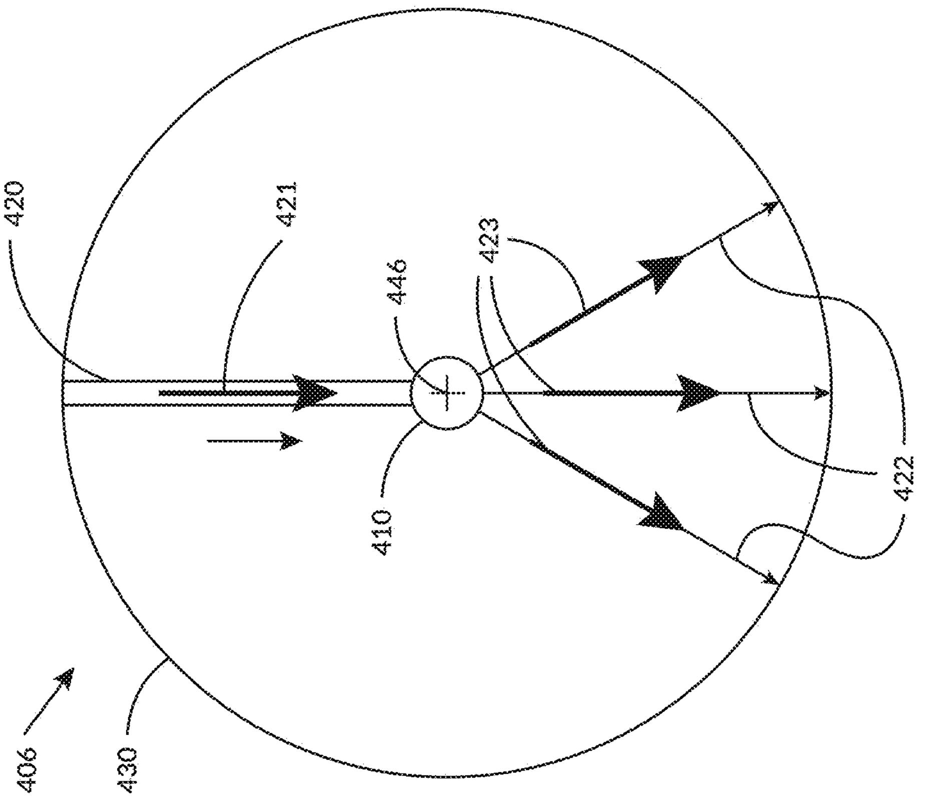
FIG. 4B is a schematic representation of compression and tension forces borne by components of the emitter assembly of FIG. 4A according to an example.

FIG. 4B schematically illustrates compression and tension forces that may be borne by various components of the support structure 406. For simplicity, FIG. 4B illustrates a single outermost rim 430 and a single representative support mast 420 extending between the central hub 410 and the rim 430 as well as three representative spokes 422 extending between the central hub 410 and the rim 430. It is to be understood, however, that the structure shown in FIG. 4B represents only a subset of the components of the support structure 406.

As shown in FIG. 4B, the mass of the support structure 406 exerts tension forces 423 on the spokes 422 and exerts a compressive force 421 on the support mast 420. The support mast 420 thus operates as a compression post to provide structural support and to bear a portion of the mass of the emitter assembly 400 that otherwise would be carried only by the spokes 422 extending below the central hub 410.

FIG. 4C illustrates an example of a mast connector 424 including a fore spreader 426 and an aft spreader 428 operatively coupled to a support mast 420 and to a rim 430. For clarity, the spokes 422 and the forestays 432 that would be coupled to the mast connector 424 are omitted from FIG. 4C.

As shown in FIG. 4C, the fore spreader 426 and the aft spreader 428 may be coupled to one another by a plurality of connector fasteners 429 (e.g., screws, bolts, etc.) such that the support mast 420 and the rim 430 extend between the fore spreader 426 and the aft spreader 428. In this manner, the mast connector 424 can operate to rigidly couple the support mast 420 and the rim 430 to one another.

Figure 4D:
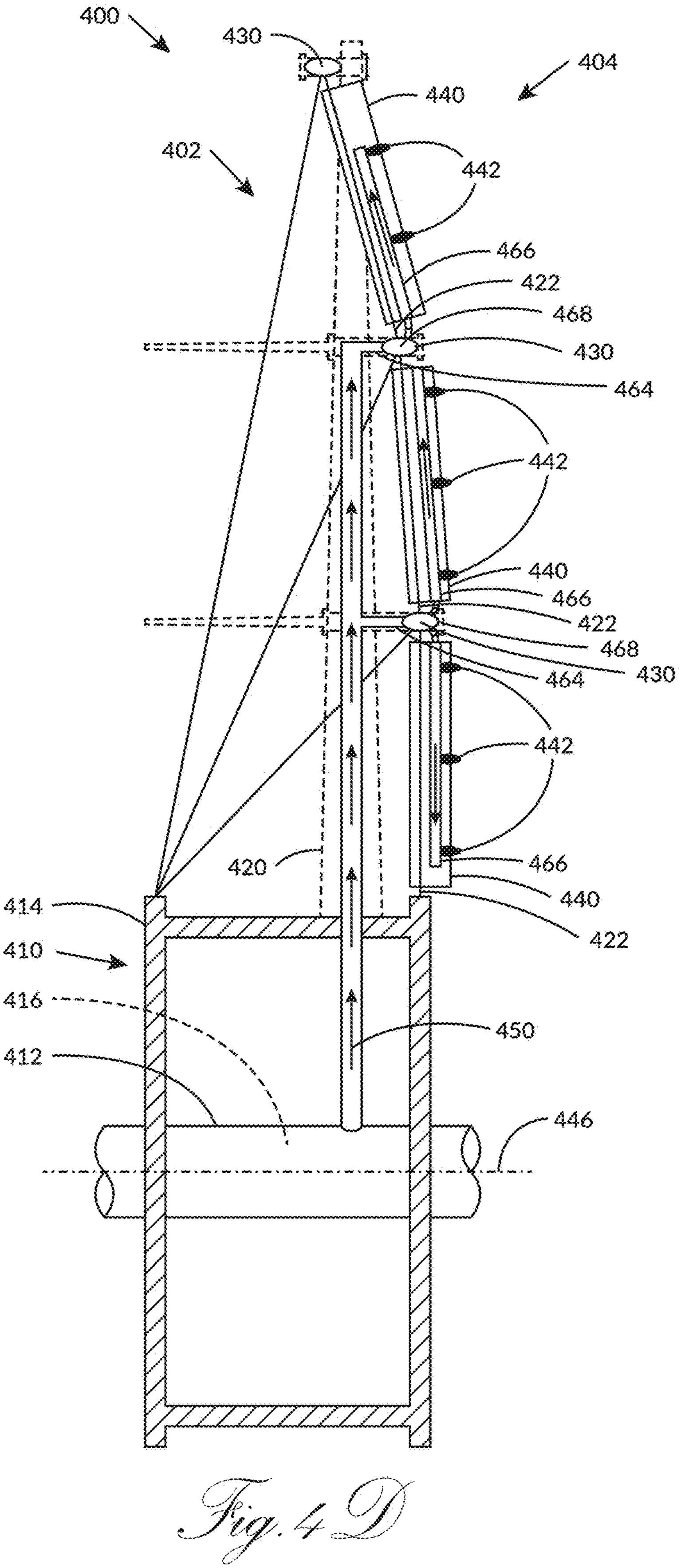
FIG. 4D is a cross-sectional view of the portion of the emitter assembly of FIG. 4A as viewed along the line 4D-4D of FIG. 3D.

FIG. 4D is a cross-sectional view of the structures of FIG. 4A' as viewed along a cut line corresponding to the cut line 4D-4D of FIG. 3D to illustrate a manner in which a flow of reactant 450 may be distributed to the nozzles 442 of the distributor elements 440. As shown in FIG. 4D, the emitter assembly 400 can include a primary supply conduit 416 that supplies the reactant 450 to each of the support masts 420 in the manner shown in FIG. 4D. The reactant 450 can flow from the primary supply conduit 416 to a mast supply conduit 462 associated with each support mast 420, which can extend through at least a portion of the corresponding support mast 420. Each distributor element 440 can include a corresponding nozzle manifold 466 for delivering the reactant 450 to each nozzle 442 of the distributor element 440, and the mast supply conduit 462 can be fluidly connected to each nozzle manifold 466. For example, and as shown in FIG. 4D, the nozzle manifolds 466 of the distributor elements 440 supported by the support mast 420 can be fluidly coupled to the mast supply conduit 462 via a corresponding branch feeder conduit 468. The mast supply conduit 462 also may be fluidly coupled to each of a plurality of rim supply conduits 464 extending through corresponding rims 430 to deliver the reactant 450 to the nozzle manifolds 466 of the remainder of the distributor elements 440 extending between the rims 430.

FIGS. 5A-5B illustrate an example of a distributor element 540, which may represent an example of the distributor elements 340 and/or the distributor elements 440 discussed above. In particular, FIGS. 5A-5B illustrate the distributor element 540 as viewed along a distributor element axis 541 about which the distributor element 540 is configured to rotate. The distributor element axis 541 also may be described as representing, or as extending parallel to, a longitudinal axis of the distributor element 540. FIGS. 5A-5B also illustrate a spoke 522 extending along the distributor element axis 541 through the distributor element 540. In the example of FIGS. 5A-5B, the distributor element 540 is shaped as an airfoil with a cross-sectional profile that extends along a chord line 548.

As shown in FIGS. 5A-5B, the distributor element 540 can include a distributor body 570 that is configured to be selectively coupled to a nozzle manifold 566 that includes one or more nozzles 542. Each nozzle 542 can be configured to emit a spray cone of reactant 550 along (e.g., centered on) a nozzle dispersal direction 551. As shown in FIG. 5B, the nozzle dispersal direction 551 may be parallel to and/or collinear with the chord line 548.

As shown in FIG. 5A, the distributor body 570 may include a manifold receiver 572 that receives at least a portion of the nozzle manifold 566 when the nozzle manifold 566 is operatively coupled to the distributor body 570 (as shown in FIG. 5B). In some examples, the nozzle manifold 566 may be configured to be selectively and repeatedly coupled to and removed from the distributor body 570, such as to service and/or replace the nozzles 542. As shown in FIG. 5B, the distributor body 570 can operate to space the nozzle manifold 566 apart from the distributor element axis 541 along the chord line 548.

Figure 5C:
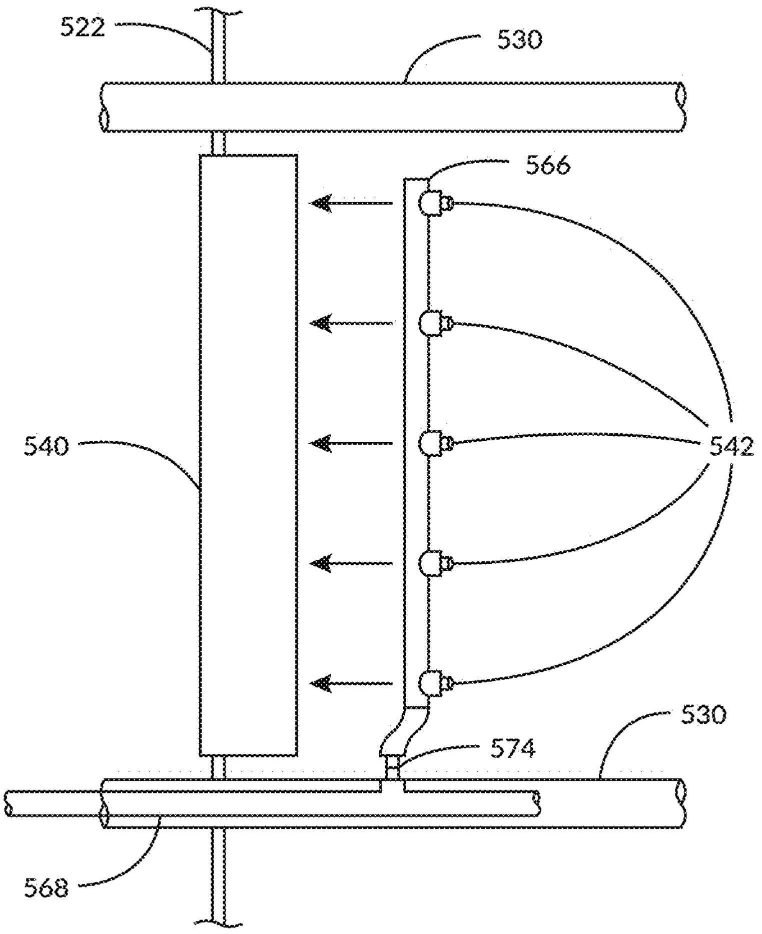
FIG. 5C is a side view of the nozzle manifold of FIGS. 5A-5B with the nozzle manifold removed from the remainder of the distributor element.

FIG. 5C illustrates the nozzle manifold 566 of FIGS. 5A-5B fluidly coupled to a branch feeder conduit 568 extending through a rim 530, which may represent any of the rims 330 of FIGS. 3A-3E and/or any of the rims 430 of FIGS. 4A-4D. In the example of FIG. 5C, the nozzle manifold 566 includes five nozzles 552 and is fluidly coupled to the branch feeder conduit 568 via a quick disconnect coupling 574. The quick disconnect coupling 574 can allow the nozzle manifold 566 to be selectively and repeatedly coupled to and removed from the rim 530 and/or the branch feeder conduit 568, such as to allow for replacement of the nozzles 542. In some examples, the quick disconnect coupling 574 can include and/or be a flexible element, such as a flexible tube, such as to allow for motion of the nozzle manifold 566 relative to the rim 530 and/or the branch feeder conduit 568 as the distributor element 540 is pitched.

Figure 5D:
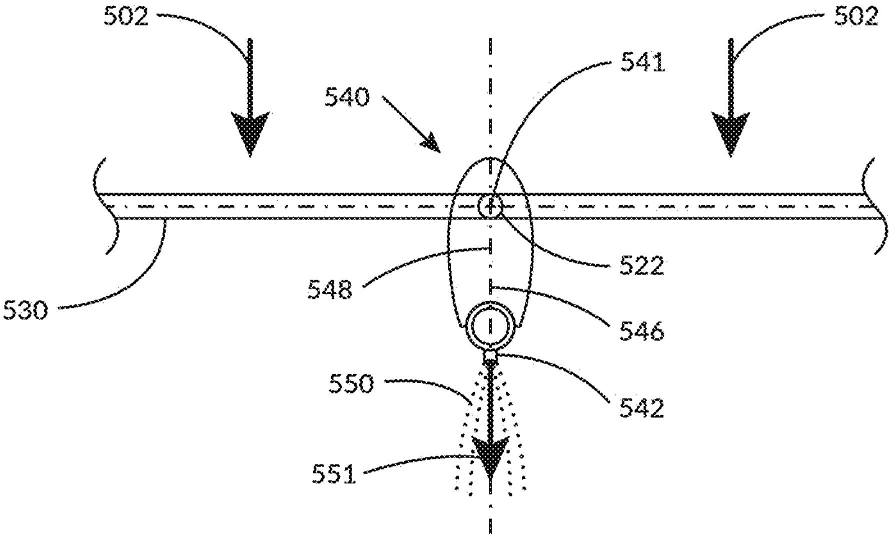
FIG. 5D is an end view of the distributor element of FIG. 5A operatively coupled to a rim and in a feathered configuration according to an example.
Figure 5E:
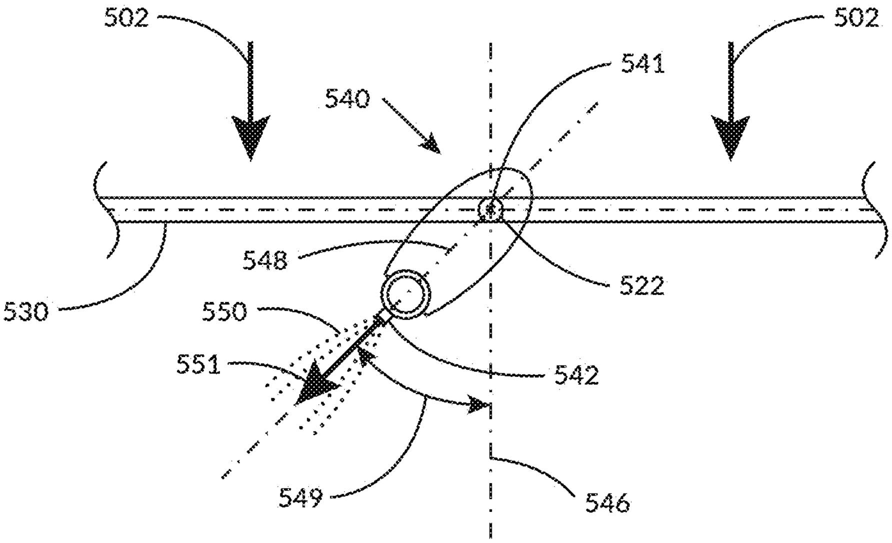
FIG. 5E is an end view of the distributor element of FIGS. 5A and 5D in a pitched configuration according to an example.

FIGS. 5D-5E illustrate a manner in which the distributor element 540 may pitch during operation of an emitter assembly including the distributor element 540. Specifically, FIGS. 5D-5E illustrate the distributor element 540 as viewed along the distributor element axis 541. As shown in FIGS. 5D-5E, the distributor element 540 is supported by the rim 530 via a spoke 522 extending along the distributor element axis 541.

FIG. 5D illustrates the distributor element 540 in a rotational configuration in which the chord line 548 is parallel to a projected emitter rotational axis 546 of the emitter assembly. For simplicity, because the distributor element axis 541 may not be perpendicular to the emitter rotational axis of the emitter assembly, the projected emitter rotational axis 546 of FIGS. 5D-5E represents a projection of the emitter rotational axis of the emitter assembly onto a plane perpendicular to the distributor element axis 541.

In the configuration of FIG. 5D, which also may be referred to as a feathered configuration, the distributor element 540 is oriented such that the nozzle dispersal direction 551 of the nozzles of the distributor element 540 are coplanar with the direction of an incident airflow 502 such that the reactant 550 is emitted from the nozzle 542 emits the reactant 550 along a direction generally aligned with the incident airflow 502. In this configuration, the incident airflow 502 exerts no net force on the distributor element 540 perpendicular to the emitter rotational axis 546.

FIG. 5E illustrates an example in which the distributor element 540 is pitched such that the chord line 548 is angled relative to the projected emitter rotational axis 546 by a pitch angle 549. As a result, the incident airflow exerts a net force on the distributor element 540 perpendicular to the emitter rotational axis 546, causing the distributor element 540 to drive rotation of the emitter assembly about the emitter rotational axis 546. Additionally, in the configuration of FIG. 5E, the plume of reactant 550 emitted by the nozzle 542 also is angled away from the emitter rotational axis 546, which can enhance spreading of a plume of the reactant 550 radially outward.

In some examples, each distributor element 540 exhibits a twist about an axis parallel to the distributor element axis 541. In such examples, the orientation of the chord line 548 thus may vary along a length of the distributor element 540. In such examples, the pitch angle 549 may be measured with respect to any suitable chord line 548, such as the chord line 548 that passes through a midpoint of the corresponding distributor element axis 541. Additionally, or alternatively, in such examples, the nozzle dispersal direction 551 of each nozzle 542 may be described as being parallel to the chord line 548 that intersects the nozzle 542 and/or that extends nearest to the nozzle 542.

In an example in which each distributor element 540 exhibits a twist, the degree of twisting can vary between the emitter bands, with the outermost emitter bands exhibiting a flatter pitch from the root to the tip with respect to the path of rotation. When such an emitter assembly is in a feathered configuration, the center of lift provided by the distributor elements of the three bans can provide zero net torque.

Each distributor element 540 may be configured to rotate through a range of pitch angles 549. For example, each distributor element 540 may be configured to rotate about the distributor element axis 541 through a range of pitch angles that is characterized by a maximum pitch angle. As examples, the maximum pitch angle may be at least 10 degrees, at least 20 degrees, at least 30 degrees, at most 45 degrees, at most 25 degrees, and/or at most 15 degrees. As a more specific example, the maximum pitch angle may be at least 10 degrees and at most 45 degrees.

In some examples, each distributor element 540 may be configured to rotate away from a feathered configuration (i.e., with a pitch angle of zero) toward the maximum pitch angle only in one rotational direction (e.g., only clockwise or only counterclockwise). In other examples, each distributor element 540 may be configured to rotate away from the feathered configuration in either such rotational direction.

Figure 5F:
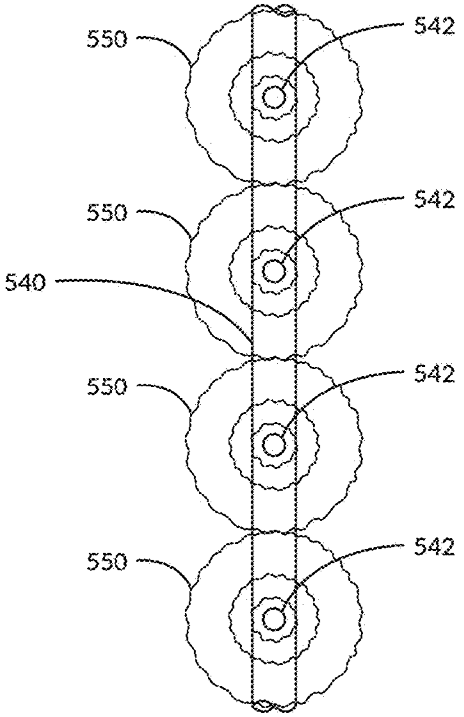
FIG. 5F is a rear view of a portion of the distributor element of FIGS. 5A-5E according to an example.

FIG. 5F is a rear (e.g., upwind-facing) view of a portion of the distributor element 540 of FIGS. 5A-5E as the nozzles 542 emit the reactant 550 in corresponding spray cones. In this example, the distributor element 540 includes four nozzles 542 that are spaced apart along a length of the distributor element 540 to avoid and/or reduce overlap of the reactant spray cones associated with the nozzles 542. As shown in FIGS. 5D-5E, the nozzles 542 in this example are configured such that each nozzle dispersal direction 551 is aligned with (e.g., parallel to) the chord line 548 of the distributor element 540.

Figure 5G:
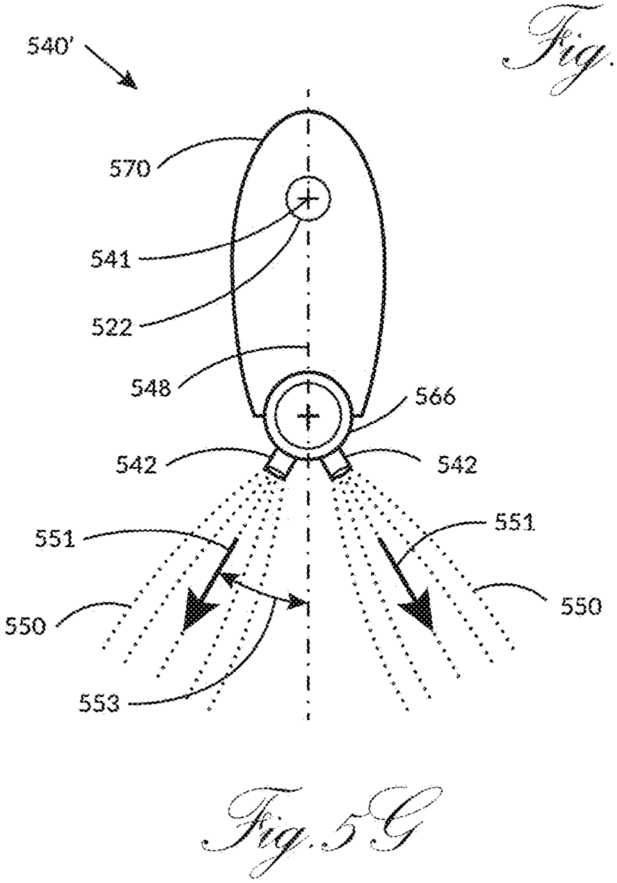
FIG. 5G is an end view of a distributor element according to another example.
Figure 5H:
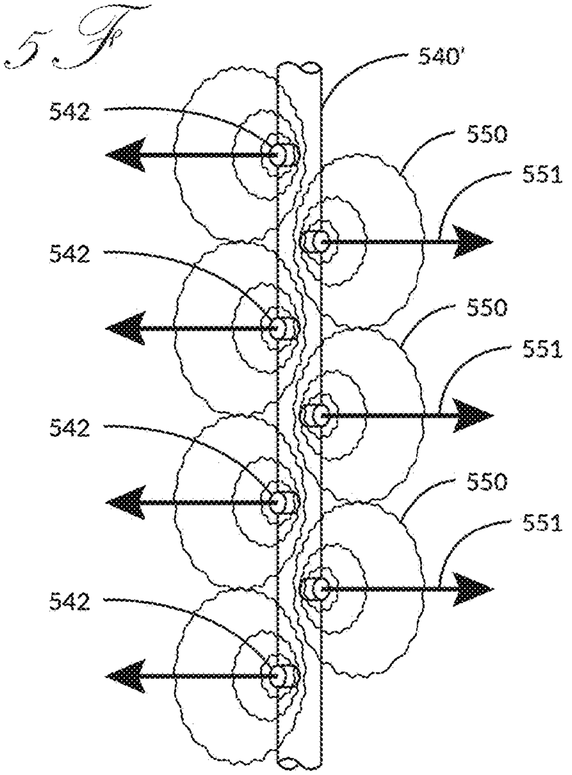
FIG. 5H is a rear view of a portion of the distributor element of FIG. 5G.

In other examples, the nozzles 542 of a given distributor element may be oriented in different directions. For example, FIGS. 5G-5H illustrate an example of a distributor element 540' that includes nozzles 542 with alternating nozzle dispersal directions 551. FIG. 5G is an end view of the distributor element 540' (e.g., as viewed along the distributor element axis 541), while FIG. 5H is a rear (e.g., upwind-facing) view of the distributor element 540'.

As shown in FIG. 5G, each nozzle 542 of the distributor element 540' is oriented such that the corresponding nozzle dispersal direction 551 is angled away from the chord line 548 by a nozzle offset angle 553. As a result, and as shown in FIG. 5H, the nozzles 542 of the distributor element 540' may be separated by smaller distances along a length of the distributor element 540' compared to the nozzles 542 of the distributor element 540 of FIG. 5F while still avoiding overlap of the reactant spray cones. Accordingly, the distributor element 540' can accommodate a greater number of nozzles 542 per unit length of the distributor element 540' without substantial overlap of the reactant spray cones, thereby yielding a relatively high reactant output. For example, while the distributor element 540 of FIG. 5F includes four nozzles 542, the equivalent length of the distributor element 540' of FIG. 5H includes seven nozzles 542.

As shown in FIGS. 5G-5H, the nozzle dispersal directions 551 of the nozzles 542 can alternate on either side of the chord line 548 by the nozzle offset angle 553. The nozzle offset angle 553 can assume any of a variety of values and may be at least partially based on an angular extent of each reactant spray cone and/or the distance between adjacent nozzles 542. As examples, the nozzle offset angle 553 can be at least 5 degrees, at least 10 degrees, at least 15 degrees, at least 20 degrees, at most 30 degrees, at most 17 degrees, at most 12 degrees, and/or at most 7 degrees. As a more specific example, the nozzle offset angle 553 may be at least 5 degrees and at most 30 degrees.

Figure 6A:
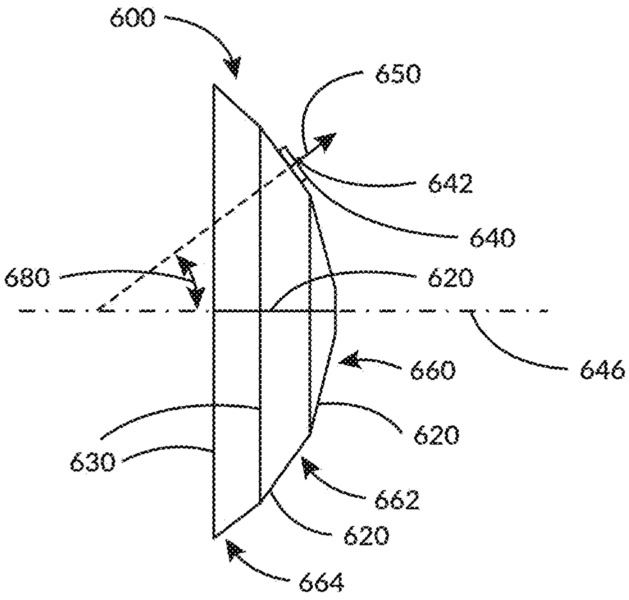
FIG. 6A is a schematic side view of an emitter assembly according to an example.
Figure 6B:
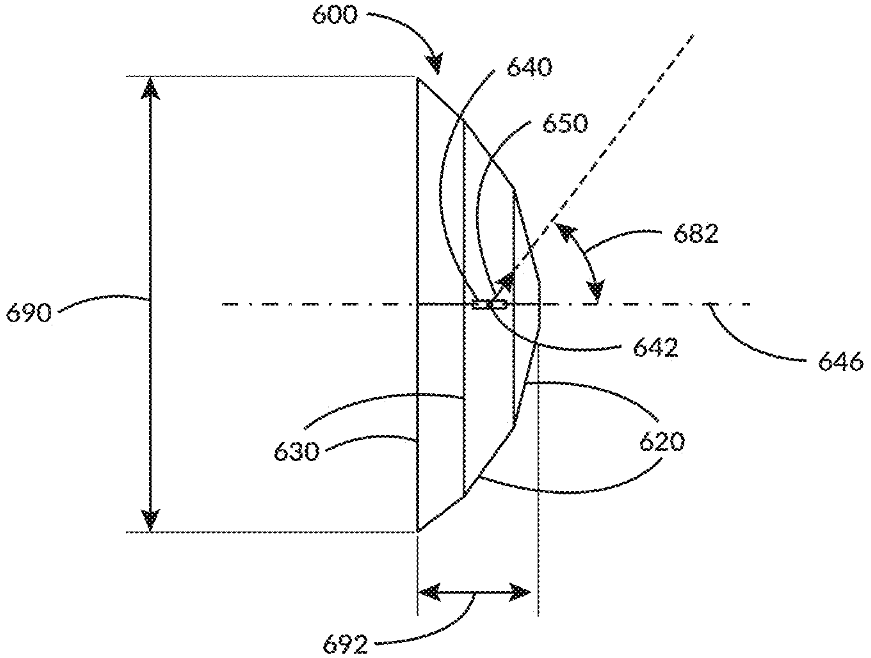
FIG. 6B is a schematic top view of the emitter assembly of FIG. 6A.

The dish-shaped configuration of the emitter assembly and the pitching of the distributor elements 540 each can contribute to efficient dispersal of the reactant 550 into an airflow. To illustrate this effect, FIG. 6A is a schematic side view of an emitter assembly 600 with a representative nozzle 642 of a representative distributor element 640 emitting a reactant along a nozzle dispersal direction 650, while FIG. 6B is a top view of the emitter assembly 600. FIGS. 6A-6B illustrate support masts 620 and rims 630 of the emitter assembly 600, which may represent the support masts and/or rims of any other examples disclosed herein.

As shown in FIGS. 6A-6B, the nozzle dispersal direction 650 may be at least partially characterized in terms of an azimuthal angle 680 (FIG. 6A) and a polar angle 682 (FIG. 6B). Specifically, and as shown in FIG. 6A, the azimuthal angle 680 may represent an angle between a projection of the nozzle dispersal direction 650 onto the plane of FIG. 6A and an emitter rotational axis 646. Similarly, and as shown in FIG. 6B, the polar angle 682 may represent an angle between a projection of the nozzle dispersal direction 650 onto the plane of FIG. 6B and the emitter rotational axis 646. More specifically, the plane of FIG. 6A may be defined as the plane containing the emitter rotational axis 646 and the nozzle 642, while the plane of FIG. 6B may be defined as the plane containing the emitter rotational axis 646 and that is perpendicular to the plane of FIG. 6A.

A nonzero value of the azimuthal angle 680 may result from the dished shape of the emitter assembly 600, with the magnitude of the azimuthal angle being correlated with a distance separating the nozzle 642 and the emitter rotational axis 646. A nonzero value of the polar angle 682 may result from and/or correspond to the pitch angle with which a distributor element including the corresponding nozzle is pitched. Additionally, nonzero values of each of the azimuthal angle 680 and the polar angle 682 can result in the nozzle dispersal direction being skew to the emitter rotational axis 646.

A configuration in which the nozzle dispersal direction 650 is characterized by a nonzero azimuthal angle 680 may be described as one in which the nozzle dispersal direction 650 is elevated relative to the emitter rotational axis 646. Additionally, or alternatively, a configuration in which the nozzle dispersal direction 650 is characterized by a nonzero polar angle 682 may be described as one in which the nozzle dispersal direction 650 is pitched relative to the emitter rotational axis 646.

Accordingly, the dished shape of the emitter assembly 600 and the pitch angle of the distributor elements each can operate to direct the nozzle dispersal direction 650 away from the emitter rotational axis 646 along different directions (e.g., along different dimensions of a spherical coordinate system), directing the reactant radially outward as a whirling and expanding reactant plume. As the reactant plume expands downwind, the plume is drawn to the higher velocity air flow over an outer rim 630 of the emitter assembly 600. Similar to the dynamics described above in the context of FIG. 2C, the blade shapes of the distributor elements can generate further wake vortices that combine with blade tip vortices generated by a wind turbine generator. As a result, the reactant plume can mix turbulently with the air that has passed through turbine rotor blades of the wind turbine generator.

In various examples in which the nozzle dispersal direction 650 is parallel to a direction of an incident airflow (e.g., along the emitter rotational axis 646) and in which the emitter assembly 600 does not rotate, a nozzle plume diameter spreads downwind at an angle of about eight degrees. Accordingly, angling the nozzle dispersal direction 650 of each nozzle relative to the emitter rotational axis 646 as described herein by greater than eight degrees (e.g., with an azimuthal angle 680 and/or a polar angle 682 greater than eight degrees) may be particularly effective in generating a rotating emitter reactant plume that exhibits an increased radial spread relative to a plume of reactant emitted along the emitter rotational axis 646 with no rotation and/or angling of the nozzles away from the emitter rotational axis 646.

With reference to FIG. 6A, the dished shape of the emitter assembly 600 may be at least partially characterized in terms of the azimuthal angles 680 associated with different emitter bands. For example, and as shown in FIG. 6A, the emitter assembly 600 may include a first emitter band 660, a second emitter band 662, and a third emitter band 664 similar to the first emitter band 350, the second emitter band 352, and the third emitter band 354 of FIGS. 3C-3E. As shown in FIG. 6A, the dished shape of the emitter assembly 600 can result in the nozzle dispersal directions 650 associated with emitter bands further from the emitter rotational axis 646 being characterized by greater azimuthal angles 680. Accordingly, the dished shape of the emitter assembly 600 may be at least partially characterized by the maximum value of the azimuthal angle 680 characterizing a subset of the nozzles 642 of the emitter assembly 600. As examples, the maximum value of the azimuthal angle 680 may be at least 10 degrees, at least 20 degrees, at least 30 degrees, at most 45 degrees, at most 25 degrees, and/or at most 15 degrees. As a more specific example, the maximum value of the azimuthal angle 680 may be at least 10 degrees and at most 45 degrees.

The dished shape of the emitter assembly 600 additionally or alternatively may be at least partially characterized in terms of one or more dimensions of the emitter assembly 600. For example, and as shown in FIG. 6B, the emitter assembly 600 may be characterized by an emitter diameter 690 as measured along a direction perpendicular to the emitter rotational axis 656 and an emitter depth 692 as measured along a direction parallel to the emitter rotational axis 656. In various examples, the emitter depth 692 may be at least 2% of the emitter diameter 690, at least 5% of the emitter diameter 690, at least 10% of the emitter diameter 690, at least 15% of the emitter diameter 690, at least 20% of the emitter diameter 690, at most 30% of the emitter diameter 690, at most 17% of the emitter diameter 690, at most 7% of the emitter diameter 690, and/or at most 3% of the emitter diameter 690. As a more specific example, the emitter depth 692 may be at least 10% of the emitter diameter 690 and at most 30% of the emitter diameter 690.

The dished shape of the emitter assembly 600 additionally or alternatively may be at least partially characterized in terms of the relative positions of the emitter bands and/or the distributor elements 640 of the emitter assembly 600. For example, a position of each distributor element 640 may be at least partially characterized by an axial position of the distributor element 640 relative to the emitter rotational axis 646. For the purposes of such a description, the location of each distributor element 640 may be defined in any of a variety of manners. For example, the location of each distributor element 640 may be characterized as the location of a center point of the corresponding distributor element axis.

As shown in FIGS. 6A-6B, the first emitter band 660, the second emitter band 662, and the third emitter band 664 may be described as being located at different axial locations relative to the emitter rotational axis 646. Accordingly, the distributor elements 640 of different emitter band similarly may be described as being located at different axial locations relative to the emitter rotational axis 646. In this manner, distributor elements 640 of different emitter bands may be described as being both axially spaced apart from one another and radially spaced apart from one another.

In some examples, a shape of the emitter assembly 600 may be at least partially characterized with reference to a relationship between the axial and radial positions of the distributor elements 640 of different emitter bands. In particular, for the purpose of this description, the radial position of each distributor element 640 may refer to a distance separating the distributor element 640 and the emitter rotational axis 646 as measured along a direction perpendicular to the emitter rotational axis 646. Additionally, for the purpose of this description, the axial position of each distributor element 640 may refer to a distance between the distributor element 640 and an aft end of the emitter assembly 600 (e.g., the right-hand end in the views of FIGS. 6A-6B) as measured along a direction parallel to the emitter rotational axis 646.

For example, in an example in which the axial position of each distributor element 640 is linearly proportional to its radial position, the emitter assembly 600 may be described as being conical in shape. As another example, the axial position of each distributor element 640 may be proportional to the square of the radial position, and the emitter assembly

600 thus may be described as being parabolic in shape. Such examples are non-limiting, and it also is within the scope of the present disclosure that the emitter assembly 600 can have any of a variety of other shapes characterized by distributor elements 640 that are axially displaced from one another. In the present disclosure, the term "dish shaped" is to be understood as encompassing all such shapes.

Figure 7:
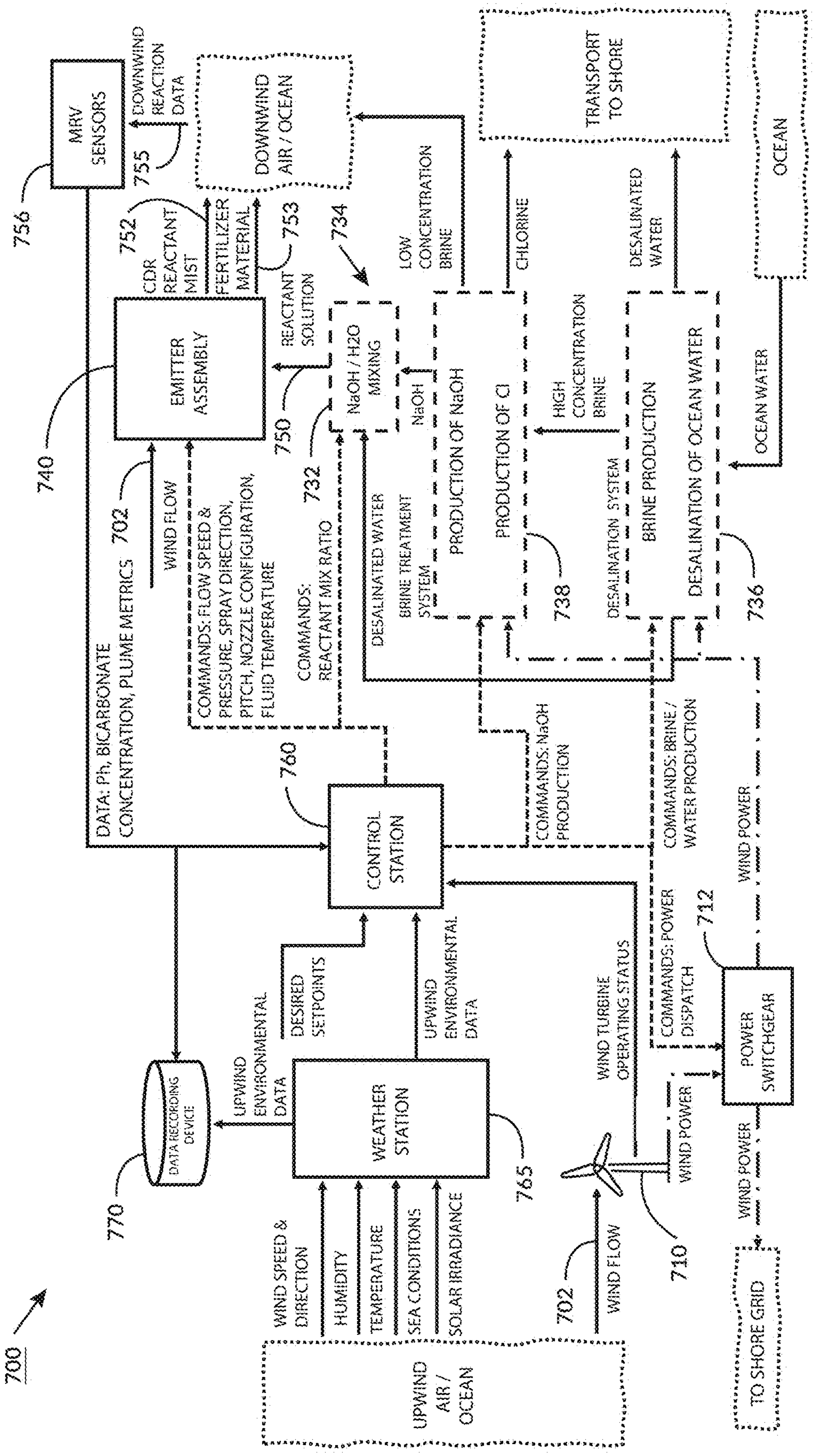
FIG. 7 is a schematic representation of a wind turbine-based emitter system including a wind turbine generator and an emitter assembly according to an example.

FIG. 7 illustrates a wind turbine-based emitter system 700 that may include and/or use any of the emitter assemblies of the present disclosure. In particular, FIG. 7 represents an example in which the emitter system 700 is integrated with an offshore wind turbine system or other renewable energy such as marine current turbines, wave generators and marine solar, coupled with an emitter exposed to winds, or other marine infrastructure such as offshore oil and gas platforms, and ships. The emitter system 700 of FIG. 7 may be described as representing an example of the emitter system 100 of FIG. 1. Accordingly, any components of the emitter system 700 that share names and/or descriptions with analogous components of the emitter system 100 of FIG. 1 and/or of the emitter assemblies and components of FIGS. 2A-5E may be understood as representing examples of such components. It is to be understood that the example emitter system 700 represents an example of a broader a variety of emitter systems that include emitter assemblies according to the present disclosure.

As shown in FIG. 7, the emitter system 700 includes a wind turbine generator 710 positioned in the path of an incident wind flow 702 and an emitter assembly 740 for emitting a reactant mist 752 and/or a fertilizer material 753 (e.g., an iron fertilizer) into the wind flow 702 as described herein. The emitter system 700 additionally includes a reactant production system 734 for producing a reactant solution 750 and a control station 760 for controlling operation of the emitter system 700. In the present disclosure, the control station 760 additionally or alternatively may be referred to as a control system 760. In various examples, the control station 760 can operate to control operation of one or more other components of the emitter system 700, such as the emitter assembly 740, by generating and/or conveying corresponding control signals to such components. Such control signals may be conveyed in any of a variety of manners, such as via a wired connection (e.g., as electrical or fiberoptic signals) and/or via a wireless connection (e.g., as electromagnetic signals).

In the example of FIG. 7, the reactant production system 734 operates to produce the reactant solution 750 at least partially from seawater surrounding the emitter system 700. For example, the reactant production system 734 can include a desalination system 736 and a brine treatment system 738. The desalination system 736 treats and desalinates the seawater to produce a high concentration brine that is fed to the brine treatment system 738. The desalination system 736 also can produce potable water from the desalinated seawater and deliver the potable water to shore.

The brine treatment system 738 can produce the reactant solution 750 from the high concentration brine in the form of a sodium hydroxide solution. The brine treatment system 738 also can produce a supply of chlorine to be delivered to shore. The brine treatment system 738 also can produce a supply of hydrogen to power service vessels or for delivery to shore. A low concentration brine resulting from the brine treatment operation can be processed further for extraction of other minerals, such as lithium before returning to the ocean.

In some examples, operation of the desalination system 736 and/or the brine treatment system 738 may be at least partially powered by electrical power generated by the wind turbine generator 710. Additionally, or alternatively, the wind turbine generator 710 can produce electrical power that is delivered to shore to an electrical grid through a power switchgear 712 commanded by signals from the control station 760. In addition to or as an alternative to onboard production of the NaOH solution, the turbine platform with an emitter may be supplied with NaOH by pipeline or bulk carrier vessels. Certain O&G platforms with emitters may be supplied with a reactant solution by pipeline or bulk carrier vessels. Marine vessels may be fitted with emitters and while in port, take on dry NaOH, or in solution for dispersal once the vessel is underway.

In another example, the wind turbine generator 710 can be replaced by another form of marine renewable energy generator, such as a wave energy converter, an ocean current turbine, and/or a floating solar array that can similarly supply at least partial power to the desalination system 736 and/or the brine treatment system 738, and/or to an onshore electrical grid through the power switchgear 712 commanded by signals from the control station 760.

The control station 760 can control operation of the emitter assembly 740 based on any of a variety of inputs. In the present disclosure, all such inputs that are received by the control station 760 and/or that are used to generate the control signals may be referred to as measured data inputs. In the example of FIG. 7, the control station 760 receives atmospheric and ocean data from a weather station 765 upwind of the emitter assembly 740 and from measurement, recording, and verification (MRV) sensors 756 downwind of the emitter assembly 740 extending from the immediate area of dispersal of the reactant mist 752 to extensive downwind zones that receive the bicarbonate precipitate formed via reaction of the reactant mist 752 with $CO_2$. The control station 760 can receive and process such inputs, such as using artificial intelligence (AI) and/or machine learning algorithms, to enhance carbon dioxide removal energy intensity and other operational needs such as power transmission to the grid or directing more desalinated potable water to shore. The control station 760 can receive operational status signals from the wind turbine generator 710 and control the emitter assembly 740 at least partially based on such inputs.

In the example of FIG. 7, data that are input to the control station 760 from the MRV sensors 756 can include the chemistry of the downwind ocean area receiving the bicarbonate precipitate, atmospheric conditions, meteorological conditions affecting the zone in which the bicarbonate precipitate contacts the ocean, etc. Based on such inputs, the control station 760 can, for example, command production of the reactant solution 750 with the reactant production system 734, command the mixing ratio of NaOH to desalinated water in the mixing station 732, and/or adjust the reactant particle size, rate and/or manner in which the reactant mist 752 is emitted by the emitter assembly 740. As more specific examples, the control station 760 can control a flow rate and/or a temperature of the reactant solution 750 to and/or out of the emitter assembly 740 as the reactant mist 752. Additionally, or alternatively, the control station 760 can control the pitch of distributor elements (and/or of bands thereof) to control a distribution pattern of the reactant mist 752, such as to enhance efficient air volume and aerosol mixing. In some examples, the reactant solution 750 may be delivered only to selected emitter bands of distributor elements with nozzle sizes that are better suited to the measured atmospheric conditions.

In the example of FIG. 7, upwind environmental data from the weather station 765 and downwind reaction data from the MRV sensors 756 can be referenced in the control station 760 to access the efficacy of the reactant mist 752 to react with $CO_2$ under existing environmental conditions. Data obtained by the weather station 765 and the MRV sensors 756 can be stored in a data recording device 770 to allow observation long term data trends. Control algorithms operating within the control station 760 can include and/or be reinforcement learning or other learning algorithms that over time determine optimal operating parameters associated with environmental data from the weather station 765 and the MRV sensors 756. The control station 760 can utilize optimized operating parameters to command changes to the reactant production system 734 and/or the emitter assembly 740 in response to data from the weather station 765 and/or from the MRV sensors 756 to optimize the $CO_2$ reaction process of the reactant mist 752, with control priorities to maximize the $CO_2$ reaction rate and minimize the operating cost of the wind-turbine-based emitter system 700.

Additionally, or alternatively, MRV sensors 756 may be installed on the wind turbine platform and incorporated on aerial and sea drones that can be used to sense the boundaries, descent rate, and/or reaction rate of the plume of reactant mist 752 emitted from emitter assembly 740, and the state of downwind marine biota growth, under varying climatic conditions determined by weather station 765, such as wind speed, gustiness, humidity, air temperature, solar irradiance, and sea state. The control station 760 can modify the pump pressure, fluid temperature, and/or the nozzle configuration of the emitter assembly to change the droplet temperature, droplet size, nozzle direction, and emission rate to modify the nature of the reactant mist 752, which can change the formation of the reactant plume and its rate of reaction with ambient $CO_2$. Data returned by wind turbine-based MRV sensors 756 and aerial and sea drones equipped with MRV sensors 756 can be used by the control station 760 to optimize the operation of the emitter assembly 740 to achieve the highest achievable reaction efficacy under the current climatic conditions. RL algorithms operating within control station 760 can utilize cause-and-effect observations of reaction efficacy resulting from changes to reactant mist 752 to modify control commands to achieve more optimal reaction efficacy under climatic conditions monitored by weather station 765. With multiple observations over time, RL algorithms can "learn" control parameter values that can be issued as commands to the emitter assembly 740 when specific climatic conditions occur to achieve the optimal reactant plume and reaction rate.

Figure 8:
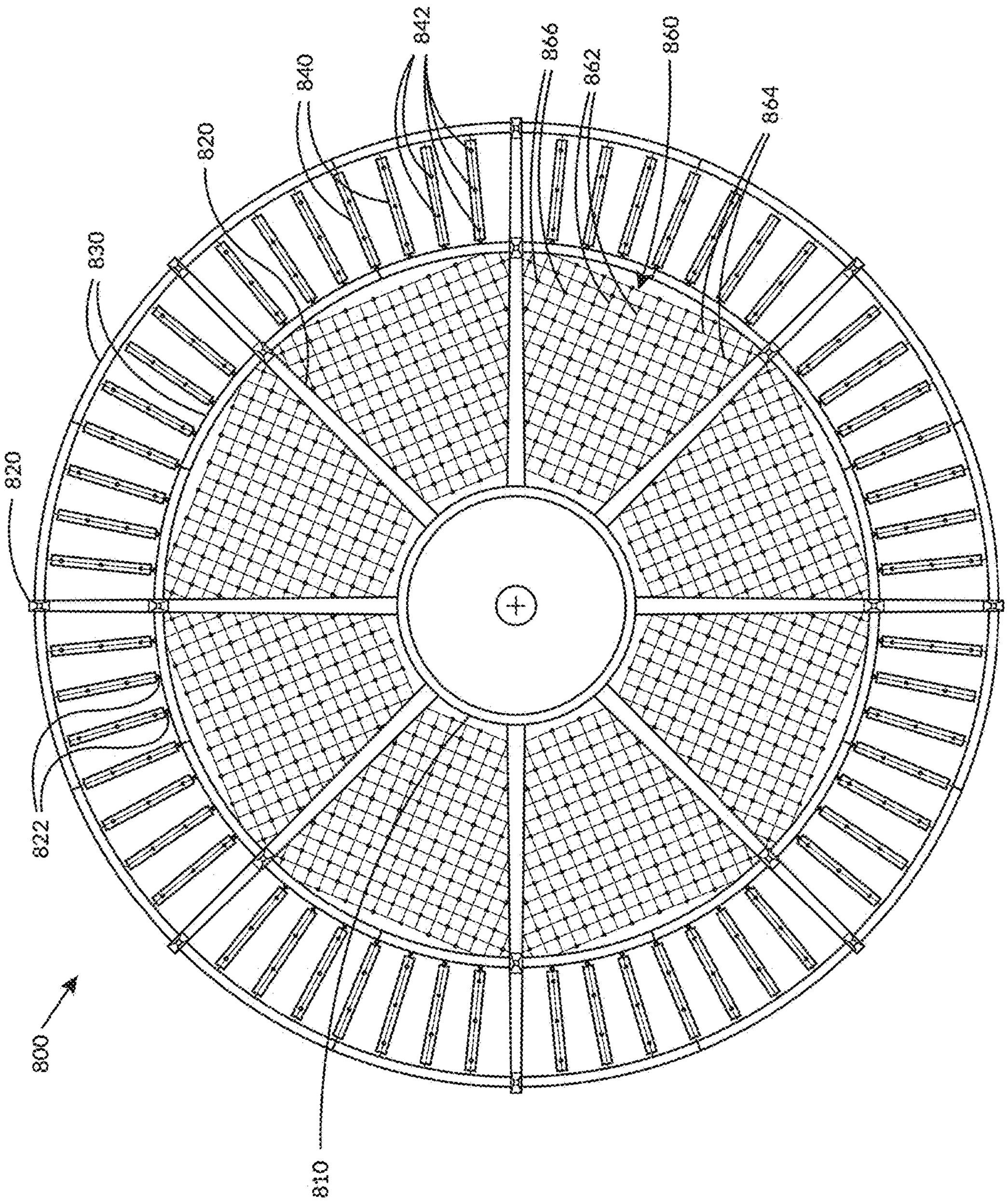
FIG. 8 is a rear view of an emitter assembly according to another example.
Figure 8:
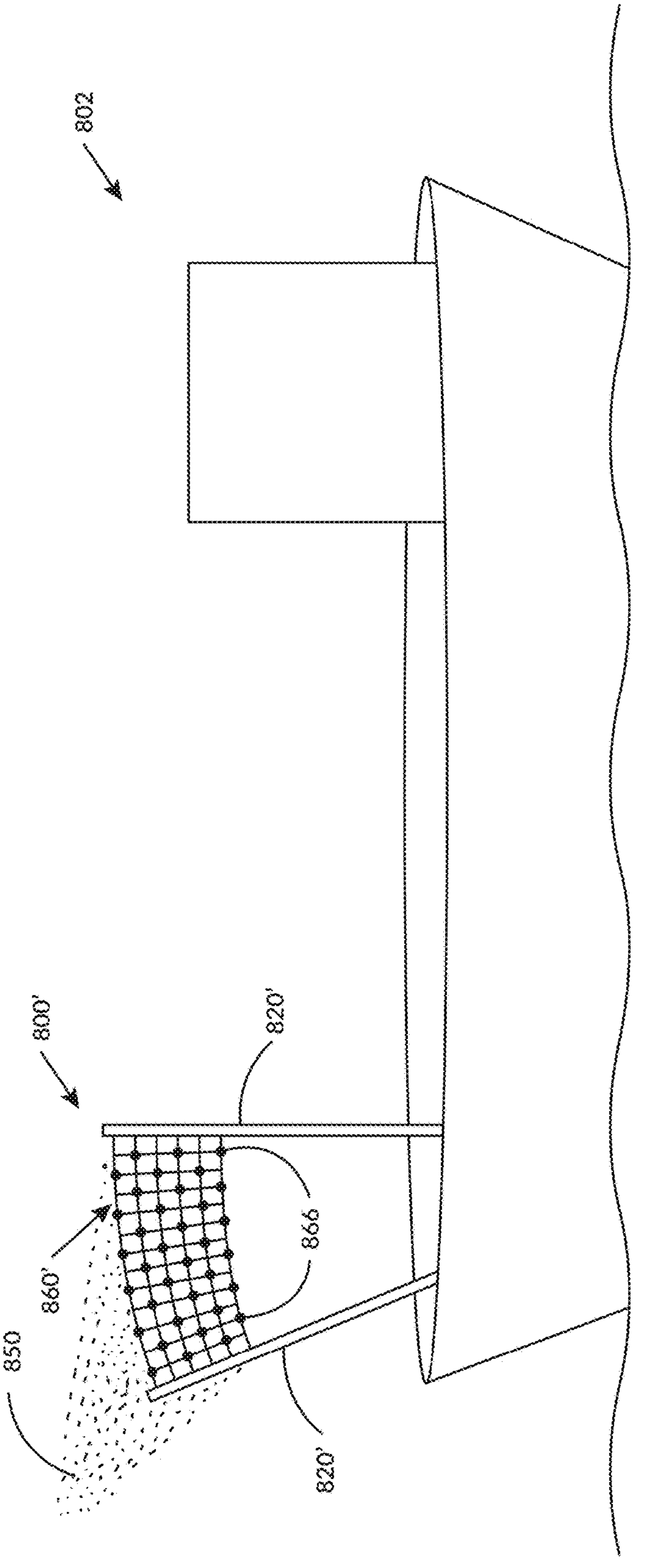

FIG. 8 illustrates another example of an emitter assembly 800. The emitter assembly 800 of FIG. 8 may share any applicable components, features, characteristics, attributes, etc. with any other emitter assembly described herein, such as the emitter assembly 300 of FIGS. 3A-3F. In the example of FIG. 8, the emitter assembly 800 includes a single band of distributor elements 840 positioned between a corresponding pair of rims 830, each distributor element 840 including a plurality of nozzles 842 as described above.

The emitter assembly 800 additionally includes a net 860 formed by a plurality of radial straps 862 and a plurality of tangent straps 864. The net 860 can support a plurality of net supported nozzles 866 for emission of a reactant as described above. The net 860 may be similar in structure to strap fabric cargo nets.

One or more of the tangent straps 864 may support corresponding reactant conduits (e.g., tubing) that are fluidly coupled to one or more reactant feeder lines in the masts 820. Additionally, or alternatively, one or more of the radial straps 862 may support corresponding reactant conduits (e.g., tubing) that are fluidly coupled to a reactant feeder line in the central hub 810. The net supported nozzles 866 may be positioned at intersection points of the radial straps 862 and the tangent straps 864. Each net supported nozzle 866 may have a corresponding nozzle dispersal direction that is adjustable in multiple rotational directions (e.g., along axes parallel to the radial strap 862 and the tangent strap 864 supporting the net supported nozzle 866) so that the nozzle dispersal directions of the net supported nozzles 866 may be aligned with the airflow of the rotating emitter assembly 800.

Supporting the net supported nozzles 866 with the net 860 can serve to reduce the structural requirements associated with supporting the nozzles of the emitter assembly 800. For example, while the distributor elements 840 of the emitter assembly 800 use spokes 822 for structural support, the net 860 requires less structural support. For example, the net 860 may be stretched between and supported by the masts 820.

FIG. 8' illustrates another example of an emitter assembly 800' including a net 860' that supports a plurality of net supported nozzles 866', similar to the net 860 of the emitter assembly 800 of FIG. 8. In contrast with the emitter assembly 800 of FIG. 8, the net 860' of the emitter assembly 800' is stretched between and supported by a pair of masts 820'. In this example, the emitter assembly 800' omits the rims 830 and the distributor elements 840 of the emitter assembly 800 such that the reactant 850 is emitted only by the net supported nozzles 866'.

The emitter assembly 800' may be installed and/or deployed in any of a variety of environments, such as in an application in which the masts 820' correspond to preexisting structures. In particular, FIG. 8' illustrates an example in which the net 860' is supported by masts 820' extending from a ship 802 in an ocean environment. Such a configuration thus may allow for the emitter assembly 800' to be easily transported to and/or moved between target deployment sites. Such a configuration also may allow for the emitter assembly 800' to be installed on pre-existing ocean-borne vessels.

FIGS. 3A-6B and FIGS. 8-8' generally correspond to examples of emitter assemblies that are configured to release a single species of emitted material into an airflow. This is not required of all examples, however, and it additionally is within the scope of the present disclosure that an emitter assembly may be configured to release multiple different emitted materials into an airflow. For example, an emitter assembly may be configured to release a first emitted material and a second emitted material with complementary properties and/or effects. As a more specific example, the first emitted material may correspond to and/or yield an atmospheric carbon mineralization effect (e.g., via reaction of atmospheric carbon dioxide with sodium hydroxide as described above), and the second emitted material may correspond to and/or yield an OIF effect. In particular, the first emitted material may include and/or be the reactant described above with reference to any of FIGS. 1-8'. The second emitted material may include and/or be a fertilizer material, such as a material including iron.

As discussed above, atmospheric carbon mineralization (CDR1) can provide ocean alkalinity enhancement through bicarbonate deposition to the ocean (CDR2). In some examples, OAE is performed by ships, spreading finely ground alkaline substances including basalt, olivine, or lime, to the sea, restoring its capacity to draw down more $CO_2$. OAE may be classified as mCDR.

In some examples, emitter assemblies according to the present disclosure also may be configured to perform OIF, which is distinct from OAE in function. By switching an operational mode of the emitter assembly from CDR1/CDR2 to OIF (e.g., based on downwind ocean sensor data fed to a control system, such as the control station 760 of FIG. 7), overall CDR may be increased via synergies of reduced ocean acidity (CDR2), which is a stressor to marine biota, and through iron fertilization that provides nutritional benefits to phytoplankton, that form the base of the ocean food web. Because elevated ocean acidity is a stressor to the marine ecosystem, increased alkalinity can help restore normal ecosystem balance that can benefit from OIF and that can increase overall CDR capacity.

OIF, like several other marine CDR strategies, can operate to enhance a natural process. Minimal iron availability is the primary limiting factor for phytoplankton growth in nearly one third of the ocean, including the vast Southern Ocean. When even a relatively small amount of an iron nutrient is added to these ecosystems, whether through natural or artificial processes, it stimulates phytoplankton growth. These organisms absorb carbon dioxide dissolved in the ocean from the air. When these organisms are consumed by calcifying and other organisms in the food web, at the end of their life cycle, they may sink the absorbed carbon to the deep ocean for durable sequestration.

Creating a phytoplankton bloom with iron has been demonstrated through experiments and by winds carrying iron-containing dust from land to the sea surface, resulting in blooms that pull down large amounts of carbon dioxide. By iron fertilization, the nutrition of the marine ecosystem is leveraged, since phytoplankton form the base of the marine food web, feeding fish and other sea life.

As discussed above, emitter assemblies according to the present disclosure can operate on a wind turbine to disperse an alkaline mist that reacts with atmospheric carbon, causing mineralization and bicarbonate precipitation to the sea that enhances ocean alkalinity. In some examples, the emitter assemblies can realize significant CDR capacity by periodically dispersing iron in the form of iron oxide powder and/or a liquid spray with iron particles.

According to the widely accepted OIF hypothesis, about one ton of iron may be able to remove about 83,000 tons of carbon dioxide (Sunda and Huntsman, 1995), while one ton of alkaline rock can remove less than one ton of carbon dioxide. Using limestone as an example, one molecule of calcium oxide combines with one molecule of carbon dioxide, such that the carbon dioxide capture ratio is approximately one-to-one (or, more accurately, 1.3 tons of calcium oxide to one ton of carbon dioxide), which is about the same as the efficacy of an emitter assembly dispersing sodium hydroxide in effecting the CDR1 mechanism. With other alkaline rocks, up to three tons is needed to chemically absorb one ton of carbon dioxide. The extent to which carbon is actually exported into the deep sea over time has not yet been resolved, and the cost of this process depends largely on its efficacy for durable sequestration.

Emitter assemblies according to the present disclosure may be particularly suitable for causing CDR1 (airborne carbon mineralization) as well as CDR2 (OAE). With the addition of the capability to emit iron particles, the emitter assemblies further may provide OIF as needed to enhance CDR and/or to improve the health and growth conditions for marine ecosystems. For example, the emitter assemblies may include small-volume onboard iron powder storage, a blower and ducting system, and/or iron powder dispersal from rim outlets, and such dispersal may be managed by a system controller based on input from ocean sensors to provide microdosing of iron and avoid massive phytoplankton blooms with possible follow-on collapse and long periods of restabilizing. The combination of reduced organism stress by ocean alkalization with measured iron fertilization should improve phytoplankton growth and capacity to draw down more carbon dioxide.

The operation of an emitter assembly to produce CDR1, CDR2, and OIF processes further may be understood with continued reference to FIG. 7. For example, in an example of operating the emitter system 700 of FIG. 7, the control station 760 can receive upwind environmental data from the weather station 765 and downwind reaction data from the MRV sensors 756, which may also include data indicating a marine biota condition such as a rate of phytoplankton growth. Based on such inputs, the control station 760 can operate to assess the efficacy of each of the CDR1, CDR2, and OIF processes. For example, the efficacy of the CDR1 process may be determined by evaluating an efficacy with which the reactant mist 752 reacts with $CO_2$ under existing environmental conditions, such as based on the downwind reaction data from the MRV sensors 756. As another example, the concentration of $CO_2$ absorbed by the ocean surface may be determined as a measure of CDR2 efficacy determined by data from the MRV sensors 756. As another example, the efficacy of the OIF process may be determined by evaluating the efficacy of the fertilizer material 753 to stimulate phytoplankton growth on the downwind ocean surface.

The control station 760 may process the data received from such sensors in any of a variety of manners. For example, the control station 760 may process the data according to control algorithms that utilize AI to analyze the coupling of parameters measured by the MRV sensors 756 and/or the weather station 765 and the measured efficacy of both CDR1/CDR2 and OIF processes occurring in the downwind air/ocean zone. Examples of such AI algorithms may include machine learning algorithms, supervised learning algorithms, and/or unsupervised learning algorithm.

The control station 760 can then regulate and/or modify the operation of the reactant production system 734 and/or the emitter assembly 740 at least partially based on such an analysis. For example, the control station 760 can command changes to the reactant production system 734 and/or the emitter assembly 740 that serve to enhance and/or optimize the $CO_2$ reaction process of the reactant mist 752. Additionally, or alternatively, the control station 760 can control the dispersion rate of the fertilizer material 753, which in turn can affect a phytoplankton growth rate to enhance and/or optimize (e.g., maximize) the rate of $CO_2$ uptake as described above. In this manner, the control station 760 can iteratively and/or continually enhance the efficacy of the CDR1, CDR2, and OIF processes produced by the emitter assembly 740 with operating experience gained by generative AI algorithms based on relationships between measured environmental inputs and the commanded operation of the emitter assembly 740. In particular, the commanded operation of the emitter assembly 740 can include and/or correspond to the control signals conveyed to the emitter assembly 740 from the control station 760 to control various operating parameters of the emitter assembly 740. Such operating parameters can include any of a variety of parameters that affect direct CDR reaction rates and/or marina biota conditions (e.g., the propagation of phytoplankton), examples of which can include the emission rate of the reactant mist 752, the emission rate of the fertilizer material 753, and/or a ratio of the respective emissions rates of the reactant mist 752 and the fertilizer material 753. Examples of emitter assemblies 740 that can operate in conjunction with the control station 760 to effect CDR1/CDR2 processes as well as OIF processes are described with reference to FIGS. 9A-9H.

FIGS. 9A-9H illustrate an example of an emitter assembly 900 that is configured to emit each of a first emitted material and a second emitted material. In particular, the first emitted material may be a carbon dioxide reactant for producing an atmospheric carbon mineralization effect, such as sodium hydroxide, as described above. The second emitted material may be a fertilizer for producing an OIF effect, such as a substance containing iron. As examples, the second emitted material may include and/or be an iron powder, an iron solution, a liquid containing iron, etc.

The emitter assembly 900 is substantially structurally similar to the emitter assembly 300' of FIGS. 3A'-3B' except as described below. Accordingly, analogous components are labeled with similar reference numerals in FIGS. 3A'-3B' and FIGS. 9A-9H, and these components may not be discussed in detail with respect to FIGS. 9A-9H. For example, the support structure 906 and the corresponding support masts 920 and rims 930 of FIGS. 9A-9H may be regarded as examples of the support structure 306, the support masts 320, and the rims 330, respectively, of FIGS. 3A'-3B'.

Figure 9A:
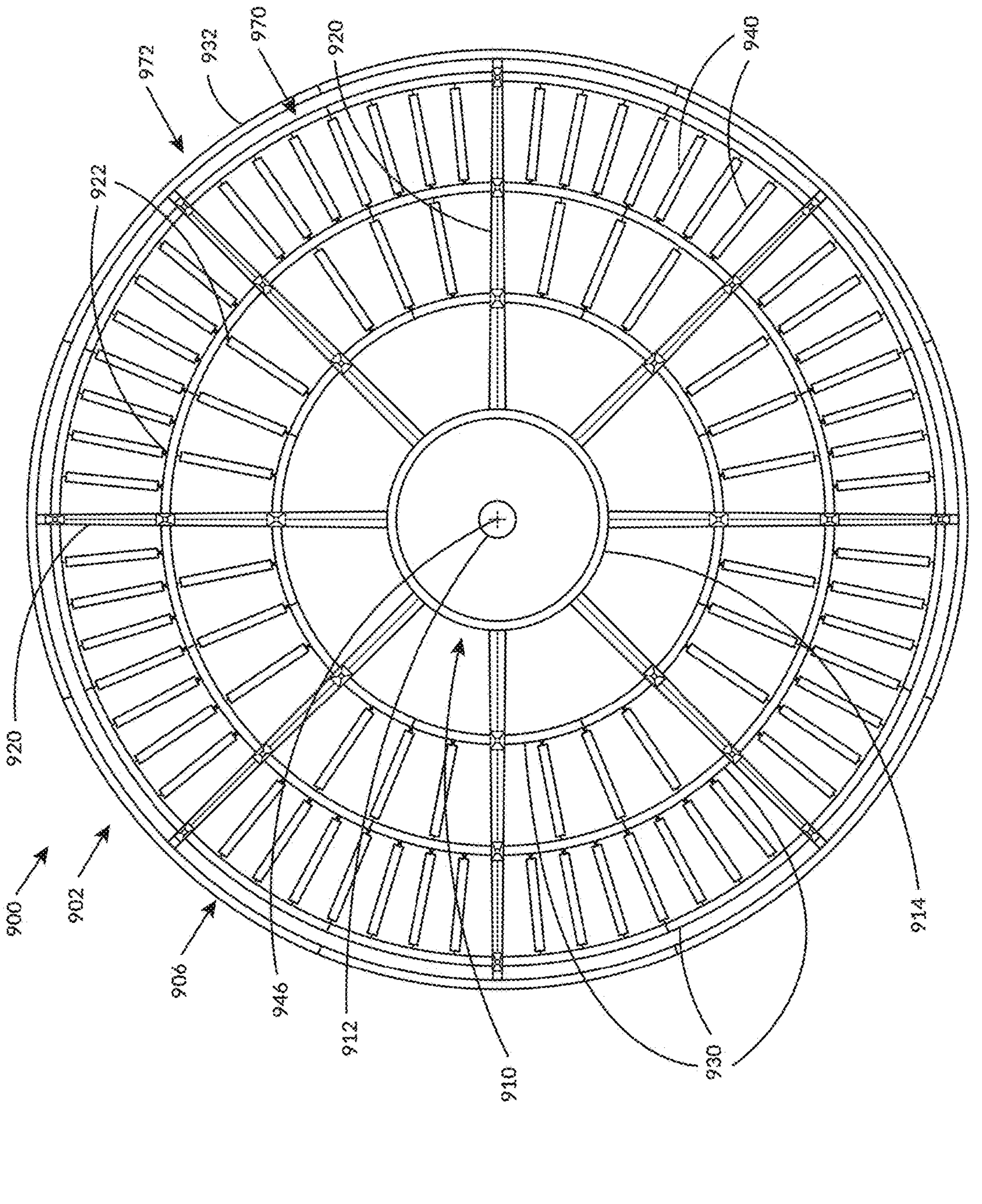
FIG. 9A is a front view of an emitter assembly according to another example.
Figure 9B:
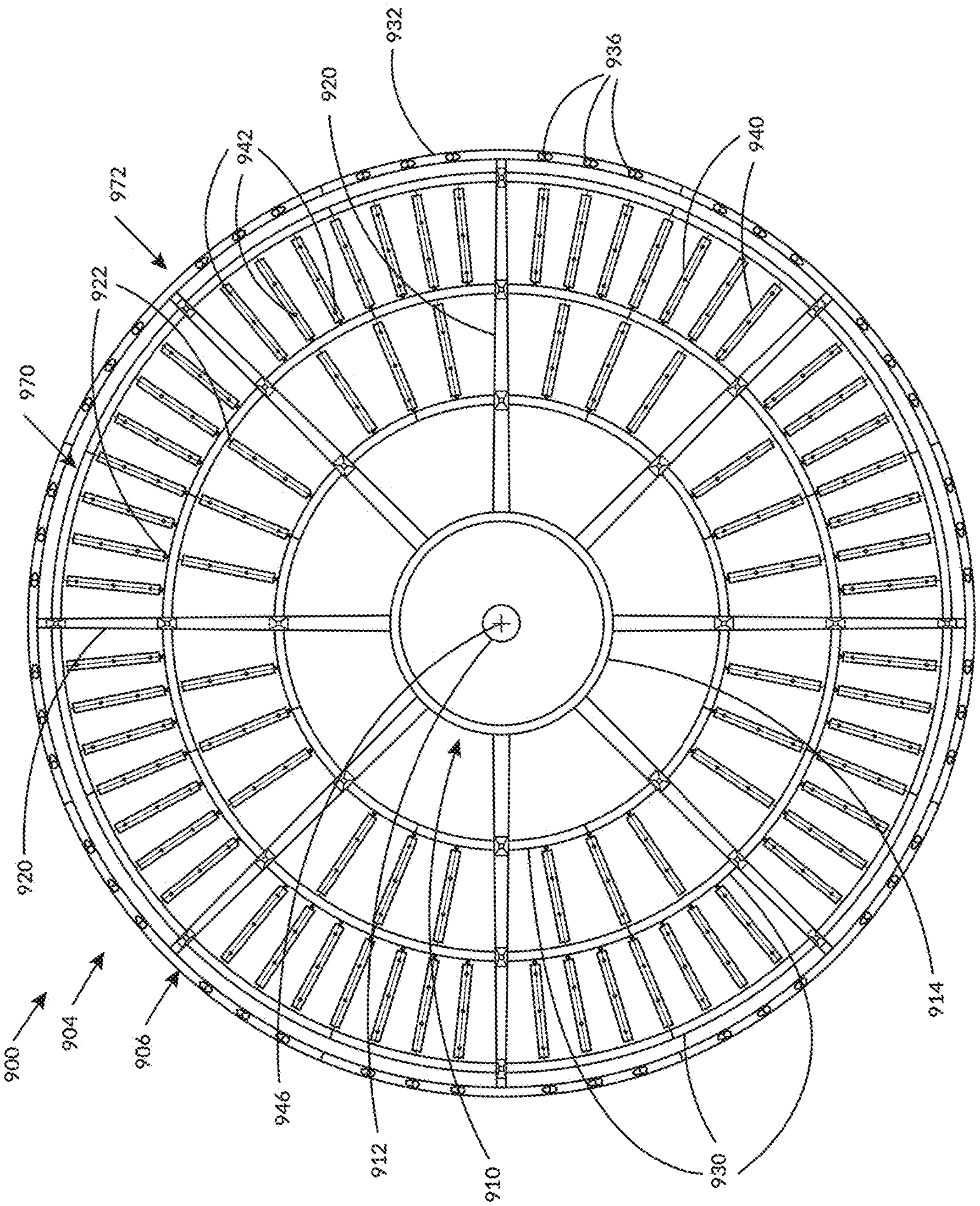
FIG. 9B is a rear view of the emitter assembly of FIG. 9A.

FIG. 9A illustrates a concave first side 902 of the emitter assembly 900, while FIG. 9B illustrates a convex second side 904 of the emitter assembly 900. As shown in FIGS. 9A-9B, the emitter assembly 900 may be described as including a first emitted material dispersal assembly 970 configured to emit a first emitted material (e.g., an alkaline carbon dioxide reactant) and a second emitted material dispersal assembly 974 configured to emit a second emitted material (e.g., iron particles). The first emitted material dispersal assembly 970 may include components that are substantially identical to those of the emitter assembly 300' of FIGS. 3A'-3B', including a plurality of support masts 920 extending radially away from a central hub 910 and supporting a plurality of rims 930 that in turn support a plurality of distributor elements 940.

The second emitted material dispersal assembly 974 includes a second emitted material rim 932 that includes a plurality of second emitted material outlets 936. In the example of FIGS. 9A-9B, the second emitted material rim 932 is supported by the support masts 920 at a position radially exterior of the outermost rim 930.

Figure 9D:
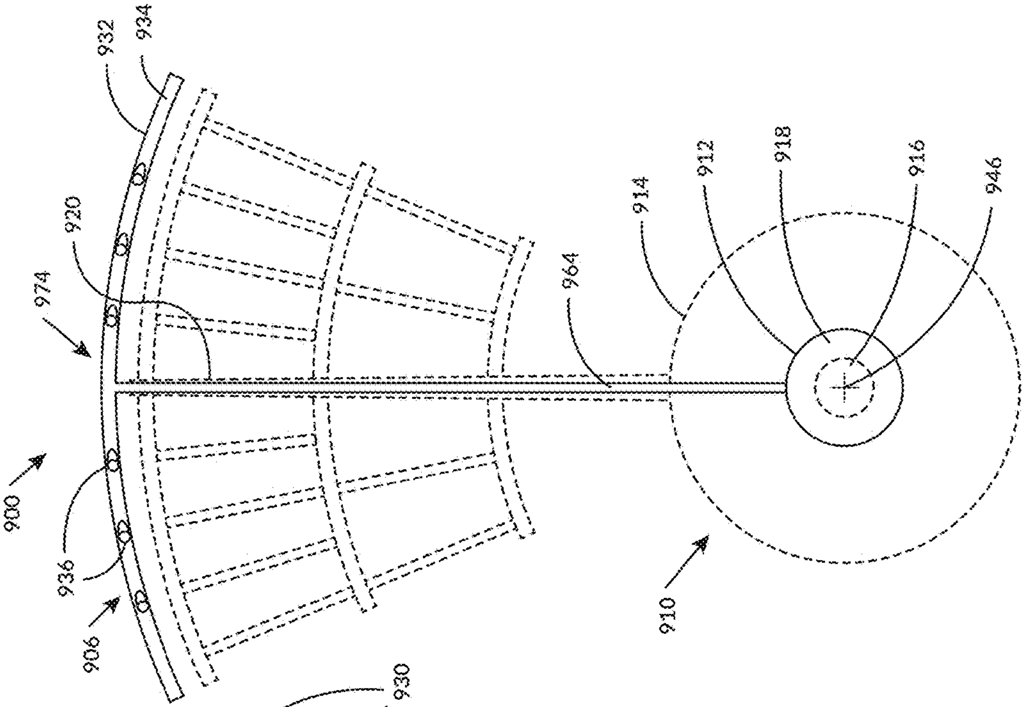
FIG. 9D is a rear view of the portion of the emitter assembly of FIG. 9C illustrating components of a second emitted material dispersal assembly according to an example.
Figure 9C:
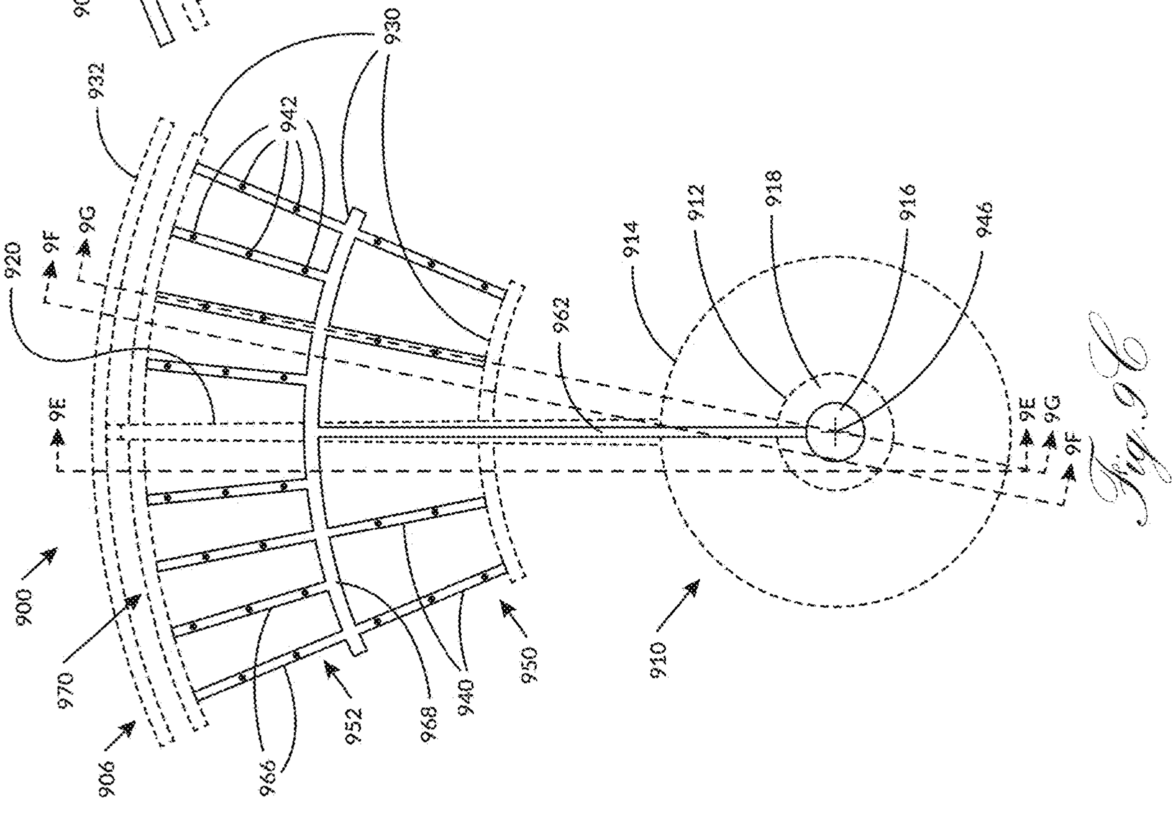
FIG. 9C is a rear view of a portion of the emitter assembly of FIGS. 9A-9B illustrating components of a first emitted material dispersal assembly according to an example.

FIGS. 9C-9D illustrate aspects of a portion of the emitter assembly 900. In particular, FIG. 9C illustrates aspects of the first emitted material dispersal assembly 970 within the portion of the emitter assembly 900, while FIG. 9D illustrates aspects of the second emitted material dispersal assembly 974 within the same portion of the emitter assembly 900. As shown in FIG. 9C, and similar to the examples of FIGS. 3F and 4D discussed above, the first emitted material dispersal assembly 970 includes a first mast supply conduit 962 extending through the support mast 920 and connected to a plurality of branch feeder conduits 968 extending through the rims 930. Each branch feeder conduit 968 is connected to a plurality of nozzle manifolds 966 extending through corresponding distributor elements 940. In this manner, the first emitted material dispersal assembly 970 supports a flow of the first emitted material from a first primary supply conduit 916 to the nozzles 942 via the first mast supply conduit 962, the branch feeder conduits 968, and the nozzle manifolds 966.

As shown in FIG. 9D, the emitter assembly 900 additionally includes a second primary supply conduit 918 inside the central hub 910 and/or extending through the axle 912. In particular, the first primary supply conduit 916 may be positioned within the second primary supply conduit 918. The second emitted material dispersal assembly 974 includes a second mast supply conduit 964 extending through the support mast 920 and connected to a second emitted material rim conduit 934 extending through the second emitted material rim 932. In this manner, the second emitted material dispersal assembly 974 supports a flow of the second emitted material from the second primary supply conduit 918 to the second emitted material outlets 936 via the second mast supply conduit 964 and the second emitted material rim conduit 934.

Figure 9E:
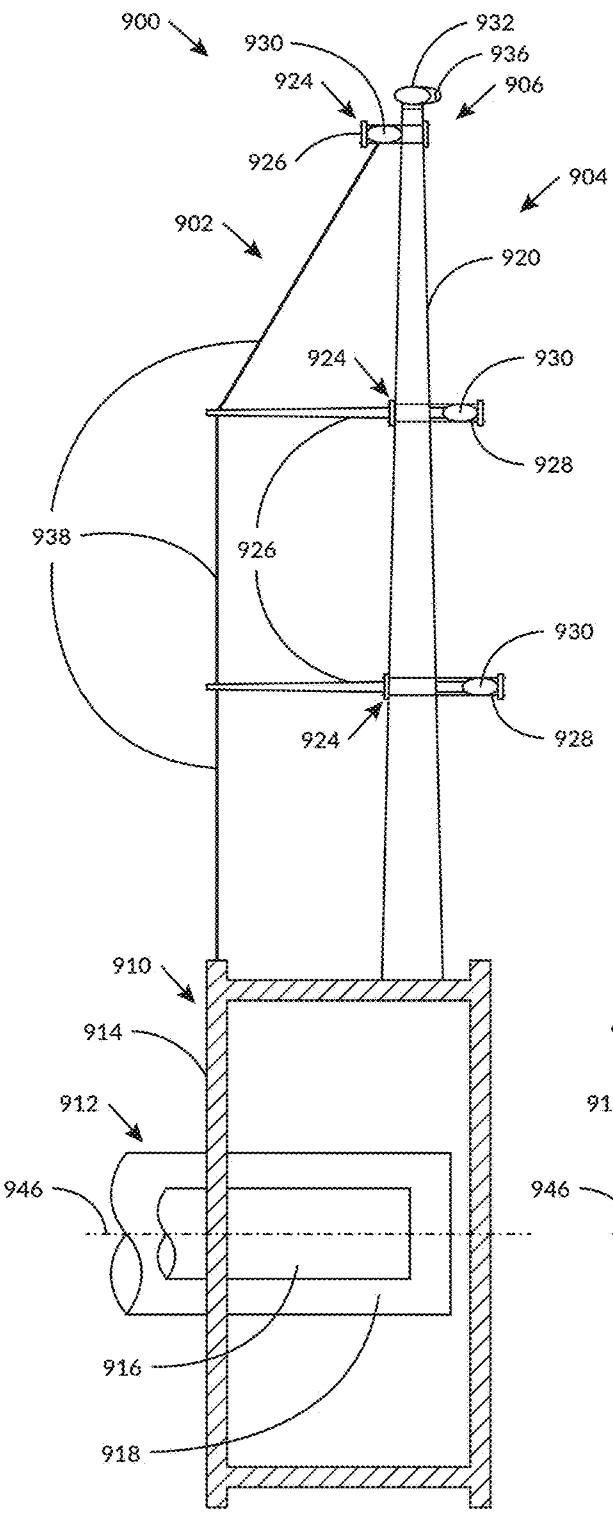
FIG. 9E is a side view of a portion of the emitter assembly of FIGS. 9A-9D as viewed along the line 9E-9E in FIG. 9C.
Figure 9F:
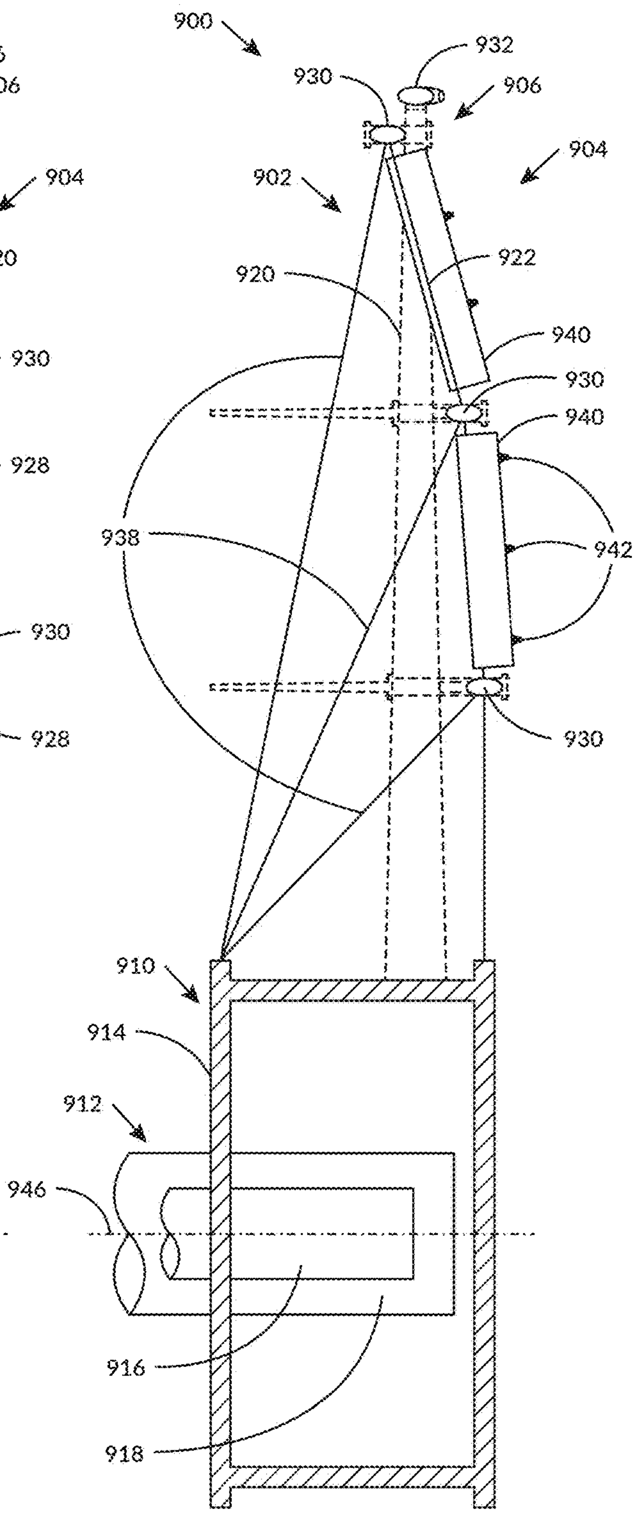
FIG. 9F is a side view of a portion of the emitter assembly of FIGS. 9A-9E as viewed along the line 9F-9F in FIG. 9C.

FIG. 9E is a side view of the emitter assembly 900 as viewed along the line 9E-9E in FIG. 9C, while FIG. 9F is a side view of the emitter assembly 900 as viewed along the line 9F-9F in FIG. 9C. As shown in FIGS. 9E-9F, and similar to FIGS. 4A-4A', the emitter assembly 900 includes a plurality of mast connectors 924 coupled to the support mast 920 and to rims 930. Each mast connector 924 can include a fore spreader 926 and/or an aft spreader 928. The emitter assembly 900 additionally includes one or more forestays 938 extending between the central hub 910, the fore spreaders 926, and/or the rims 930 to stabilize the support mast 920 and/or the rims 930. FIGS. 9E-9F additionally illustrate a configuration in which the first primary supply conduit 916 extends within the second primary supply conduit 918 within the axle 912.

Figure 9G:
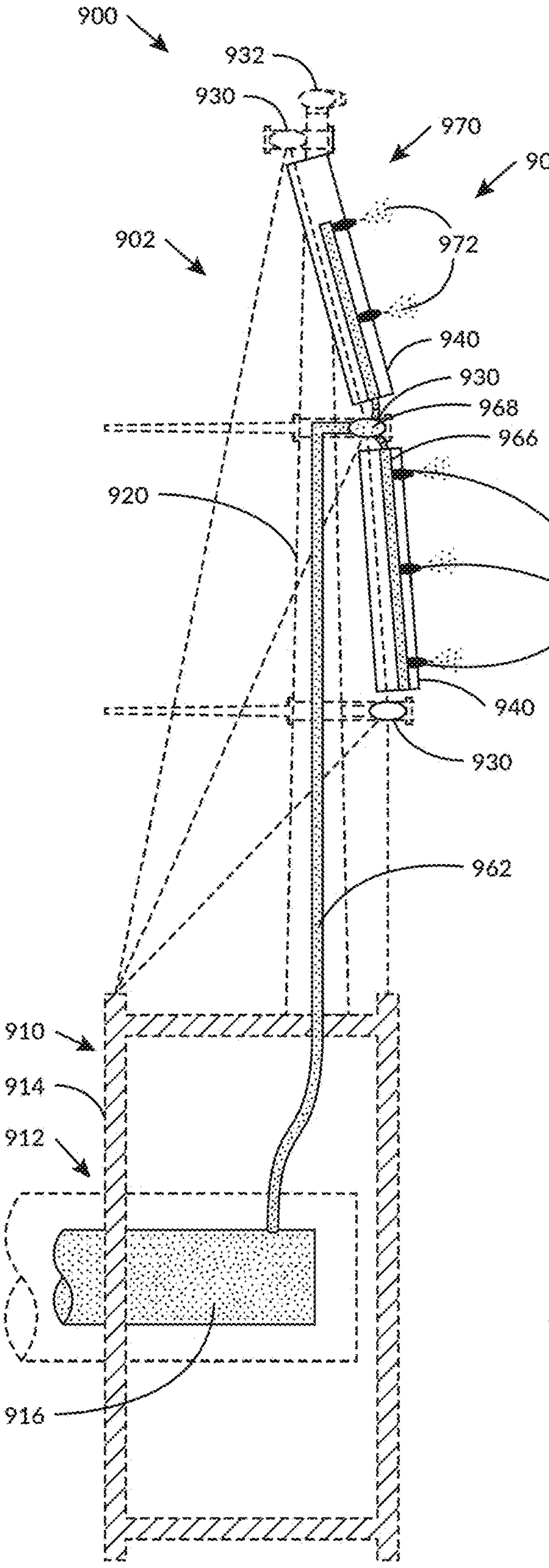
FIG. 9G is a cross-sectional view of the emitter assembly of FIGS. 9A-9F as viewed along the line 9G-9G in FIG. 9C illustrating components of a first emitted material dispersal assembly according to an example.
Figure 9H:
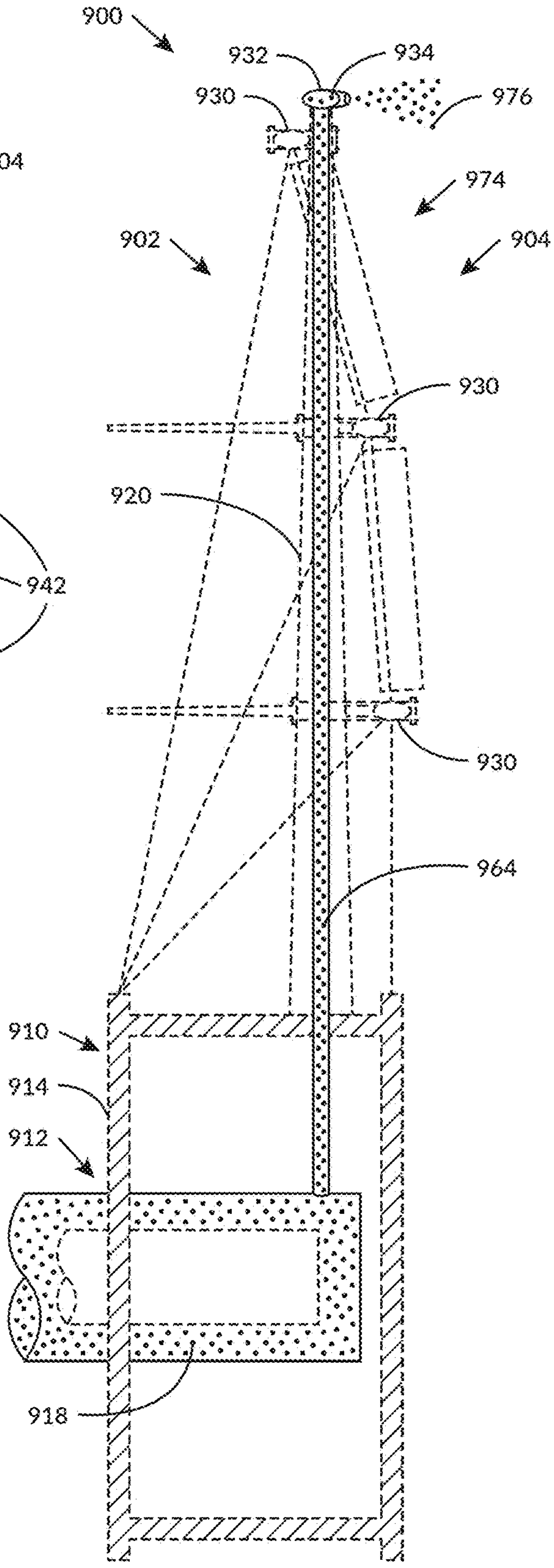
FIG. 9H is a cross-sectional view of the emitter assembly of FIGS. 9A-9G as viewed along the line 9G-9G in FIG. 9C illustrating components of a second emitted material dispersal assembly according to an example.

Each of FIGS. 9G-9H represents a cross-sectional view of the emitter assembly 900 as viewed along the line 9G-9G in FIG. 9C. In particular, FIG. 9G illustrates a manner in which the first primary supply conduit 916, the first mast supply conduit 962, the branch feeder conduits 968, and the nozzle manifolds 966 of the first emitted material dispersal assembly 970 may be connected to one another to convey the first emitted material 972 from the first primary supply conduit 916 to the nozzles 942. Similarly, FIG. 9H illustrates a manner in which the second primary supply conduit 918, the second mast supply conduit 964, and the second emitted material rim conduit 934 of the second emitted material dispersal assembly 974 may be connected to one another to convey the second emitted material 976 from the second primary supply conduit 918 to the second emitted material outlets 936.

Additional Examples of the Disclosed Technology

Having described and illustrated the principles of the disclosed technology with reference to the illustrated examples, it will be recognized that the illustrated examples can be modified in arrangement and detail without departing from such principles. For instance, elements of examples performed in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

Example 1. An emitter assembly, comprising: a plurality of distributor elements, each distributor element comprising one or more nozzles configured to emit a reactant along a respective nozzle dispersal direction; and a support structure that supports the plurality of distributor elements relative to an emitter rotational axis of the emitter assembly such that the nozzle dispersal direction of each nozzle of at least a subset of the one or more nozzles is elevated relative to the emitter rotational axis, wherein the reactant comprises a carbon dioxide reactant, and wherein the emitter assembly is configured to release the reactant into an incident airflow to react the reactant with carbon dioxide in the incident airflow.

Example 2. The emitter assembly of any example herein, particularly example 1, wherein the plurality of distributor elements are circumferentially distributed around the emitter rotational axis.

Example 3. The emitter assembly of any example herein, particularly example 1, wherein the plurality of distributor elements comprises distributor elements that are axially and radially spaced apart from one another.

Example 4. The emitter assembly of any example herein, particularly any one of examples 1-3, wherein one or both of the emitter assembly and the support structure is dish shaped.

Example 5. The emitter assembly of any example herein, particularly any one of examples 1-4, wherein the emitter assembly has a first side that is concave and a second side opposite the first side that is convex.

Example 6. The emitter assembly of any example herein, particularly any one of examples 1-5, wherein the emitter assembly has an emitter diameter, as measured along a direction perpendicular to the emitter rotational axis, and an emitter depth, as measured along a direction parallel to the emitter rotational axis, that is one or more of at least 2% of the emitter diameter, at least 5% of the emitter diameter, at least 10% of the emitter diameter, at least 15% of the emitter diameter, at least 20% of the emitter diameter, at most 30% of the emitter diameter, at most 17% of the emitter diameter, at most 7% of the emitter diameter, at most 3% of the emitter diameter, or 10%-30% of the emitter diameter.

Example 7. The emitter assembly of any example herein, particularly any one of examples 1-6, wherein the emitter assembly is configured to rotate about the emitter rotational axis.

Example 8. The emitter assembly of any example herein, particularly any one of examples 1-7, wherein the plurality of distributor elements are configured to aerodynamically drive rotation of the emitter assembly about the emitter rotational axis when the emitter assembly is positioned in the path of the incident airflow.

Example 9. The emitter assembly of any example herein, particularly any one of examples 1-8, wherein each distributor element is configured to rotate about a corresponding distributor element axis.

Example 10. The emitter assembly of any example herein, particularly example 9, wherein the distributor element axis is parallel to a longitudinal axis of the distributor element.

Example 11. The emitter assembly of any example herein, particularly any one of examples 9-10, wherein each distributor element is shaped as an airfoil with a chord line perpendicular to the distributor element axis, and wherein each distributor element is configured to rotate to vary a pitch angle between the emitter rotational axis and a projection of the chord line onto a plane comprising the emitter rotational axis.

Example 12. The emitter assembly of any example herein, particularly any one of examples 1-11, wherein the nozzle dispersal direction of each nozzle of each distributor element is parallel to a chord line of the distributor element.

Example 13. The emitter assembly of any example herein, particularly any one of examples 1-11, wherein the nozzle dispersal direction of at least one nozzle is angled relative to a chord line of the corresponding distributor element by a nozzle offset angle.

Example 14. The emitter assembly of any example herein, particularly example 13, wherein, for at least one distributor element of the plurality of distributor elements, the nozzle dispersal directions of the nozzles of the distributor element alternate on either side of the chord line by the nozzle offset angle.

Example 15. The emitter assembly of any example herein, particularly any one of examples 13-14, wherein the nozzle offset angle is one or more of at least 5 degrees, at least 10 degrees, at least 15 degrees, at least 20 degrees, at least 25 degrees, at most 30 degrees, at most 22 degrees, at most 17 degrees, at most 12 degrees, at most 7 degrees, or 5-30 degrees.

Example 16. The emitter assembly of any example herein, particularly any one of examples 11-15, wherein the plurality of distributor elements are configured to rotate the emitter assembly about the emitter rotational axis when at least a subset of the distributor elements are characterized by nonzero pitch angles and when the emitter assembly is positioned in a path of the incident airflow.

Example 17. The emitter assembly of any example herein, particularly any one of examples 11-16, wherein each distributor element is be configured to rotate about the distributor element axis through a range of pitch angles that is characterized by a maximum pitch angle that is one or more of at least 10 degrees, at least 20 degrees, at least 30 degrees, at most 45 degrees, at most 25 degrees, at most 15 degrees, or 10-45 degrees.

Example 18. The emitter assembly of any example herein, particularly any one of examples 1-17, wherein the support structure comprises: a plurality of support masts; and a plurality of rims supported by the support masts, and wherein each distributor element is supported between a corresponding pair of rims of the plurality of rims.

Example 19. The emitter assembly of any example herein, particularly example 18, wherein the support structure further comprises a central hub, wherein the emitter rotational axis passes through the central hub, and wherein the plurality of support masts extend radially away from the central hub.

Example 20. The emitter assembly of any example herein, particularly any one of examples 18-19, further comprising one or more emitter bands, each emitter band being defined between a corresponding pair of radially adjacent rims of the plurality of rims, and wherein each emitter band comprises a number of distributor elements of the plurality of distributor elements that is positively correlated to a radial distance separating the emitter band and the emitter rotational axis.

Example 21. The emitter assembly of any example herein, particularly example 20, wherein the support structure comprises at least two emitter bands.

Example 22. The emitter assembly of any example herein, particularly any one of examples 20-21, wherein the emitter assembly is configured to rotate each distributor element about a corresponding distributor element axis, and wherein, for each emitter band, the emitter assembly is configured to rotate all distributor elements of the emitter band in unison.

Example 23. The emitter assembly of any example herein, particularly any one of examples 20-22, wherein the emitter assembly is configured to rotate the distributor elements of different emitter bands to different pitch angles during operative use of the emitter assembly.

Example 24. The emitter assembly of any example herein, particularly any one of examples 20-23, wherein the nozzles of the distributor elements of each emitter band are configured to emit the reactant with a common particle size distribution, and wherein the nozzles of distributor elements of different emitter bands are configured to emit the reactant with different particle size distributions.

Example 25. The emitter assembly of any example herein, particularly any one of examples 20-24, wherein the nozzles of the distributor elements of each emitter band are configured to emit the reactant with a common flow rate, and wherein the nozzles of distributor elements of different emitter bands are configured to emit the reactant with different flow rates.

Example 26. The emitter assembly of any example herein, particularly any one of examples 18-25, wherein the support structure comprises a plurality of spokes that support the distributor elements between the corresponding rims.

Example 27. The emitter assembly of any example herein, particularly any one of examples 1-26, wherein each nozzle is configured to emit the reactant with a particle size that is one or more of at least 1 micron (μm), at least 5 μm, at least 10 μm, at least 15 μm, at least 20 μm, at least 30 μm, at least 50 μm, at least 100 μm, at most 150 μm, at most 75 μm, at most 40 μm, at most 25 μm, at most 17 μm, at most 12 μm, at most 7 μm, at most 2 μm, or 10-150 μm.

Example 28. The emitter assembly of any example herein, particularly any one of examples 1-27, wherein each nozzle is configured to emit the reactant with a fixed particle size distribution.

Example 29. The emitter assembly of any example herein, particularly any one of examples 1-27, wherein each nozzle is configured to emit the reactant with a variable particle size distribution.

Example 30. The emitter assembly of any example herein, particularly any one of examples 1-29, wherein the positions of the nozzles of adjacent distributor elements are staggered relative to one another.

Example 31. The emitter assembly of any example herein, particularly any one of examples 1-30, wherein the emitter assembly comprises a first emitted material dispersal assembly configured to emit the reactant and a second emitted material dispersal assembly configured to emit a second emitted material that is different than the reactant.

Example 32. The emitter assembly of any example herein, particularly example 31, wherein the first emitted material dispersal assembly comprises the one or more nozzles of each of the plurality of distributor elements.

Example 33. The emitter assembly of any example herein, particularly any one of examples 31-32, wherein the second emitted material dispersal assembly comprises a second emitted material rim that comprises a plurality of second emitted material outlets configured to emit the second emitted material.

Example 34. A method of operating an emitter assembly positioned in an incident airflow to emit a reactant into the incident airflow, the method comprising: conveying the reactant to a plurality of nozzles of the emitter assembly; and emitting the reactant from the plurality of nozzles such that each nozzle of at least a subset of the plurality of nozzles emits the reactant along a corresponding nozzle dispersal direction that is elevated relative to an emitter rotational axis of the emitter assembly.

Example 35. The method of any example herein, particularly example 34, wherein the emitting the reactant comprises emitting such that, for each nozzle, the nozzle dispersal direction is characterized by a nonzero azimuthal angle, as measured between the emitter rotational axis and a projection of the nozzle dispersal direction onto a plane containing the nozzle and the emitter rotational axis.

Example 36. The method of any example herein, particularly any one of examples 34-35, wherein the emitter assembly comprises a plurality of distributor elements circumferentially distributed around the emitter rotational axis, wherein each distributor element comprises one or more nozzles of the plurality of nozzles and a respective distributor element axis, and wherein the method further comprises rotating at least a subset of the distributor elements about the respective distributor element axes.

Example 37. The method of any example herein, particularly example 36, wherein the rotating the distributor elements comprises rotating each distributor element to assume a pitch angle such that a force of the incident airflow on each distributor element causes the emitter assembly to rotate about the emitter rotational axis.

Example 38. The method of any example herein, particularly any one of examples 36-37, wherein the plurality of distributor elements are distributed among a plurality of concentric emitter bands of the emitter assembly, and wherein the rotating the distributor elements comprises rotating such that, for each emitter band, the corresponding distributor elements are rotated in unison with one another.

Example 39. The method of any example herein, particularly example 38, wherein the rotating the distributor elements comprises rotating distributor elements of different emitter bands to different pitch angles.

Example 40. The method of any example herein, particularly any one of examples 34-39, further comprising: receiving a control signal from a control system that is based, at least in part, on one or more of a measured atmospheric condition, a measured meteorological condition, a measured ocean condition, a measured organism count, or a measured organism condition, and wherein the emitting the reactant comprises varying one or more of a flow rate of the reactant, the nozzle dispersal direction of one or more of the nozzles, or a reactant particle size produced by one or more of the nozzles based, at least in part, on the control signal.

Example 41. An emitter system, comprising: a wind turbine generator with a plurality of turbine rotor blades; and an emitter assembly positioned and configured to emit a reactant into a rotor wake of the turbine rotor blades, wherein the emitter assembly comprises: a plurality of distributor elements, each distributor element comprising one or more nozzles configured to emit the reactant along a respective nozzle dispersal direction; and a support structure that supports the plurality of distributor elements relative to an emitter rotational axis of the emitter assembly such that, for at least a subset of the plurality of distributor elements, each nozzle dispersal direction comprises a component that is angled relative to the emitter rotational axis by a nonzero azimuthal angle, wherein the reactant comprises a carbon dioxide reactant, and wherein the emitter assembly is configured to release the reactant into the rotor wake to react the reactant with carbon dioxide in the rotor wake.

Example 42. The emitter system of any example herein, particularly example 41, wherein the emitter assembly is configured to rotate relative to the emitter rotational axis independent of the turbine rotor blades.

Example 43. The emitter system of any example herein, particularly any one of examples 41-42, wherein the emitter assembly and the turbine rotor blades are configured to rotate in the same rotational direction.

Example 44. The emitter system of any example herein, particularly any one of examples 41-43, wherein the emitter assembly and the turbine rotor blades are configured to rotate in opposite rotational directions.

Example 45. The emitter system of any example herein, particularly any one of examples 41-44, further comprising a reactant production system for producing the reactant.

Example 46. The emitter system of any example herein, particularly example 45, wherein the reactant production system produces the reactant at least partially using electrical power generated by the wind turbine generator.

Example 47. The emitter system of any example herein, particularly any one of examples 45-46, wherein the reactant production system produces the reactant at least partially from seawater.

Example 48. The emitter system of any example herein, particularly any one of examples 45-47, wherein the reactant comprises sodium hydroxide.

Example 49. The emitter system of any example herein, particularly any one of examples 45-48, wherein the reactant production system comprises one or both of a desalination system and a brine treatment system.

Example 50. The emitter system of any example herein, particularly any one of examples 45-49, wherein the reactant production system is configured to generate potable water.

Example 51. The emitter system of any example herein, particularly any one of examples 41-50, further comprising a control system configured to generate and transmit a control signal for controlling operation of one or both of the wind turbine generator and the reactant production system.

Example 52. The emitter system of any example herein, particularly example 51, wherein the control system is configured to generate the control signal based, at least in part, on one or more measured data inputs, and wherein the one or more measured data inputs comprise one or more of data collected from atmospheric sensors, data collected from meteorological sensors, data collected from the wind turbine generator, or data collected from ocean sensors.

Example 53. The emitter system of any example herein, particularly example 52, wherein the control system is configured to generate the control signal at least partially using an artificial intelligence (AI) algorithm to analyze relationships between the one or more measured data inputs and one or more operating parameters of the emitter system.

Example 54. The emitter system of any example herein, particularly any one of examples 49-53, wherein the control system is configured to generate the control signal to vary one or more operating parameters of the emitter system to enhance a rate of $CO_2$ capture associated with emission of the reactant.

Example 55. An emitter assembly comprising: a support structure comprising a plurality of support masts and a plurality of rims supported by the support masts; a first emitted material dispersal assembly at least partially supported by the support structure and configured to emit a first emitted material; and a second emitted material dispersal assembly configured to emit a second emitted material that is different than the first emitted material, wherein the first emitted material dispersal assembly comprises a plurality of distributor elements, each distributor element being supported between a corresponding pair of rims of the plurality of rims, and each distributor element comprising one or more nozzles configured to emit the first emitted material along a respective nozzle dispersal direction, and wherein the second emitted material assembly comprises a second emitted material rim that comprises a plurality of second emitted material outlets configured to emit the second emitted material.

Example 56. The emitter assembly of any example herein, particularly example 55, wherein the first emitted material comprises a carbon dioxide reactant, and wherein the second emitted material comprises an iron fertilizer.

Example 57. The emitter assembly of any example herein, particularly any one of examples 55-56, wherein the second emitted material dispersal assembly comprises a second emitted material rim that comprises a plurality of second emitted material outlets configured to emit the second emitted material therethrough.

Example 58. The emitter assembly of any example herein, particularly example 57, wherein the second emitted material rim is positioned radially exterior to the plurality of rims of the support structure.

Example 59. The emitter assembly of any example herein, particularly any one of examples 55-58, further comprising the subject matter of any one of examples 1-33.

Example 60. A method of operating an emitter system, the method comprising: receiving, with a control system of the emitter system, one or more measured data inputs; generating, with the control system, one or more control signals based, at least in part, on the one or more measured data inputs; and operating an emitter assembly of the emitter system based, at least in part, on the one or more control signals, wherein the one or more measured data inputs comprise one or more of: atmospheric and/or meteorological data measured upwind of the emitter assembly; ocean data measured upwind of the emitter assembly; atmospheric and/or meteorological data measured downwind of the emitter assembly; ocean data measured downwind of the emitter assembly; meteorological data measured downwind of the emitter assembly; or marine biota data measured downwind of the emitter assembly, wherein the emitter assembly is configured to emit each of a first emitted material and a second emitted material into an incident airflow, and wherein the operating the emitter assembly comprises regulating emission of one or both of the first emitted material and the second emitted material to enhance a rate of CDR produced by one or both of the first emitted material and the second emitted material.

Example 61. The method of any example herein, particularly example 60, wherein the generating the one or more control signals comprises analyzing the measured data inputs with an artificial intelligence (AI) algorithm to determine relationships between the one or more measured data inputs and one or more operating parameters of the emitter system.

Example 62. The method of any example herein, particularly example 61, wherein the generating the one or more control signals comprises generating one or more control signals to vary at least one of the one or more operating parameters in a manner that is predicted to yield one or more of: an increase in the rate of CDR resulting from $CO_2$ mineralization by the first emitted material; an increase in the rate of CDR by $CO_2$ absorption in an ocean surface resulting from ocean alkalization; an enhancement of marine biota health in a region downwind of the emitter assembly by iron fertilization from the second emitted material; or an enhancement of marine biota health in the region downwind of the emitter assembly resulting from ocean alkalinization.

Example 63. The method of any example herein, particularly any one of examples 61-62, wherein the AI algorithm comprises one or more of a machine learning algorithm, a supervised learning algorithm, or an unsupervised learning algorithm.

Example 64. The method of any example herein, particularly any one of examples 61-63, wherein the first emitted material comprises a $CO_2$ reactant.

Example 65. The method of any example herein, particularly any one of examples 61-64, wherein the second emitted material comprises a fertilizer material, optionally a fertilizer material comprising iron.

Example 66. The method of any example herein, particularly any one of examples 61-65, wherein the one or more operating parameters of the emitter system comprise one or more of: a first material time interval during which the emitter assembly emits the first emitted material; a first material rate at which the emitter assembly emits the first emitted material; a second material time interval during which the emitter assembly emits the second emitted material; a second material rate at which the emitter assembly emits the second emitted material; or a ratio between the first material rate and the second material rate.

Example 67. The method of any example herein, particularly any one of examples 61-66, wherein the operating the emitter assembly comprises conveying at least one of the one or more control signals to the emitter assembly.

Example 68. The method of any example herein, particularly any one of examples 61-67, wherein the emitter system is the emitter system of any example herein, particularly any one of examples 41-54.

Example 69. The method of any example herein, particularly any one of examples 61-68, wherein the emitter assembly is the emitter assembly of any example herein, particularly any one of examples 1-33 or 55-59.

Example 70. The method of any example here, particularly any one of examples 60-69, wherein the operating the emitter assembly comprises the subject matter of any one of examples 34-40.

In view of the many possible ways in which the principles of the disclosure may be applied, it should be recognized that the illustrated configurations depict examples of the disclosed technology and should not be taken as limiting the scope of the disclosure nor the claims. Rather, the scope of the claimed subject matter is defined by the following claims and their equivalents.

The invention claimed is:

1. An emitter assembly, comprising:

a plurality of distributor elements, each distributor element comprising one or more nozzles configured to emit a reactant along a respective nozzle dispersal direction; and a support structure that supports the plurality of distributor elements relative to an emitter rotational axis of the emitter assembly such that the nozzle dispersal direction of each nozzle of at least a subset of the one or more nozzles comprises a component that is angled relative to the emitter rotational axis by a nonzero azimuthal angle, wherein the reactant comprises a carbon dioxide reactant, and wherein the emitter assembly is configured to release the reactant into an incident airflow to react the reactant with carbon dioxide in the incident airflow.

2. The emitter assembly of claim 1, wherein each distributor element is configured to rotate about a corresponding distributor element axis, wherein each distributor element is shaped as an airfoil with a chord line perpendicular to the distributor element axis, and wherein each distributor element is configured to rotate to vary a pitch angle between the emitter rotational axis and a projection of the chord line onto a plane comprising the emitter rotational axis.

3. The emitter assembly of claim 1, wherein, for at least one distributor element of the plurality of distributor elements, the nozzle dispersal directions of the nozzles of the distributor element alternate on either side of a chord line of the distributor element by a nozzle offset angle that is at least 10 degrees.

4. The emitter assembly of claim 3, wherein the plurality of distributor elements are configured to rotate the emitter assembly about the emitter rotational axis when at least a subset of the distributor elements are characterized by nonzero pitch angles and when the emitter assembly is positioned in a path of the incident airflow.

5. The emitter assembly of claim 1, wherein the support structure comprises:

a plurality of support masts; and a plurality of rims supported by the support masts, wherein each distributor element is supported between a corresponding pair of rims of the plurality of rims.

6. The emitter assembly of claim 5, further comprising one or more emitter bands, each emitter band being defined between a corresponding pair of radially adjacent rims of the plurality of rims, and wherein each emitter band comprises a number of distributor elements of the plurality of distributor elements that is positively correlated to a radial distance separating the emitter band and the emitter rotational axis.

7. The emitter assembly of claim 6, wherein the emitter assembly is configured to rotate each distributor element about a corresponding distributor element axis, and wherein, for each emitter band, the emitter assembly is configured to rotate all distributor elements of the emitter band in unison.

8. The emitter assembly of claim 6, wherein the emitter assembly is configured to rotate the distributor elements of different emitter bands to different pitch angles during operative use of the emitter assembly.

9. The emitter assembly of claim 1, wherein the emitter assembly comprises a first emitted material dispersal assembly configured to emit the reactant and a second emitted material dispersal assembly configured to emit a second emitted material that is different than the reactant, and wherein the first emitted material dispersal assembly comprises the one or more nozzles of each of the plurality of distributor elements.

10. The emitter assembly of claim 9, wherein the second emitted material dispersal assembly comprises a second emitted material rim that comprises a plurality of second emitted material outlets configured to emit the second emitted material.

11. An emitter system, comprising:

a wind turbine generator with a plurality of turbine rotor blades; and an emitter assembly positioned and configured to emit a reactant into a rotor wake of the turbine rotor blades, wherein the emitter assembly comprises:

a plurality of distributor elements, each distributor element comprising one or more nozzles configured to emit the reactant along a respective nozzle dispersal direction; and a support structure that supports the plurality of distributor elements relative to an emitter rotational axis of the emitter assembly such that, for at least a subset of the plurality of distributor elements, each nozzle dispersal direction comprises a component that is angled relative to the emitter rotational axis by a nonzero azimuthal angle, wherein the reactant comprises a carbon dioxide reactant, and wherein the emitter assembly is configured to release the reactant into the rotor wake to react the reactant with carbon dioxide in the rotor wake.

12. The emitter system of claim 11, wherein the emitter assembly is configured to rotate relative to the emitter rotational axis independent of the turbine rotor blades.

13. The emitter system of claim 11, further comprising a reactant production system for producing the reactant, wherein the reactant production system produces the reactant at least partially from seawater using electrical power generated by the wind turbine generator.

14. The emitter system of claim 13, further comprising a control system configured to generate and transmit a control signal for controlling operation of the reactant production system.

15. The emitter system of claim 14, wherein the control system is configured to generate the control signal based, at least in part, on one or more of data collected from atmospheric sensors, data collected from meteorological sensors, data collected from the wind turbine generator, or data collected ocean sensors.

16. A method of operating an emitter system, the method comprising:

receiving, with a control system of the emitter system, one or more measured data inputs;

generating, with the control system, one or more control signals based, at least in part, on the one or more measured data inputs; and operating an emitter assembly of the emitter system based, at least in part, on the one or more control signals, wherein the emitter assembly is the emitter assembly of claim 6, wherein the one or more measured data inputs comprise one or more of:

atmospheric and/or meteorological data measured upwind of the emitter assembly;

ocean data measured upwind of the emitter assembly;

atmospheric and/or meteorological data measured downwind of the emitter assembly;

ocean data measured downwind of the emitter assembly;

meteorological data measured downwind of the emitter assembly; or marine biota data measured downwind of the emitter assembly, wherein the emitter assembly is configured to emit each of a first emitted material and a second emitted material into the incident airflow, and wherein the operating the emitter assembly comprises regulating emission of one or both of the first emitted material and the second emitted material to enhance a rate of carbon dioxide removal (CDR) produced by one or both of the first emitted material and the second emitted material.

17. The method of claim 16, wherein the generating the one or more control signals comprises analyzing the measured data inputs with an artificial intelligence (AI) algorithm to determine relationships between the one or more measured data inputs and one or more operating parameters of the emitter system.

18. The method of claim 16, wherein the generating the one or more control signals comprises generating one or more control signals to vary at least one of the one or more operating parameters in a manner that is predicted to yield one or more of:

an increase in the rate of CDR resulting from $CO_2$ mineralization by the first emitted material;

an increase in the rate of CDR by $CO_2$ absorption in an ocean surface resulting from ocean alkalization;

an enhancement of marine biota health in a region downwind of the emitter assembly by iron fertilization from the second emitted material; or an enhancement of marine biota health in the region downwind of the emitter assembly resulting from ocean alkalinization.

19. The method of claim 16, wherein the first emitted material comprises the carbon dioxide reactant, and wherein the second emitted material comprises a fertilizer material comprising iron.

20. The method of claim 16, wherein the one or more operating parameters of the emitter system comprise one or more of: a first material time interval during which the emitter assembly emits the first emitted material; a first material rate at which the emitter assembly emits the first emitted material; a second material time interval during which the emitter assembly emits the second emitted material; a second material rate at which the emitter assembly emits the second emitted material; or a ratio between the first material rate and the second material rate.

* * * * *